(12) United States Patent
Lee et al.

(10) Patent No.: US 7,729,495 B2
(45) Date of Patent: Jun. 1, 2010

(54) SYSTEM AND METHOD FOR DETECTING UNAUTHORIZED COPYING OF ENCRYPTED DATA

(75) Inventors: Lane W. Lee, Lafayette, CO (US); Timothy R. Feldman, Louisville, CO (US); Douglas M. Rayburn, Denver, CO (US); Gary G. Kiwimagi, Loveland, CO (US)

(73) Assignee: DPHI Acquisitions, Inc., Longmont, CO (US)

( * ) Notice: Subject to any disclaimer, the term of this patent is extended or adjusted under 35 U.S.C. 154(b) by 1590 days.

(21) Appl. No.: 09/940,174

(22) Filed: Aug. 27, 2001

(65) Prior Publication Data

US 2003/0115146 A1 Jun. 19, 2003

(51) Int. Cl.
*H04N 5/91* (2006.01)
(52) U.S. Cl. .................. 380/203; 360/60; 705/57; 705/51; 713/193
(58) Field of Classification Search ........... 705/50–53, 705/57
See application file for complete search history.

(56) References Cited

U.S. PATENT DOCUMENTS

| | | | | |
|---|---|---|---|---|
| 5,857,021 A | * | 1/1999 | Kataoka et al. ............. 705/54 |
| 6,028,936 A | * | 2/2000 | Hillis ........................ 713/168 |
| 6,367,010 B1 | * | 4/2002 | Venkatram et al. .......... 713/171 |
| 6,367,019 B1 | * | 4/2002 | Ansell et al. ................ 713/201 |
| 6,519,700 B1 | * | 2/2003 | Ram et al. .................. 713/193 |
| 6,581,160 B1 | * | 6/2003 | Harada et al. ............... 713/169 |
| 6,584,160 B1 | * | 6/2003 | Amrany et al. .............. 375/296 |
| 6,748,539 B1 | * | 6/2004 | Lotspiech ................... 713/200 |
| 6,782,190 B1 | * | 8/2004 | Morito ........................ 386/94 |

* cited by examiner

*Primary Examiner*—Evens J Augustin
(74) *Attorney, Agent, or Firm*—Haynes & Boone, LLP.

(57) ABSTRACT

A system and method is provided for detecting unauthorized actions with respect to encrypted data on a media disk, the media disk including a first portion for prerecorded content and a second portion for written content. The method includes reading an identifier on the media disk, wherein the identifier includes one or more sections located in one of the first portion for pre-recorded content, the second portion for written content, and both the first portion for pre-recorded content and the second portion for written content, determining whether the identifier includes a section located in the second portion written content, comparing the identifier with one or more predetermined types of identifiers for which a section is located in the second portion for written content, and if the identifier is of a type that is one of the one or more predetermined types of identifiers, detecting an unauthorized action.

9 Claims, 52 Drawing Sheets

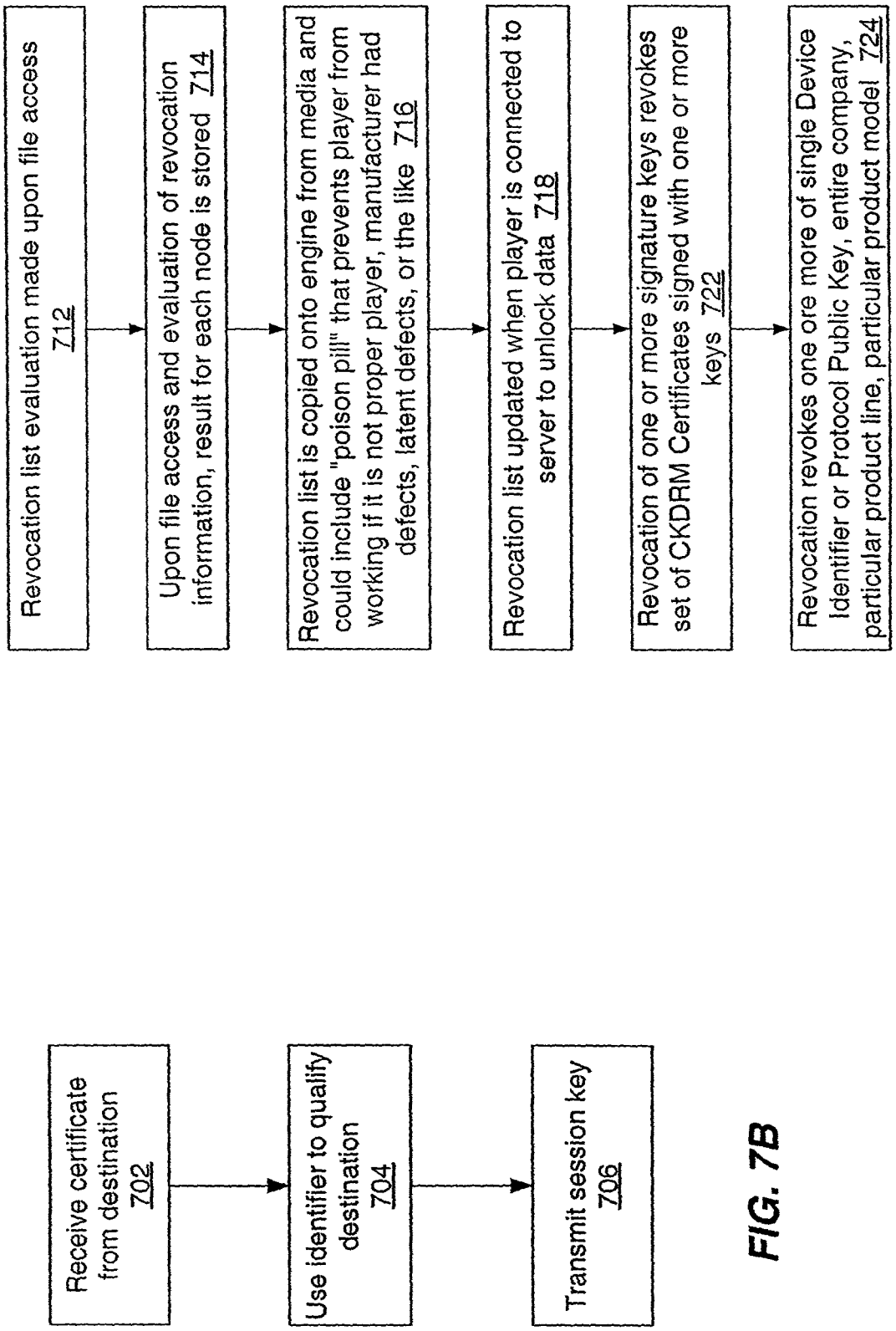

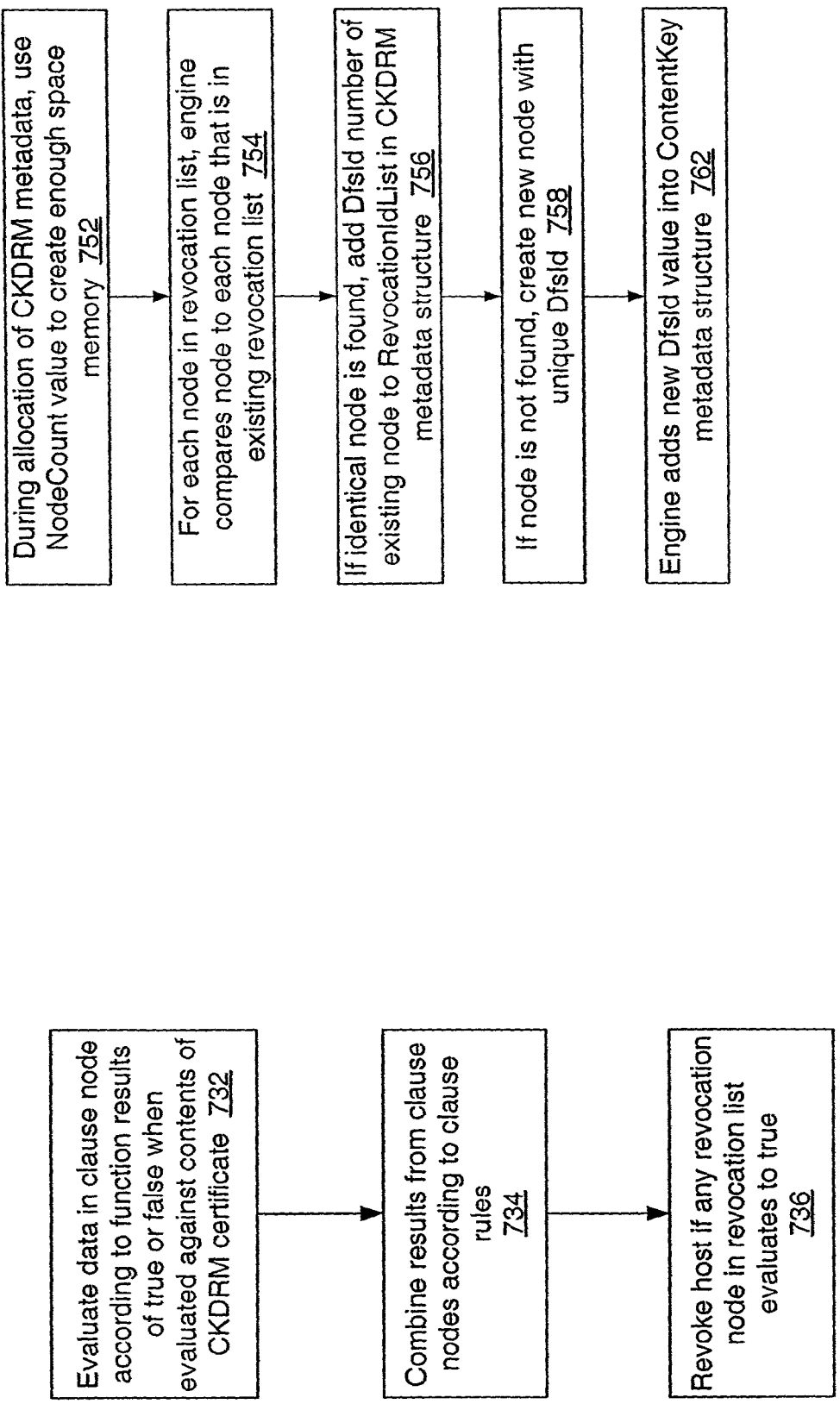

SYSTEM AND METHOD FOR DETECTING UNAUTHORIZED COPYING OF ENCRYPTED DATA

CROSS REFERENCES TO RELATED APPLICATIONS

This application is related to U.S. patent application Ser. No. 09/542,510, "Digital Rights Management within an Embedded Storage Device" to Lane W. Lee and Daniel R. Zaharris, filed Apr. 3, 2000, which application is incorporated herein for all purposes.

This application is related to U.S. patent application Ser. No. 09/940,083, "A Secure Access Method and System" to Timothy R. Feldman, Lane W. Lee, Michael F. Braitberg, Douglas M. Rayburn, and Gary G. Kiwimagi, filed herewith, which application is incorporated herein for all purposes.

This application is related to U.S. patent application Ser. No. 09/940,025, "System and Method for Identifying Vendors of Hidden Content" to Michael F. Braitberg, Timothy R. Feldman, Lane W. Lee, Douglas M. Rayburn, and Gary G. Kiwimagi, filed herewith, which application is incorporated herein for all purposes.

This application is related to U.S. patent application Ser. No. 09/940,035, "An Unlocking Method and System for Data on Media" to Lane W. Lee, Timothy R. Feldman, Douglas M. Rayburn, and Gary G. Kiwimagi, filed herewith, which application is incorporated herein for all purposes.

This application is related to U.S. patent application Ser. No. 09/940,026, "Host Certification Method and System" to Lane W. Lee, Timothy R. Feldman, Douglas M. Rayburn, and Gary G. Kiwimagi, filed herewith, which application is incorporated herein for all purposes.

This application is related to U.S. patent application Ser. No. 09/939,896, "A Revocation Method and Apparatus for Secure Content" to Lane W. Lee, Timothy R. Feldman, Douglas M. Rayburn, and Gary G. Kiwimagi, filed herewith, which application is incorporated herein for all purposes.

This application is related to U.S. patent application Ser. No. 09/939,960, "A Mastering Process and System for Secure Content" to Lane W. Lee, Timothy R. Feldman, Douglas M. Rayburn, and Gary G. Kiwimagi, filed herewith, which application is incorporated herein for all purposes.

BACKGROUND OF THE INVENTION

1. Field of the Invention

The present invention relates to the field of digital rights management. More particularly, this invention relates to security and systems and methods that ensure that content is accessed, copied and controlled in secure ways in an electronic environment.

2. Description of the Related Art

Entities, including people, companies, systems and computers transfer information faster than ever since the advent of the Internet and technologically advanced electronic appliances. Facsimile machines, computers, and electronic appliances such as personal digital assistants (PDAs) and wireless phones with Internet access enable the quick transfer of information to remote locations around the world.

The quick transfer of information is not without drawbacks. Information in digital form, while readily transferable, is also readily accessible to many more entities than ever before. So-called "hackers" attract attention by quickly retrieving information from computer systems before being detected. Similarly, world-wide web pages quickly disseminate electronic content on the Internet, such as MP3 data containing copyrighted material. Thus, electronic content reaches individuals to whom it was not intended. For this reason, electronic content providers, businesses and citizens are increasingly concerned about security issues.

The issue concerning security of electronic content and the Internet is timely and hotly debated. For example, Alanis Morissette addressed the issues of copyright and royalties to a U.S. Senate Judiciary Committee headed by Orrin Hatch in a hearing entitled "Online Entertainment and Copyright Law: Coming Soon To A Digital Device Near You." In her speech, Alanis highlighted the differences in goals between content creators, content providers and content users. Commercial content providers desire compensation for the electronic content. These content providers are concerned with the prevalent copying of content without compensation, such as compact disks (CDs) and digital video disks (DVDs). Individual content users are often at cross purposes with content providers, desiring unauthorized copying of content, including digital music, software programs, movies, digital books and the like. Content creators, who desire as wide an audience as possible, are often torn between dissemination goals and compensation goals.

The speed with which appliances, computers and the like disseminate electronic content caused an increase in complex security techniques. These complex security techniques attempt to ensure the security of the content and the transactions. For example, one security technique protects electronic transactions and content by using a time stamp or a counter to determine whether a transaction is authentic. Other security techniques focus on cryptography and mathematical algorithms.

Cryptographic solutions not only provide confidentiality to transactions and content, but provide methods for authentication, integrity (e.g., verifying that a message has not been modified in transit), and non-repudiation (preventing false denials of transactions). Some cryptographic solutions are referred to as restricted algorithms that typically are used by low-security applications. More recently, cryptographic keys protect content by requiring a key for both encryption and decryption of content. Key-based cryptographic solutions enable the spreading of an algorithm without risking security breaches because the security onus is on the keys themselves.

There are a number of cryptographic key solutions. One type is the symmetric key solution in which an encryption key can be calculated from the decryption key and vice versa. A more secure key solution is the public-key solution, or asymmetric solution, in which the key used for encryption is different from the key used for decryption. The public-key solution is part of the ISO authentication specifications, commonly known as the X.509 protocols. More specifically, the X.509 protocols provide a framework for authentication across networks, such as the Internet. The X.509 protocols do not specify a particular algorithm. Instead, the protocols focus on using public-key certificates. Under the specification, each user has a distinct name and has a signed certificate with a name and a public key issued by a trusted certification authority (CA). Typical fields in an X.509 certificate include: version; serial number; algorithm identifier; issuer; period of validity; subject; subject's public key; and signature. More specifically, a version field identifies a format for the certificate. A serial number is unique for the certification authority. The algorithm field identifies the type of algorithm used to sign the certificate and includes necessary parameters to run the algorithm. The issuer field identifies the name of the CA. The period of validity field provides the time period during which the certificate is valid. The subject field identifies the name of the user. The subject's public key field provides the algorithm name, parameters and such related to the public key.

Communicating using certificates configured according to the X.509 protocol is known in the art. A user desiring to communicate with another retrieves the destination certificate from a database and verifies authenticity. Verifying authenticity often involves several CAs if there is a hierarchy of CAs between the user's CA and the destination CA. After verification, communication may take place. Typically, timestamps are used to confirm that messages are current. A three-way protocol is one authentication protocol that does not use timestamps, however, additional steps are required involving the user checking a random number that was originally generated by the user, sent to the destination, and received back from the destination. Likewise, the destination checks a random number received from the user that was originally generated at the destination.

Another known security technique is fingerprinting messages. Fingerprinting is typically accomplished using a hash function. There are a number of types of hash functions. A common hash function is the one-way hash function that provides a fixed-length hash value, h, after operating on an arbitrary-length pre-image message. The h is unique to the message associated with it. However, the security of the h depends on the number of bits of the hash. A practical size is 128 bits. There are a number of different types of hashing algorithms, including the Message Digest (MD) 4 algorithm, the MD5 algorithm, which is more complex than the MD4 algorithm. Another type of hash function is the n-hash algorithm. A more complicated hash algorithm than the one-way hash, an n-hash algorithm implements a randomizing function, hashing and logical exclusive OR functions.

The descriptions of cryptographic solutions above represent a sampling of known digital security systems. Another aspect of the security of electronic content concerns digital rights management (DRM). DRM entails the establishment and management of rights and permissions for digital content and supports distribution of digital content. DRM is necessary for digital distribution of educational, professional and trade content as well as entertainment content.

Some known DRMs use the extensible Rights Markup Language (XML) to implement access and use controls for the exchange of secure digital content. Markup languages are typically based on the Standard Generalized Markup Language (SGML). SGML is a standard language for defining the format in a text document that allows sharing of documents among computers, regardless of hardware and operating system configurations. Markup language files use a standard set of code tags embedded in text that describes the elements of a document. The web browser interprets the code tags so that each computer having its own unique hardware and software capabilities is able to display the document while preserving the original format of the document. An SGML document uses a separate document type definition (DTD) file that defines the format code tags embedded within it.

Other DRM schemes are implemented with C, Fortran and other known programming languages. Known systems include Interleaf, ArborText, and TexCel.

As discussed above, content providers, content creators and content users are in conflict. Known DRM systems fail to resolve the conflicts between these stakeholders in the electronic content world. More specifically, to resolve the conflicts, a DRM is needed that meets content users expectations, including allowing a consumer fair use of content. Further, content providers, including content owners and manufacturers need a DRM that maintains content security, supports new and expanded business models and brings high value to the marketplace for the content. To maintain content security a new system would require advanced techniques for detecting unauthorized copying of encrypted data.

SUMMARY OF THE INVENTION

Accordingly, a system and method is provided for detecting unauthorized actions with respect to encrypted data on a media disk, the media disk including a first portion for pre-recorded content and a second portion for written content. The method includes reading an identifier on the media disk, wherein the identifier includes one or more sections located in one of the first portion for pre-recorded content, the second portion for written content, and both the first portion for pre-recorded content and the second portion for written content, determining whether the identifier includes a section located in the second portion written content, comparing the identifier with one or more predetermined types of identifiers for which a section is located in the second portion for written content, and if the identifier is of a type that is one of the one or more predetermined types of identifiers, detecting an unauthorized action.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7B illustrates a method for securely delivering data across a channel is shown in flow diagram form according to an embodiment of the present invention.

FIG. 7C illustrates a method for revoking a content rendering device according to an embodiment of the present invention.

FIG. 7D illustrates a flow diagram of the evaluation of a revocation list according to an embodiment of the present invention.

FIG. 7E illustrates a method performed by an engine when presented with a revocation list according to an embodiment of the present invention.

FIG. 7I illustrates a package creation process for the mastering process of FIG. 7H.

DETAILED DESCRIPTION

Overview

Figure 1:
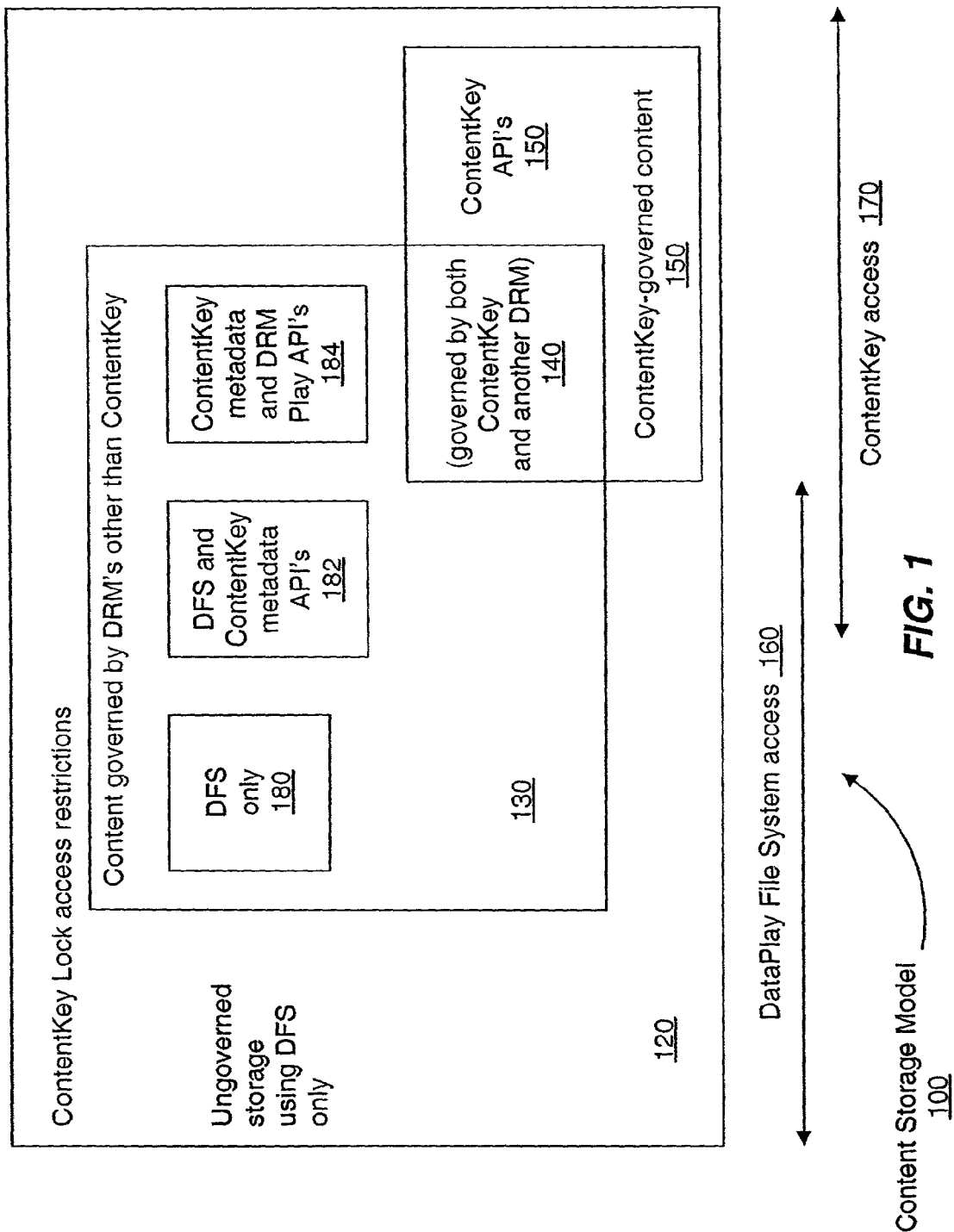
FIG. 1 illustrates the interoperability of digital rights management systems within the secure electronic content system according to an embodiment of the present invention.

In accordance with embodiments of the present invention, a secure electronic content (SEC) system provides a solution to electronic content concerns of the content creators, content providers, content owners, and content users. The scope of the SEC system includes media, an engine capable of providing read and write access to the media, encryption and access rules, encoding, decoding, meanings, associations, navigation and presentation, the standardization of each of which results in a seamless security system for electronic content.

The encryption and access rules disclosed in embodiments herein provide an invisible and seamless ContentKey™ digital rights management (CKDRM) system that secures content and allows content to be portable and interoperable with appropriate electronic devices. The CKDRM supports fair use by content purchasers and users with the CKDRM directly supporting personal use copies of electronic content and allowing import and export of content. According to embodiments disclosed herein, pre-recorded, unlocked content located on media is playable at a point of sale by a device designed to render content protected with the CKDRM or other third party digital rights management schemes (TP-DRMs). For purposes of this disclosure the term pre-recorded content includes mastered content.

Further, pre-recorded locked content on media may be unlocked by a device/player operating in accordance with an embodiment by connecting with a clearinghouse. Depending on the permissions granted on media, any player may render the content after unlocking. Moreover, unlocked content may be moved onto CKDRM associated media and be rendered on a player. The embodiments further disclose that the media may be written to without resulting in content capable of being rendered on any player, but only on predetermined players. According to one embodiment, for example, the CKDRM permits a predetermined number of copies of pre-recorded, unlocked content as determined by content providers and licenses and the like.

Further, the CKDRM supports new content consumer experiences by providing a method of unlocking content and managing content. The disclosed CKDRM is implemented by devices capable of rendering electronic content, hereinafter "players." Players implement the CKDRM and interface with servers, kiosks, replicators, and the like. Players either embed an engine that operates with the CKDRM to provide security or couple to the engine, for example, a personal computer (PC). Further, players render content on digital media, such as disks. In another embodiment, a PC implements a player.

The CKDRM is also extensible by, in part, providing a flexible unlocking method and supporting the transfer of content and rules to other DRM implementations. Specifically, a player implementing CKDRM is further capable of implementing third party DRMs (TPDRMs). In an embodiment, a player with an embedded engine implements CKDRM and exposes a file system and a CKDRM application programming interface (API) through general purpose interfaces. The CKDRM advantageously provides numerous functions, including unlocking, play, counting copies, importing from certified sources, exporting to certified destinations, and securing metadata storage.

A Secure Electronic Content System

The CKDRM system includes security and access rules as part of the secure electronic content system.

For purposes of the discussion of the Secure Electronic Content (SEC) System, the following glossary applies:

PKI: Public Key Infrastructure

AES: Advanced Encryption Standard.

API: Application programming interface. This term refers to the logical interface between components CA: Certificate Authority. The Certificate Authority is the entity that issues certificates.

Content Provider: The Content Provider is the entity that owns the rights to the content and participates in the delivering content to the marketplace.

DFS: DataPlay File System. In at least one embodiment, DFS is an open application programming interface (API).

Engine: The component that provides read and write access to digital media.

Host: The device controlling the engine.

USB: Universal Serial Bus—Physical connection between the Client PC and a connected engine MAC: MAC is an acronym for Message Authentication Code.

SHA-1: SHA is an acronym for Secure Hash Algorithm, which is defined by NIST FIPS PUB 186.

Protected Content:—Content that is stored on the digital media in an encrypted form under the governance of CKDRM.

Unlocked Content—Protected Content that is available to be rendered on any certificated device capable of rendering the content. Unlocked Content that was pre-mastered onto the media in this state may also referred to as Primary Content.

Locked Content: Protected Content that is not available to be rendered until a CKDRM unlock transaction occurs which will change it to Unlocked Content. Locked Content is also referred to as Secondary Content.

Key Complement: The information required to complete a set of decryption keys that enables Locked Content to become Unlocked.

Referring to Table 1A, the interoperability of the parts of the secure electronic content system:

TABLE 1A

| Interoperability Stack | |
| --- | --- |
| 101 | User Interface |
| 102 | Presentation |
| 103 | Navigation |
| 104 | Associations |
| 105 | Meanings |
| 106 | Encoding |
| 107 | Access Rules |
| 108 | Encryption |
| 109 | File System |
| 110 | Media |

Table 1A provides an interoperability stack showing the layers with which the CKDRM operates. The stack further includes layers supplied by other TPDRMs, players on which an appropriate engine is embedded, and players coupled to such players. The term "engine" as used herein refers to a component that provides read and write access to digital media. As such, embodiments include one or more of a firmware, software, and hardware, or any combination thereof implementation of an engine. The CKDRM is focused on layers 107 and 108 of the interoperability stack.

Referring to layer 110, electronic content that is pre-recorded or written is bound to the media and does not reside on a player or on an engine. The system enables a plurality of methods of storing data on a media disk. For example, a disk in accordance with an embodiment allows secure pre-recorded content, written content or both pre-recorded and written content on the same disk. Data may be stored on the disk in large blocks or small blocks of data.

Referring to layer 109, the system supports a hierarchical directory structure with file data. Thus, data written by the file system "writes" and returned for file system file "reads" are stored as file data. According to an embodiment, only the data stored in files is accessible through the file system application-programming interface (API). As used herein an API refers to a logical interface between components.

The interpretation of the file data is indicated by file type, as, for example, a MIME string, directory and file name. According to an embodiment, only the data stored in files is accessible through the file system API. Layer 109 does not allow full access to metadata through file system reads and writes. Rather, metadata allows an engine to support the storage of data outside the file system. Thus, some metadata is visible to the host, such as file names, MIME type, size and attributes. Other metadata is exposed only via the CKDRM API. Yet other metadata is only available to an engine. For example, according to an embodiment, secret media identifiers and private metadata is visible only to an engine. Data may be associated with a disk, a directory and a file. The engine, in accordance with the CKDRM may change and manage the metadata and thus, updates consume less of available disk capacity.

According to an embodiment, predetermined metadata is bound to the engine and not stored on a disk. Further, the predetermined metadata is not accessible through the file system API. This information includes the engine's firmware, and public and private key pair. The key pair is generated in conjunction with engine manufacturing, and according to a secure process. According to one embodiment, field updates of engine private storage are supported by the CKDRM via a secure process.

The SEC system advantageously allows TPDRM metadata to be stored with each file, if desired. Moreover, an embodiment allows multiple TPDRM metadata for any individual file. TPDRM metadata may have an ownership identifier that matches a received CKDRM Certificate, as described in further detail below, to gain access to the metadata.

In an embodiment, TPDRM metadata is stored with each file, and, therefore uses the A metadata system already used in an appropriate file system, such as the DataPlay File System (DFS). TPDRM metadata nodes may have a bit set in a file system flag definition to identify the data as TPDRM metadata.

A metadata packet may be that shown in Table 1B. Each symbol showing "U" followed by a number indicates an unsigned value and a bit length of the value.

TABLE 1B

In an embodiment, TPDRM metadata is stored in RAM type memory.

| Type | Name | Description/Usage |
| --- | --- | --- |
| struct META* | psNext | Internal pointer for linked list. |
| DFSID | DfsId | Handle of the file to attach the metadata. |
| DFSFLAG | Flags | Internal use flags-including a bit defining this item as a DRM_METADATA must be set. |
| U16 | MetadataOwner | Identifier that must match the Metadata Owner field in the received ContentKey Certificate in order to establish ownership of the metadata. |
| SYMMETRIC_KEY | MetadataKey | The key used to encrypt the data. |
| U16 | ByteCount | Number of bytes in metadata |
| U8[ ] | Metadata | The DRM metadata itself. |

However, if TPDRM metadata it too large to store all of it in RAM, then a lookup system may be employed wherein the TPDRM metadata is replaced with a value that represents the location for the metadata item.

Certain data is available only through the CKDRM API, including data managed by the engine, including metadata providing play keys and remaining copy counts. According to some embodiments, data available through the CKDRM API includes data managed by a second TPDRM, in which case the format is defined by the TPDRM.

Referring now to FIG. 1, a block diagram illustrates a content storage model for electronic content. As shown, there are five basic models in which content may be stored and governed. One type is shown as ungoverned content using file system methods only 120. Ungoverned content 120 includes basic information such as cleartext data, such as in a general computer storage model. Also shown in FIG. 1 is TPDRM-governed content 130. Such governed content may use the same methods and facilities as ungoverned content 120. Such content includes TPDRM-governed content using file system methods only 180. In this model 180, the TPDRM has responsibility for securing the content and the metadata. Model 180 does not require pre-qualification of the TPDRM by the CKDRM, thus any TPDRM may be operable to govern content in this model. This matches the model of TPDRM-governed content on storage without security facilities.

In another type of storage of electronic content, TPDRM-governed content is accessed with the file system, but metadata accesses use CKDRM facilities such as CKDRM APIs 182. This embodiment of a content storage model provides a greater level of security for the metadata and to encryption keys. Block 184 relates to a model of governing content using CKDRM metadata rules and a TPDRM API wherein the TPDRM API governs rendering of electronic content. The model provides a high level of security for the content itself as additional layers of encryption are implemented by an engine.

Another content storage model 140 provides that content is governed by both a TPDRM and by CKDRM rules for content and metadata. This model 140 permits an overlap between CKDRM governed content and third party DRM governed content. Thus, the system supports content accessed through a CKDRM API and governed by a third-party DRM.

Access model 150 provides the content and metadata are governed by the CKDRM. Model 150 provides a higher level of security for the content by providing that predetermined metadata never leaves the engine. One type of content appropriate for this model is pre-recorded content.

A third party DRM controlling content has a choice of models for moving content to a disk. As those of skill in the art appreciate, rules governing the content may constrain the choice of models available. Further, required security requirements may govern the choice of model, with CKDRM models providing greater security. Further, the CKDRM models, when sufficient to govern necessary permissions of the content, provide efficient and value-added benefits to consumers and content providers.

FIG. 1 further shows that the system provides for at least two types of access to content. More particularly, access 160 shows that content may be accessed directly if ungoverned by using a file system access. Protected content may be accessed via access 160 via the file system API. Access 170 provides that protected content may be accessed via the CKDRM.

Figure 2:
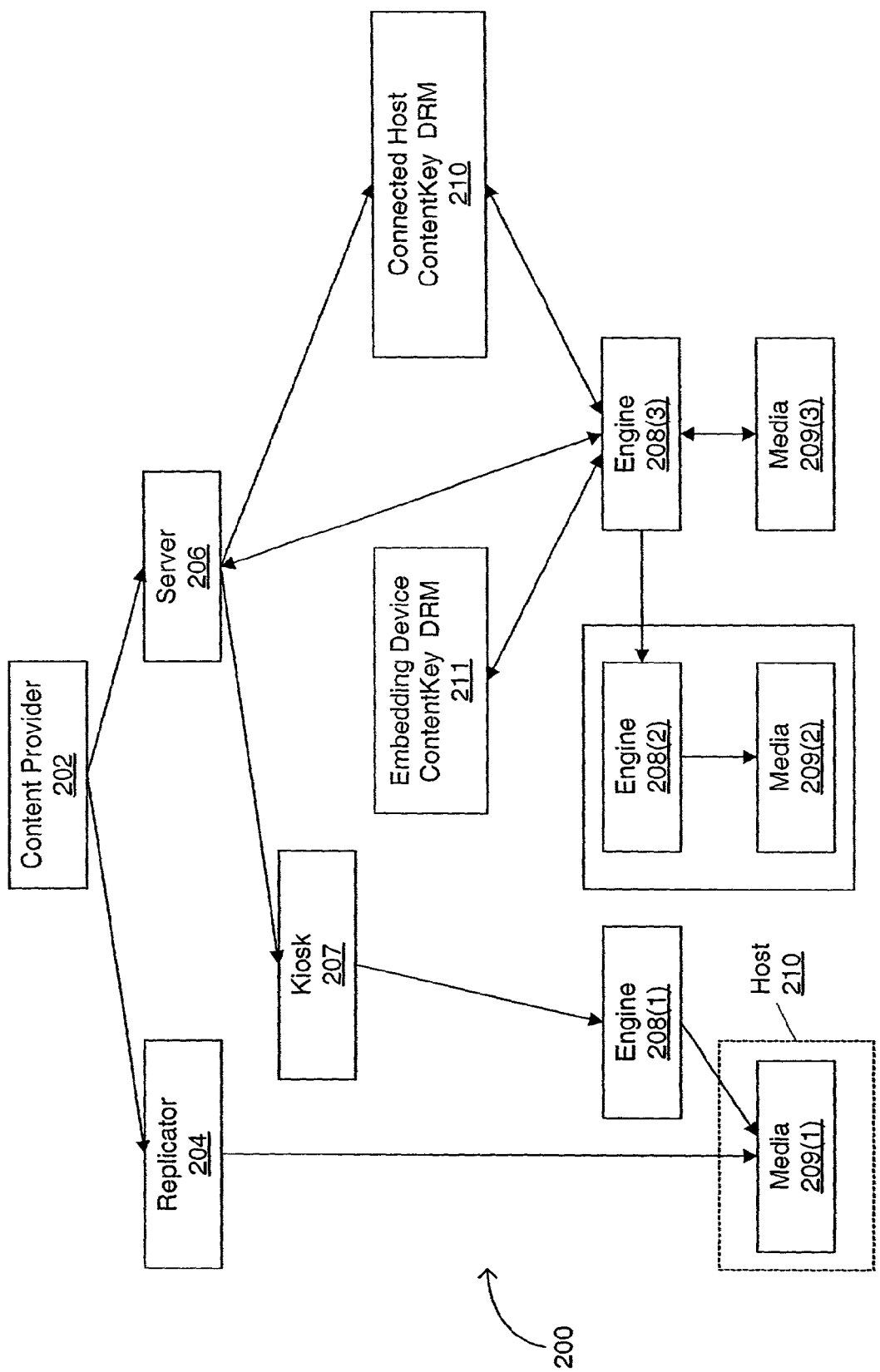
FIG. 2 illustrates a content flow diagram according to an embodiment of the present invention.

Referring now to FIG. 2, a content flow diagram 200 illustrates how content organized in one of the plurality of models shown in FIG. 1 flows in the secure electronic content system. A content provider 202 decides the content following one of the models shown in FIG. 1. Once a master is created on media, a replicator 204 creates multiple copies for distribution. Examples of media following this content flow path include compact disks (CDs), digital versatile disks (DVDs), optical disks such as Dataplay™ optical disks and magnetic media such as floppy disks and tapes. The replicator 204 is a manufacturer that includes on any media any necessary data to enable secure functionality of the content as described above with reference to FIG. 1. According to another embodiment, the content flows from a content provider to a server 206. Server 206, in one embodiment, transfers the secure content to one or more of a kiosk 207, directly to an engine equipped to receive secure data 208(3), or to a connected host 210 that is coupled to an engine 208(3). The connected host 210, in one embodiment, is a personal computer that enables CKDRMs, TPDRMs and file system rules. Content also flows from an engine 208(3) to an embedding device 211. The embedding device 211, in an embodiment, enables CKDRM and TPDRMs.

Also shown in FIG. 2, content flow includes flow from an engine to another engine as between engine 208(2) and 208(3). Such content flow occurs during a copy function, as more fully explained below.

Architectural Overview

Figure 3:
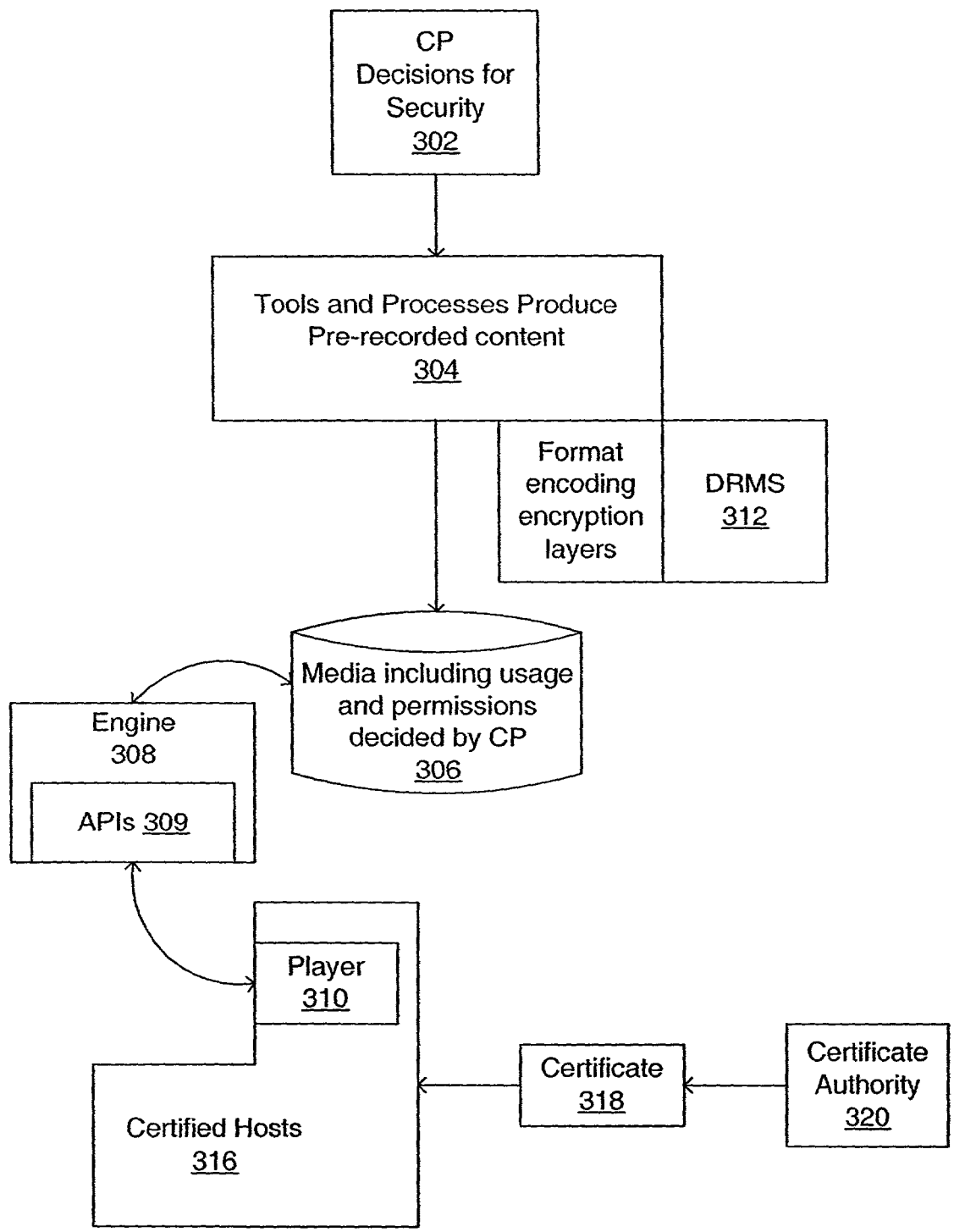
FIG. 3 illustrates method supported by a secure electronic content system according to an embodiment of the present invention.

The CKDRM operates in the context of the secure electronic content system (SEC system). FIG. 3 illustrates methods supported by the secure electronic content system in block form. The components include a content provider 302, tools and processes for producing pre-recorded content 304, appropriate media, such as a disk 306, an engine 308, the players 310 and the DRMs 312 discussed above.

According to an embodiment, the components are organized into an architecture that partitions the SEC system and assigns responsibilities. For example, a content provider 302 brings the original content and makes decisions for all of the variable qualities. The decisions include: which files are initially locked and unlocked; when the file is unlocked, whether the content may be played by player running CKDRM or TPDRMs; how many copies may be made according to CKDRM rules and TPDRM rules; and what rules are to be governed in the CKDRM domain and the TPDRM domain.

In one embodiment, the electronic content system supports global TPDRM rules that limit the number of subsequent copies a TPDRM is allowed to make. In other embodiments, the electronic content system supports rules for specific TPDRMs.

The tools and processes for producing pre-recorded content 304 take all of the inputs from a content provider 302 and create appropriate digital media 306 that conforms to all of the requirements of pre-recorded content. The content is encoded, if not already, in one of a plurality of formats. The content is encrypted in layers of encryption with keys generated and stored in predetermined methods as described herein. The CKDRM metadata and TPDRM metadata, if present, are stored in accordance with methods described herein.

Digital media 306, according to an embodiment, contains all of the information needed to support all of the usage models and permissions specified by content provider 302.

In one embodiment, a player 310 is a certified host 316 that receives a certificate 318 from a certificate authority 320. Certificate 318 provides an authentication portion of the protocols, and establishes an authenticated channel for access to secure API's.

Engine 308 presents APIs to the players 310 and TPDRMs and CKDRMs to support a plurality of the usage models. In one embodiment, engine 308 supports security through the methods implemented in hardware and firmware, but also by embodying cryptographic keys. In one embodiment the cryptographic keys are unique to each engine and some are global among all engines. For example, each engine may include non-volatile memory that stores a signature key list. In one embodiment, the list is an array of public keys used for validating CA signatures.

In one embodiment, using secure APIs, the engine 308 is an endpoint in the authenticated connections that are established. The engine 308 decrypts and encrypts various encryption layers in the play, copy and handoff functions. The engine 308 enforces the basic unlock transactions at the disk 306 level. The engine 308 governs the play and copy permissions, including decrementing the copy counts on the disk 306.

In one embodiment, the engine 308 operates with a USB or other interconnection driver that conforms with APIs used by the CKDRM and DFS APIs. The driver, in an exemplary embodiment allows the engine to communicate with hosts, including players, such as PCs regardless of the host hardware manufacturer or configuration. The operating system may communicate with a Windows™ Registry or .inf file(s) to locate the driver on a system when multiple engines are connected to a host.

In some embodiments, player 310 is a host portion of a device that embeds an engine 308. Alternatively, a player 310 may be an application on a platform coupled to a device with an embedded engine 308. In each alternative, player 310 uses the APIs exposed by the engine 308 to access content and presentation information on a disk 306. The player 310 uses that information to present data to a user and render the content. To access secure content, player 310 is an endpoint in the authenticated connection that is established in the secure API 309. Further, to play content, a player 310, in accordance with an embodiment, must request an authenticated channel after an authority 320 certifies the player 310. The certification process includes issuing player 310 a public key and private key pair, and a certificate 318. The authenticated channel allows access to a secure API 309.

As discussed above, CKDRM and, if media is configured to use TPDRMs, one or more TPDRMs, manage rights and govern operations on secure content. CKDRM and/or TPDRMs implement the rules specified by the content provider 302 and stored on the disk 306. To access secure content, either the CKDRM or a TPDRM is an endpoint in the authenticated connection that is established in the secure API 309. The TPDRM implementation is outside of the engine 308. Nonetheless, the engine 308 through a secure API 309 offers secure storage on media 306. Further, if configured to use TPDRMs, the TPDRMs must be compliant with the disclosed secure electronic content system. More particularly, a compliant TPDRM must request an authenticated channel before accessing content and secure data. According to an embodiment, the authenticated channel is created by first certifying the TPDRM and issuing a public key and private key pair, and a CKDRM certificate. The CKDRM certificate may include a CA Signature Public Key ID or public key identifier that acts as an index to a valid signature key list of an engine 308 for a number of purposes as explained in further detail below. The authenticated channel is created for further access to a secure API.

Figure 4:
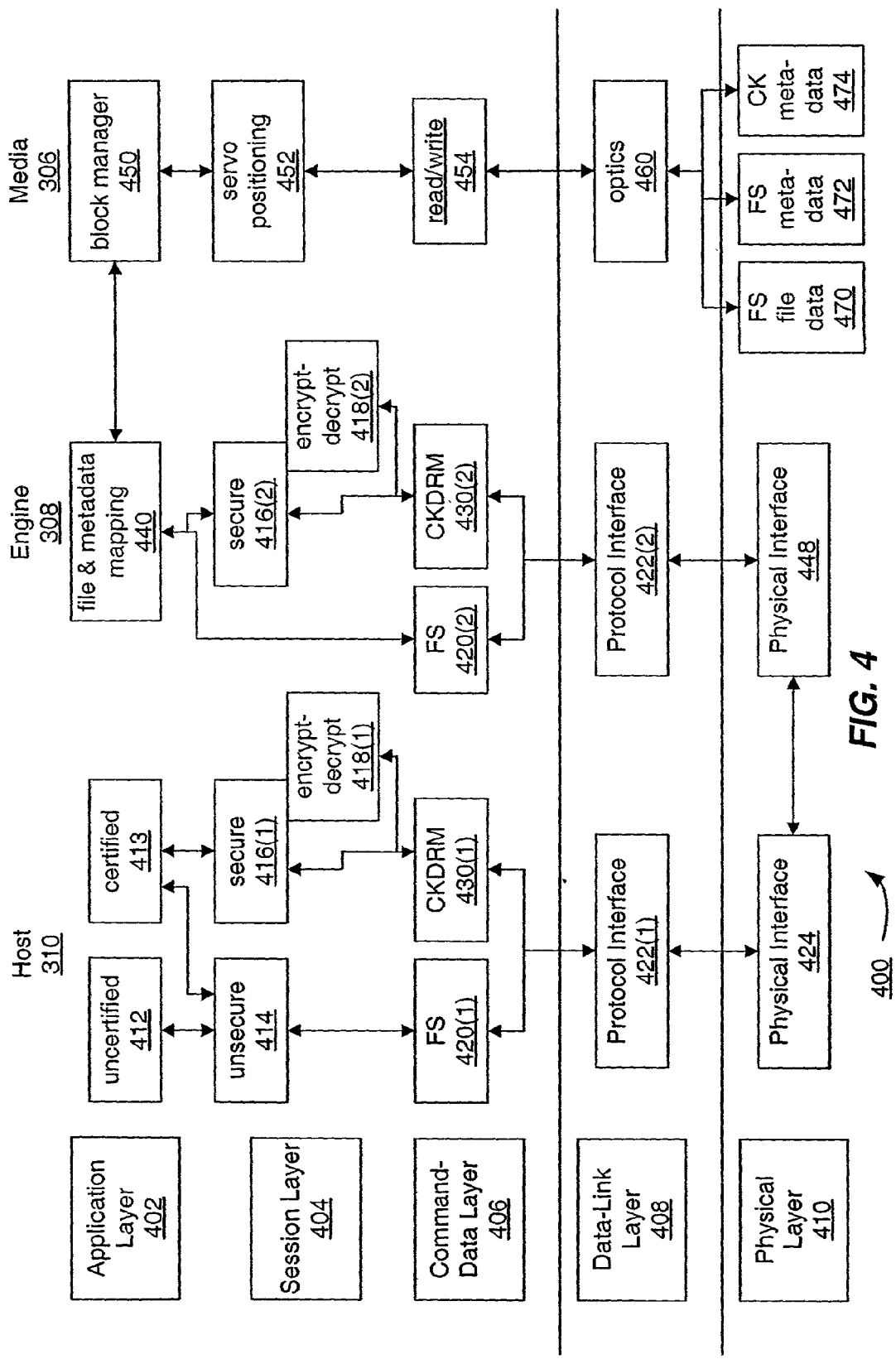
FIG. 4 illustrates an Open System Interconnection Model (OSI Model) of a secure electronic content system architecture in accordance with an embodiment of the present invention.

Referring now to FIG. 4, an Open System Interconnection Model (OSI Model) 400 of the SEC system is shown that provides an overview of the architecture for supporting the functions described with reference to FIG. 2 and other functions.

In FIG. 4, the layered OSI model 400 shows the supported paths in the host 310, engine 308 and media 306. As shown, FIG. 4 includes a physical layer 410, a command-data layer 406, a data link layer 408, a session layer 404 and an application layer 402. FIG. 4 describes each of the layers with reference to components of interconnection between a host 310, an engine 308 and digital media 306. Interconnections outside of the host 310, engine 308 and digital media are within the scope of present invention and the exclusion with reference to FIG. 4 is by no means intended to be limiting.

The OSI model 400 is described below with reference to the flow of electronic content as shown in FIG. 2. A media 306, such as a disk or other portable media, or media permanently stationed in an engine 308, includes file system file data 470, file system metadata 472 and CKDRM metadata 474 as part of its physical layer. At the host 310 and the engine 308, the data flows through physical layer interfaces 424 and 448. The data on the media 306 flows through a data link layer 408 that interprets the data in optics 460 in an optical disk embodiment. One of skill in the art will appreciate that the interpretation of other types of media will require other interpreters, for example, a magnetic interpreter for magnetic media, etc. In the host 310 and the engine 308, an interface protocol 422 provides the data link layer 408.

At the command data layer 406, a player reads or writes to the media 306 via read/write 440. In the host 310 and the engine 308, at command data layer 406 the interface protocol runs either a file system 420 and/or the CKDRM 430, depending on data read at read/write 454. More particularly, according to one embodiment, a host 310 must be certified at the application layer 413 to run CKDRM 430. The certification process as more fully described below, determines whether the host 310 is secure 416 or insecure 414. A certified host runs encrypt-decrypt processes in the session layer 404 to authenticate a channel as more fully described herein. An uncertified host 412 runs insecure processes 414 at the session layer 404 via an open file system 420.

For insecure content, the engine 308 performs file and metadata mapping 440 at the application layer and runs open file systems 420 at the command data layer 406. For secure content, the engine 308 processes files and maps metadata at block 440, but also encrypts and decrypts the secure data at the session layer via secure 416(2) and encrypt-decrypt 418 (2) Fiji using the CKDRM rules 430 at the command data layer 406. In an embodiment, the host 310 and the engine 308 work with the media by having servo positioning 452 direct a player to locations on the media 306 where secure content should be found at the session layer 404. The secure and insecure data are then managed at block manager 450 at the application layer 402.

FIG. 4 illustrates the inability of uncertified host applications 412 to gain access to secure sessions 416(1), data encryption or decryption 418(1), and CKDRM commands 430(1) and 430(2). FIG. 4 further illustrates the ability of certified host applications 413 to access all of the file system methods available to uncertified applications via file system 420.

CKDRM Security—Overview

Figure 5A:
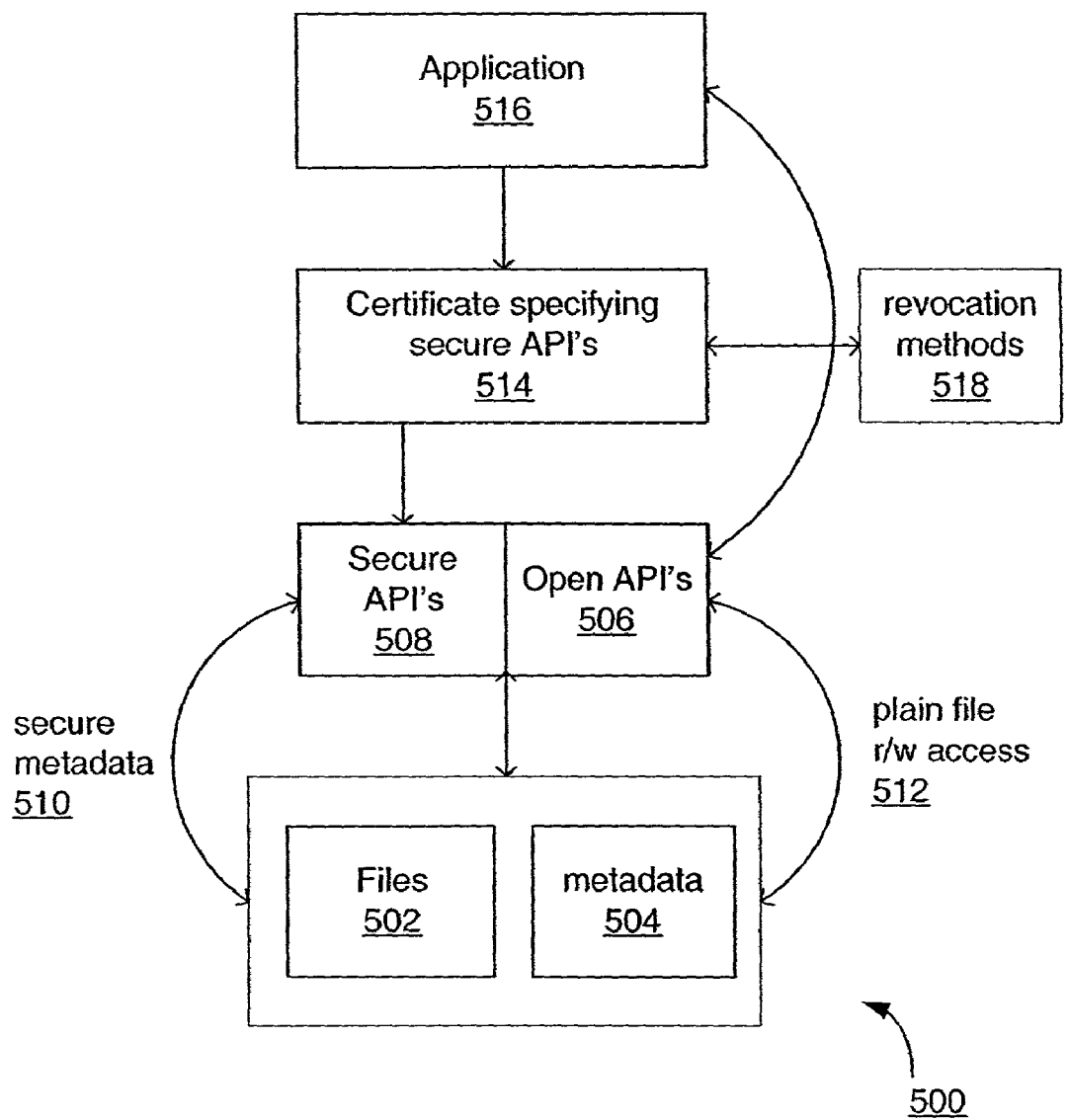
FIG. 5A illustrates content flow for secure and insecure metadata according to an embodiment of the present invention.

Referring now to FIG. 5A, an overview of the CKDRM security 500 is described. The CKDRM implements an efficient security model wherein electronic content is created and secured via an application 516 and represented in files 502 as well as metadata 504. The content elements 502 and 504 are encrypted. Thus, when the content file 502 is read or copied through an open API an encrypted form is returned. When content is accessed for play or handoff to a TPDRM the content with a lighter form of encryption may be returned.

Access to secure content 502 and 504 is through open APIs and secure APIs 506 and 508, respectively. Open APIs 506 only allow plain file read and write access 512; the secure metadata and unencrypted content are not available via open APIs 506. Further, neither secure APIs 508 nor open APIs 506 expose raw content or block access to the media. The secure APIs 508 have restricted access to content 502 and 504 in that only secure APIs may retrieve secure metadata 510. Further, the access is subject to revocation in revocation methods 518.

The open and secure APIs 506 and 508 highlight a crucial difference between a hard drive interface and an interface using APIs 506 and 508. According to an embodiment, block level access of contents on media is via firmware including a block driver. Block level access to content on a hard drive of a computer is generally accessible via only a block driver. The firmware prevents open access by not supporting block access for block drivers. The file system may be hierarchical in nature. In one embodiment, the media disk may have a writeable, write-once portion, and a read-only portion with premastered content. A media identifier may be in one or each of the portions and may or may not be the same identifier. Further, in one embodiment, the identifier is read from the media disk and extracted for use in an application specific integrated circuit (ASIC) and/or firmware. The identifier may be used as a seed to an encryption block with or without a decryption block. In one embodiment, the encryption block may be a triple-DES block.

Figure 5C:
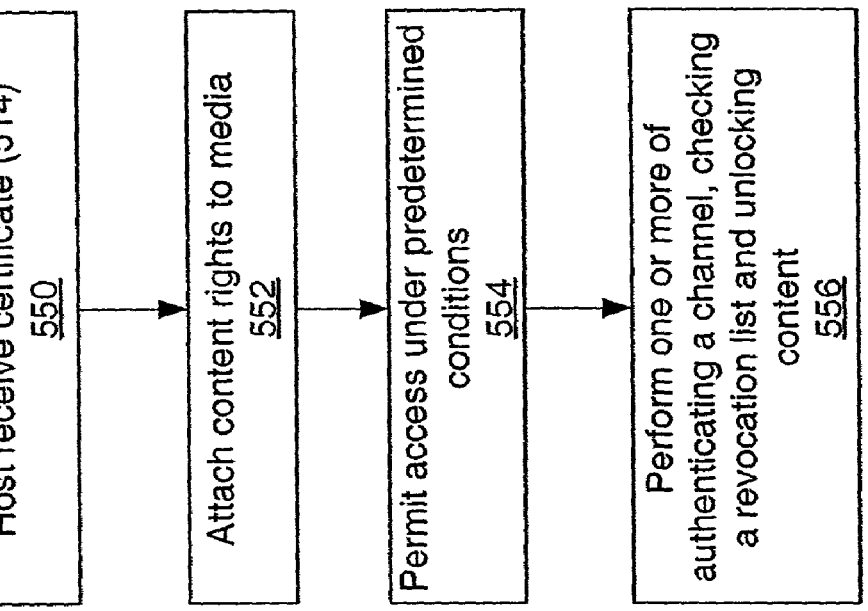
FIG. 5C illustrates a certification procedure according to an embodiment of the present invention.
Figure 5B:
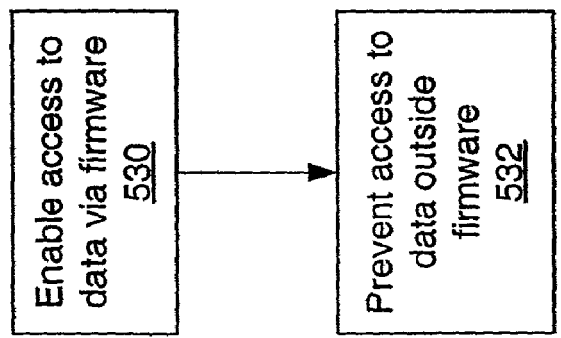
FIG. 5B illustrates a secure method of extracting data from media according to an embodiment of the present invention.

Referring to FIG. 5B, a method according to an embodiment is directed to media including an identifier, and more particularly, to a secure method of extracting data from media. Block 530 includes enabling access to the data via firmware. The data may be stored in blocks and accessible via a block driver within the firmware. Block 532 provides for preventing access to the data outside the firmware. In one embodiment, the firmware is included within an application specific integrated circuit (ASIC). The firmware and the ASIC may be within a host. In one embodiment, the firmware may include, a TPDRM API, a CKDRM API and/or a DFS API.

Referring back to FIG. 5A, the block diagram further shows that access to the secure APIs 508 and secure content 502 and 504 is further restricted by requiring a certificate 514. According to a certification procedure shown in FIG. 5C, in block 550 hosts receive a certificate 514 from an entity controlling certification of hosts. The certificate 514 specifies the secure APIs 508 to which an application 516 may have access. In this embodiment, a host includes any physical device that embeds an engine, a TPDRM, an application running in an open computing environment, or a clearinghouse server. More particularly, CKDRM Certificates may be signed by a private key assigned according to a class of device. In one embodiment, private keys are used only for one class, and the corresponding public key belongs to a class of devices. The device classes may include engines, host devices embedding an engine, but with no external digital I/O port, host devices embedding an engine, and with digital I/O ports, and host applications not embedding an engine. In one embodiment, engines have the public keys for the devices they wish to authenticate, and the engine may need only to authenticate one embedding host.

Referring to FIG. 5C, in block 552, to enable an engine-to-engine copy function, each engine receives a certificate. Engines also need to authenticate host applications not embedding an engine by receiving a certificate. In block 554, the entity controlling certification cryptographically signs certificate 514. The certificate 514 specifies a category that designates the secure APIs 508 to which the certificate holder host receives access. In one embodiment, certificates 514 specify the company to which the certificate 514 was issued. In another embodiment, certificate 514 also specify one or more of the product category, product line, model, revision and serial number of the engine and/or host.

A certificate in accordance with an embodiment is shown below in Table 2A.

TABLE 2A

| Field # | Field Name | Assignment responsibility (source) |
| --- | --- | --- |
| 1 | CA Identifier, Version | Assigned by entity controlling certification of hosts |
| 2 | Sign Key ID | Assigned by CA |
| 3 | Exposed Methods | Assigned by CA to restrict host permissions |
| 4 | Company | Assigned by CA |
| 5 | Model ID, Revision | Assigned by Company |
| 6 | Metadata ID | Allocated by CA |
| 7 | Host Signature Key | Assigned by Company for Host Signature verification |
| 8 | CA Signature | Verifies all of 1-7 |
| 9 | Serial Number | Assigned by Company |
| 10 | Protocol Key | Assigned by Company for Secure Key Exchange |
| 11 | Host Signature | Assigned by Company. (The host protocol public key signed by the private key corresponding to the host signature public key) Verifies 1-10 |

The first eight items in Table 2A are supplied to a certifying authority (CA) by the company requesting a certificate. A company retains a private key that corresponds to the Host Signature Key. The CA signature is created using a private key that corresponds to a public key specified in a Signature Key ID. The first eight fields are returned to the manufacturer when a device passes qualification. The last three fields, 9-11, are added by the manufacturer.

As one with skill in the art with the benefit of this disclosure appreciates, the certificate enables an entity to control quality of hosts and engines by invalidating false devices, and devices with latent defects. In one embodiment, the fields 1-8 are issued by the entity controlling hosts and engines and provided to a device manufacturer. The device manufacturer then appends fields 9-11.

In one embodiment, the certificates have certificate classes that provide a set of methods that may be exposed as specified by a CKDRM certificate. Any combination of methods may be exposed by the certificate format. However, an example of possible exposed methods that may be exposed via the certificate class is provided in Table 2B.

As shown, the classes may include an engine, a player, a TPDRM domain, a CKDRM mastering tool domain, a kiosk, and a clearinghouse server domain. The exposed methods are TPDRM and CKDRM methods. Although any combination of exposed methods is possible for any particular class, Table 2B shows one possible embodiment.

TABLE 2B

| Class | Exposed Methods |
| --- | --- |
| Engine | CKDRM Copy |
| Player | CKDRM Record |
|  | CKDRM Play |
| TPDRM | CKDRM Record |
|  | TPDRM Copy |
|  | Read Secure Metadata |
|  | Write Secure Metadata |
| CKDRM Mastering Tool, Kiosk | CKDRM Record |
|  | Write Secure Metadata |
| Clearinghouse | CKDRM Record |
|  | CKDRM Unlock |

Referring back to FIG. 5C, in one embodiment, in block 556, a SEC system may provide for host sanctioning. More particularly, in host sanctioning CKDRM secure APIs are available only to hosts that are officially and formally sanctioned by an entity, such as DataPlay, Inc. The authorization, in an embodiment includes issuance in block 556 by the entity, such as DataPlay, Inc., of a certificate indicating the CKDRM secure APIs that are available.

Another more specific form of a CKDRM Certificate Format is provided below in

TABLE 2C

| Byte Offset | Field Name | Type | Value |
| --- | --- | --- | --- |
| 0:1 | CAIdentifier | U16 (Unsigned 16 bit value) | Assigned by entity such as DataPlay ™. |
| 2:3 | CertificateFormat Version | U16 | Assigned by CA. |
| 4:5 | CASignaturePublic KeyId | U16 | Assigned by CA. |
| 6:7 | Cryptography Version | U16 | Assigned by CA. |
| 8:9 | ExposedMethods | EXPOSED_METHODS: Set of 16 flags representing methods in TABLE 2B | Assigned by CA. Identifies exposed methods by horizontally encoding each method with an assigned bit. |
| 10:15 | Reserved1 | U16[3] | Reserved. |
| 16:17 | Company | U16 | Assigned by CA. |
| 18:19 | Division | U16 | Assigned by Company. |
| 20:21 | Product Line | U16 | Assigned by Company. |

TABLE 2C-continued

| Byte Offset | Field Name | Type | Value |
|---|---|---|---|
| 22:23 | Model | U16 | Assigned by Company. |
| 24:25 | Revision | U16 | Assigned by Company. |
| 26:27 | MetadataIdentifier | U16 | Allocated by CA. |
| 28:31 | Reserved2 | U16[2] | Reserved. |
| 32:77 | CompanySignaturePublicKey | PublicKey (46 bytes) | Assigned by Company. |
| 78:121 | CASignature | Signature (44 bytes) | Assigned by CA. The value is the above data signed by the private key corresponding to CASignaturePublicKeyId. |
| 122:137 | DeviceIdentifier | U128 (16 bytes) | Assigned by Company. |
| 138:183 | ProtocolPublicKey | PublicKey | Assigned by Company. Used by engine for public key encryptions in some protocol steps such as session key exchange. |
| 184:227 | Company Signature | Signature | Assigned by Company. The value is the rest of the certificate signed by the private key corresponding to the Host Signature Public Key. |

The fields in Table 2C include the following: CAIdentifier uniquely identifies the CA; CertificateFormatVersion uniquely identifies this version of the CKDRM certificate format; CASignaturePublicKeyId is selected by the CA; CryptographyVersion uniquely identifies the cryptographic methods used by the certificate; ExposedMethods identifies the CKDRM methods to which this certificate allows access The fields ExposedMethods fields are shown in Table 2D (EXPOSED_METHODS type):

TABLE 2D

| Bit Name | Description |
|---|---|
| HOST_CKDRM_COPY | Indicates whether the CKDRM Copy method is allowed. |
| HOST_CKDRM_RECORD | Indicates whether the CKDRM Record method is allowed. |
| HOST_CKDRM_PLAY | Indicates whether the CKDRM Play method is allowed. |
| HOST_CKDRM_UNLOCK | Indicates whether the CKDRM Unlock method is allowed. |
| HOST_DRM_COPY | Indicates whether the TPDRM Copy method is allowed. |
| HOST_READ_SECURE_METADATA | Indicates whether the Read Secure Metadata method is allowed. |
| HOST_WRITE_SECURE_METADATA | Indicates whether the Write Secure Metadata method is allowed. |

The fields in Table 2C further include fields that are more specifically described below.

A company may uniquely identify the company to which the certificate is issued. In one embodiment, for example, the field size supports 65,536 different companies. However, as one of skill in the art appreciates, a larger or smaller size field is within the scope of the present invention. The exemplary field size shown in Table 2C supports, at a rate of 10 per day, 365 days per year, 18 years of valid certificates.

The company may further supply the Division, ProductLine, Model and Revision values of their choice to the CA. Together, the information supplied uniquely identifies the product design to which the certificate is issued.

The CA allocates MetadataIdentifier values. These uniquely identify access to secure metadata in the Read Secure Metadata and Write Secure Metadata methods, as explained in greater detail below.

The Company also supplies the HostSignaturePublicKey with the Company retaining the corresponding private key. CompanySignature is created using this corresponding private key and is verified with CompanySignaturePublicKey.

CASignature is created using the private key that corresponds to the public key specified by CASignaturePublicKeyId.

The last three fields may be added by the Company on a device-by-device basis. DeviceIdentifier is a value such as a serial number that uniquely identifies the device to which the certificate is issued. ProtocolPublicKey is selected by the Company; the corresponding private key is embedded in the device.

In one embodiment, when encrypting with the host's public key in the CKDRM protocols, ProtocolPublicKey is used, not CompanySignaturePublicKey. CompanySignaturePublicKey is used only to authenticate ProtocolPublicKey through CompanySignature.

Each of the fields discussed above may be presented as the CKDRM Certificate. Further, the MetadataIdentifier field in combination with the Company field identifies a host for purposes of access to secure metadata. The values may be allocated by the CA in response to requests for new values from the Company.

The fields in the certificate are designed to carry 326-bit public key values for 163-bit elliptic curve cryptography. However, other sized values and types of cryptography are within the scope of the invention.

There are a number of circumstances in which an invalidated device can be discovered using the certificate. Referring to FIG. 5A, one of revocation methods 518 includes transmitting an encrypted identifier from the device via a communication channel and receiving a certificate identifying the device as one of an authenticated device and a non-authenticated device.

In one embodiment, revocation methods 518 revoke compromised certificates and cryptographic keys. Specifically, revocation methods 518 revoke compromised certificates and private keys. In one embodiment, information as to whether certificates and/or private keys have been revoked is stamped on the media. Thus, revocation is enforced in stand alone, unconnected environments.

APIs 506 and 508 shown in FIG. 5A may be encrypted. Further, cryptographic keys with which the content/API is encrypted may themselves be encrypted. By encrypting content it is possible to allow open file system read access to files containing content. The file system reads and delivers the encrypted content without the decryption keys. When access is made through a secure protocol, the content may be delivered in a form that is different from the stored form. Thus, according to an embodiment, even if playback keys are compromised there is not enough information to decrypt any open API files.

According to a further embodiment, cryptographic keys are bound to the media. Thus, content access follows the media and access rights are not bound to a particular playback device. In the embodiment, key binding not only stores the keys on the media, but also encrypts the keys to media identifiers. Therefore, the content being doubly encrypted, when and if bound play or copy keys are compromised there is not enough information to decrypt the content. Referring to FIG. 5C, the binding of keys to the media is described in a flow diagram. As shown, block 552 provides that a method of securing content stored on media includes attaching content rights to the media. The attaching of the content rights to the media may preclude content being located in a player or engine. Rather, a player or engine may operate to render the content stored on the media only. Block 554 provides for permitting access under predetermined conditions. The access to the content as described in block 554 may include one or more of playback of contents, copying of content, allowing one or more copies or a limited number of copies. The predetermined conditions identified in block 554 may include following an authentication procedure as outlined in FIG. 6, and may include authenticating a channel for delivery of content, checking a revocation list and unlocking content. In one embodiment, the unlocking is according to a method performed between an engine and a server as further explained below. Unlocking may entail, connecting with a server, following a protocol to retrieve a secure key, and using the secure key to unlock one or more portions of the content. Block 556 provides for performing one or more of authenticating a channel, checking a revocation list and unlocking content.

Figure 6:
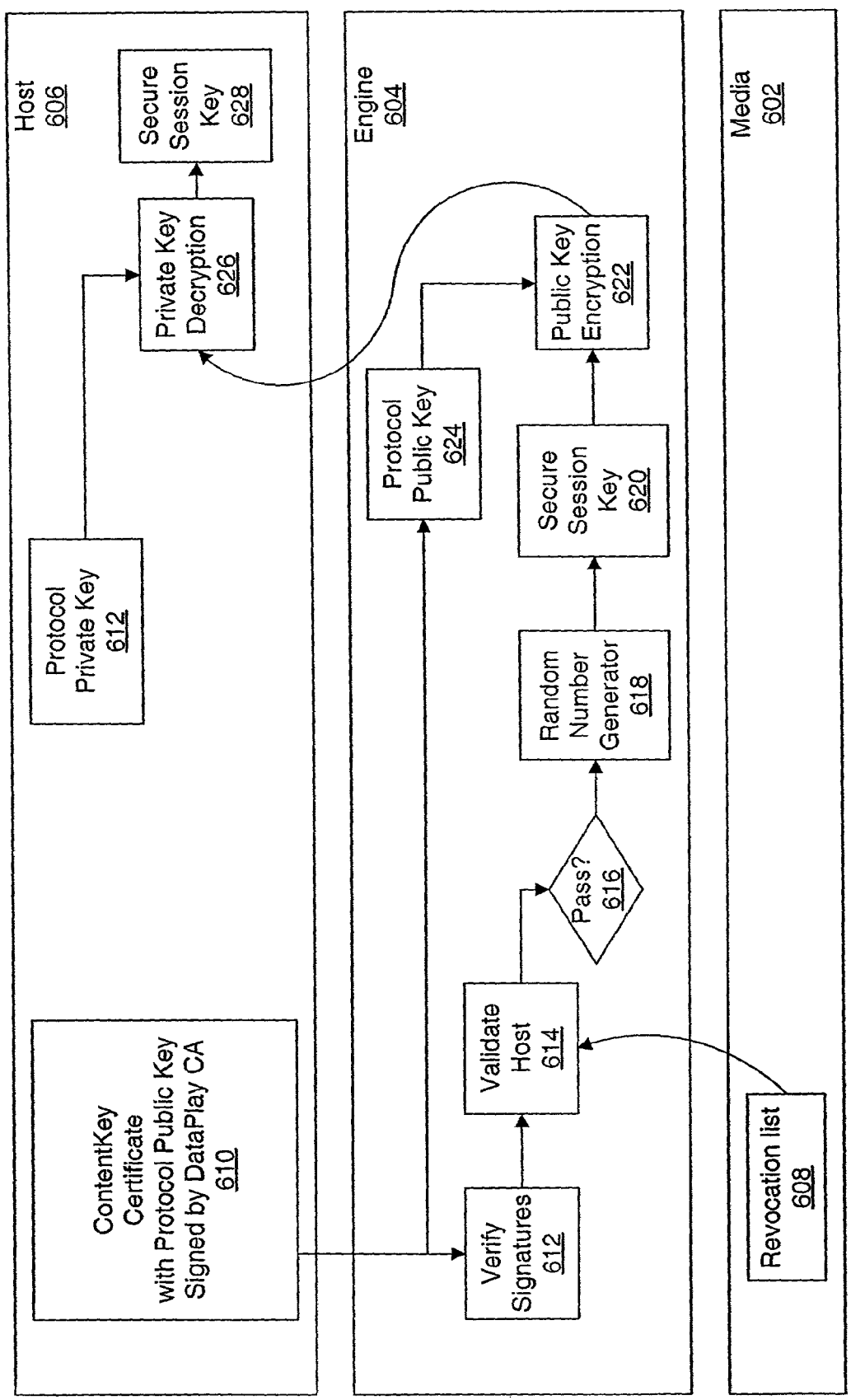
FIG. 6 illustrates a procedure using a certificate to establish a secure authenticated channel according to an embodiment of the present invention.

FIG. 6 illustrates an embodiment of an authentication procedure 600. The three components required for certification according to the present embodiment include media 602, engine 604 and host 606. The host 606 holds a certificate 610 with protocol public key signed by a CA. Additionally, the host 606 holds a protocol private key 612. The certificate 610 is received via a communication channel by the engine 604 and signatures on the certificate are verified at block 612. Referring to Table 2C in combination with FIG. 6, a certificate is verified in two steps. First, signatures are verified in block 612. In one embodiment, all but the last three fields are verified with the field CASignature and the public key specified by CASignaturePublicKeyId in block 612. Thus, the authenticity of these fields including CompanySignaturePublicKey is established. Second, in block 612 the host is verified, which, in one embodiment the whole certificate is verified with CompanySignature and the CompanySignaturePublicKey. Thus, the verification process is a double verification process.

In block 614, the host is verified for revocation. Revocation is available at all of the levels of granularity of the certificate as implied by all of the fields. Part of the validation, in one embodiment, requires checking a revocation list 608 on media 602. The engine 604 retrieves the revocation list 608 from the media 602. If the validation process 614 passes at block 616, the engine 604 generates a random number via random number generator 618 to obtain a first portion of a secure session key 620. The engine 604 performs a public key encryption 622 using the first portion of the secure session key 620 and a protocol public key 624 retrieved from the certificate 610. The host 606 receives the encrypted session key, decrypts the encrypted session key at block 626 and produces the secure session key 628.

Figure 7A:
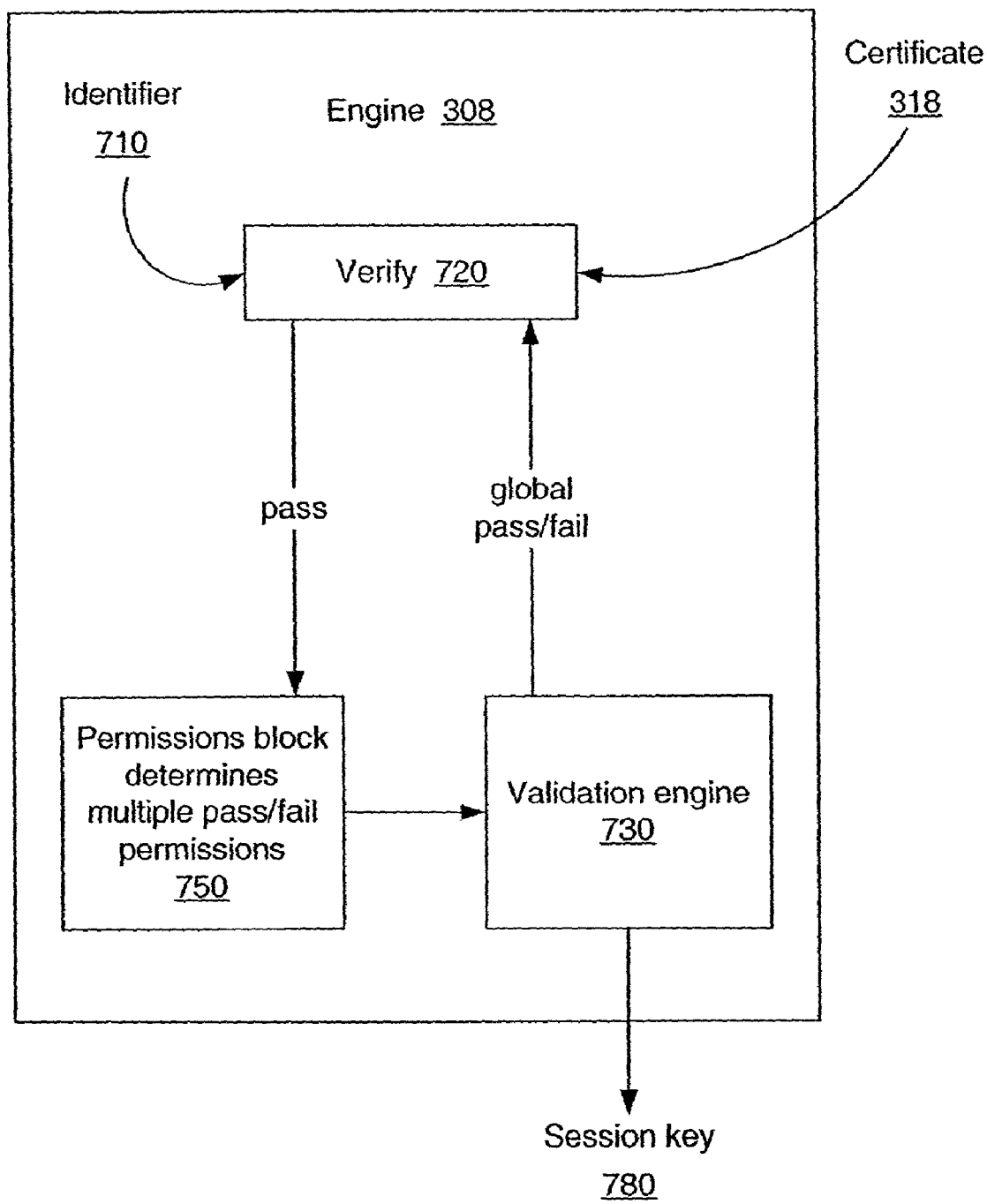
FIG. 7A illustrates an apparatus that performs a verification process according to an embodiment of the present invention.

Referring now to FIG. 7A in combination with FIG. 3, the apparatus that performs the verification process is shown. In one embodiment, the apparatus is part of the engine 308. FIG. 3 illustrates that a communication channel couples the engine 308 to a host holding a certificate 318. The certificate 318 is received and an identifier 710, which could be implemented as a public key, is compared within the engine with a verify function 720. More specifically, the verify function 720 receives both the identifier and an output from a validation engine 730. The validation engine 730 produces a global pass/fail indication that is output to the verify function 720. The verify function 720, if it receives a fail indication from the validation engine 730, will deny further access to content. If a global pass indication is received, the verify function 720 communicates a pass indication to permissions block 750. Permissions block 750 includes multiple pass/fail permissions for the player 310 that are provided to validation engine 730. After processing the permissions, the validation engine 730 outputs a session key 780 permitting data delivery.

According to one embodiment, each time a device is coupled via a communication channel an authentication process begins. Each device is qualified each time the encrypted identifier is received. Thus, a method for certifying a device includes transmitting an encrypted identifier from the device via a communication channel and receiving a certificate identifying the device as one of an authenticated device and a non-authenticated device. Referring to FIG. 7B, a method for securely delivering data across a channel is shown in flow diagram form. The method for authenticating a destination for the data includes receiving a certificate from the destination in block 702 and, in block 704, using an identifier to qualify the destination. The method continues in block 706 with transmitting a session key. The session key allows the delivery of the data according to predetermined criteria in the certificate.

As described above, the certification procedure certifies and the authentication procedure authenticates hosts and engines. Authentication allows an entity to verify and validate another. The result of a successful authentication is that one entity knows the public key and other attributes of the other entity. Successful authentication also results in the establishment of an authenticated channel through which the allowed secure API's are exposed.

The host, according to an embodiment, is one of a player, a player in a PC, a player in a device, a clearinghouse, a server, and a TPDRM application. According to one embodiment, a revocation list is stored on media inserted into an engine. The revocation list is used in the validation process. Thus, if a known serial number for a device relates to a compromised or later rejected manufacturer, the host will not be authenticated. In a further embodiment, the revocation list can be copied on each device to prevent the device from playing, or the revocation list can remain media dependent. Thus, when disks are released to market with prerecorded content, or when blank disks are manufactured, new revocation lists may be included on the disks so that appropriate players and hosts may be found and invalidated. Additionally, in another embodiment, revocation lists may be maintained by a server such that players communicating with a server will receive updated revocation lists directly to the engine during changing state processes, such as unlock and lock.

In a further embodiment, a plurality of revocation lists are stored on media on a file by file basis, such that one or more files on the media may have a revocation list associated with the file. In this embodiment, the revocation list(s) is accessed, not during an authentication process, but during a file access process, or a combination of both an authentication and a file access process.

Referring to FIG. 7C, a method for revoking a content rendering device is provided. FIG. 7C begins with block 712, wherein a revocation list is evaluated upon a file access. In one embodiment, each file may have one list, with duplicative entries being limited by centrally storing the details and providing each file with a list of identifiers or pointers that reference a location of complete details regarding revocation information. The revocation information, hereinafter referred to as a node, is centrally located with a unique identifier. Each file may optionally have list node identifiers instead of storing complete revocation information. In block 714, upon a file access and evaluation of revocation information, the result for each node is stored. The authentication process may include reading evaluation results rather than re-executing an evaluation, i.e., each node may be pre-evaluated.

In one embodiment, as shown in block 716, the revocation list is copied onto the engine from media and could include a "poison pill" that prevents a player from working if it is not a proper player, if the manufacturer had defects, latent defects, or the like. The revocation list can be updated, as shown in block 718, when a player is connected to a server to unlock data.

In one embodiment, revocation of a content rendering device includes at least revocation of one or more signature keys. In the embodiment, the revocation of the one or more signature keys also revokes, in block 722, a set of CKDRM Certificates signed with the one or more keys. More specifically, the revocation of a signature key will revoke any corresponding signature.

In one embodiment, the key signature list that is stored in non-volatile memory in an engine is not capable of update outside of a manufacturing process. In this embodiment, the key signature list may be revoked on a per-media basis by revoking a particular index value in the CA Signature Public Key ID field of the CKDRM Certificate.

Referring back to FIG. 7C, revocation lists are used to provide a mechanism to prevent access to CKDRM methods for a given device or set of devices. The CKDRM revocation method allows revocation to occur on any of the fields within the host certificate. Therefore, revocation may be as explicit as a single Device Identifier or Protocol Public Key, or as broad as an entire company, or perhaps a particular product line, or a particular product model as shown in block 724.

As discussed above, each file may have an associated revocation list. The revocation list is associated with the file during a create-file command. The revocation list is transmitted to the destination copy during the CKDRM Copy method.

A revocation list may be made up of a list of revocation nodes. Each revocation node is made up of a list of clause nodes and a rule of how to combine the clauses to determine revocation for the node. Each clause node is made up of a set of data and functions that define how to apply the data and evaluate them against the fields in a received CKDRM Certificate.

Referring to FIG. 7D, the evaluation of a revocation list is described. Block 732 provides for evaluation of the data in a clause node according to the function results of a true or false result when evaluated against the contents of a CKDRM certificate. A set of results from the clause nodes are combined in block 734 according to the clause rules to result in a true or false result for the revocation node. If any revocation node in the revocation list evaluates to true, in block 736 the host is revoked.

Table 2F provides one exemplary embodiment of a revocation list.

TABLE 2F

| Byte Offset | Field Name | Type | Value | Description/Usage |
| --- | --- | --- | --- | --- |
| 0:1 | ByteCount | U16 (unsigned 16 bit value) | i | The number of bytes, i, in this revocation list including this field. This value must be greater than or equal to 4. The NodeCount field must be present. |
| 2:3 | NodeCount | U16 | j | Number of nodes, j, in this revocation list. |
| 4:i-1 | RevocationNodeList | REVOCATION_NODE[j] | | Each entry defines a revocation node. |

Table 2G provides an embodiment of a revocation node structure.

TABLE 2G

| Byte Offset | Field Name | Type | Value | Description/Usage |
|---|---|---|---|---|
| 0:1 | ByteCount | U16 | k | The number of bytes, k, in this revocation node including this field. This value must be greater than 4. Empty ClauseNodeLists are not allowed. This value must be less than 1500. No revocation node may be over 1500 bytes in size. |
| 2 | ClauseCount | U8 | l | Number of clauses, l, in this revocation node. |
| 3 | ClauseRules | U8 | | Defines the rules associated with evaluating the combination of clauses. See ClauseRules encoding for values. |
| 4:k−1 | ClauseNodeList | CLAUSE_NODE[1] | | Each entry defines a clause. |

Table 2H provides an embodiment of a clause node structure to support multiple functions with a general format.

TABLE 2I

| Byte Offset | Field Name | Type | Value | Description/Usage |
|---|---|---|---|---|
| 0:1 | ByteCount | U16 | 2m + 4 | The number of bytes, 2m + 4, in this clause node including this field. The value of m must be positive. Empyt FunctionData arrays are not allowed. |
| 2:3 | Function | U16 | | The function to perform for this clause of the revocation. The only defined function is Match. |
| 4:2m + 3 | FunctionData | U16[m] | | The m words of data to use to perform the function |

Table 2J provides for an exemplary clause node structure 35 for a match function:

TABLE 2J

| Byte Offset | Field Name | Type | Value | Description/Usage |
|---|---|---|---|---|
| 0:1 | ByteCount | U16 | 2n + 8 | The number of bytes, 2n + 8, in this clause node including this field. This value of n must be positive. Empty MatchData arrays are not allowed. |
| 2:3 | Function | U16 | Match | The function to perform for this clause of the revocation is the Match function. |
| 4:5 | StartWord | U16 | | The offset in the ContentKey Certificate at which to start the Match function. |
| 6:7 | WordCount | U16 | n | The number of words to match, n, starting at offset StartWord. |
| 8:2n + 7 | MatchData | U16[n] | | The value of the n words to match. |

In one embodiment and engine receives revocation lists during the CKCMD_CREATE_FILE or CKCMD_SET_KEYBOX command. The revocation list for multiple files may contain revocation nodes that are already present on the media.

On the media, a revocation list may be maintained as an object within the DFS file system with a separate and distinct handle that is not a file or directory. The DfsId field may be used as a reference number for files to use in the RevocationIdList field of the ContentKey metadata structure.

For this embodiment, an exemplary revocation node structure may be that shown in Table 2K.

TABLE 2K

| Type | Name | Description/Usage |
|---|---|---|
| struct META * | psNext | Internal pointer for linked list. |
| DFSID | DfsId | Handle of the revocation node. |
| DFSFLAG | Flags | Internal use flags-a bit defining this item as a REVOCATION_NODE is set. |
| U8 | Evaluation Result | A tri-state flag indicating REVOKED, NOT_REVOKED, NOT_EVALUATED. |
| REVOCATION_NODE | Revocation Node | The actual data contained in the revocation node, as passed in by the host. |

Referring to FIG. 7E, a method performed by an engine when presented with a revocation list is provided.

Block 752 provides that during allocation of the CKDRM metadata, use the NodeCount value to create enough space in memory for a list of 16-bit identifiers that will reference each revocation node. In block 754, for each node in the revocation list, the engine compares the node to each node that is in the existing revocation list. In block 756, if an identical node is found, add the DfsId number of the existing node to the RevocationIdList in the CKDRM metadata structure. In block 758, if the node is not found, create a new node with a unique DfsId. In block 762, the engine adds the new DfsId value into the ContentKey metadata structure.

Figure 7F:
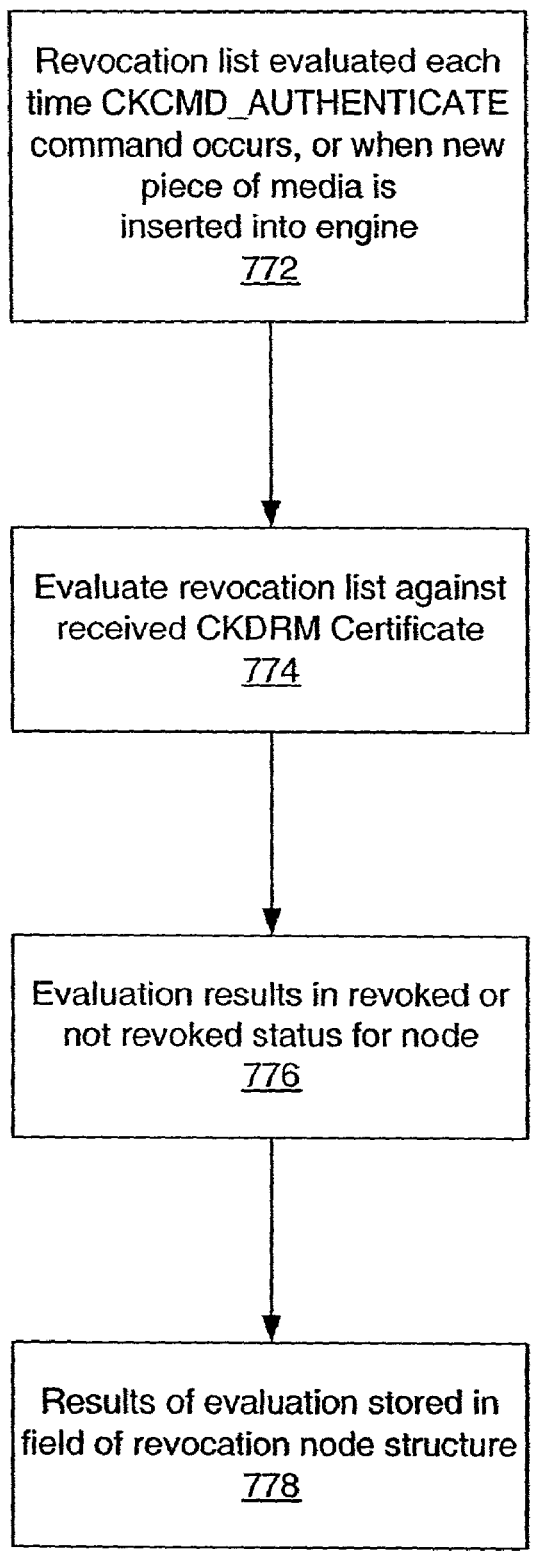
FIG. 7F illustrates the evaluation method for revocation list results according to an embodiment of the present invention.

Referring to FIG. 7F, the evaluation method for revocation list results is explained in detail. As shown, in block 772, the revocation list is evaluated each time the CKCMD_AUTHENTICATE command occurs, or when a new piece of media is inserted into the engine. In block 774, the revocation list is evaluated against a received CKDRM Certificate. For each node of the revocation list, in block 776, the evaluation results in a revoked or not revoked status for that node. Because nodes are file dependent, these states are evaluated each time a CKDRM operation that is specific to a particular file is attempted. Therefore, revocation results are finalized not by CKCMD_AUTHENTICATE, but rather from CKCMD_DRM_PLAY, CKCMD_GET_METADATA, CKCMD_GET_PLAY_KEY, CKCMD_PLAY, CKCMD_RECORD_APPEND, CKCMD_SET_KEYBOX, CKCMD_SET_METADATA, and CKCMD_UNLOCK_FILES. The commands are discussed in further detail below. In block 778, the results of evaluation are stored in a EvaluationResult field of the Revocation node structure.

Mastering Process

Figure 7G:
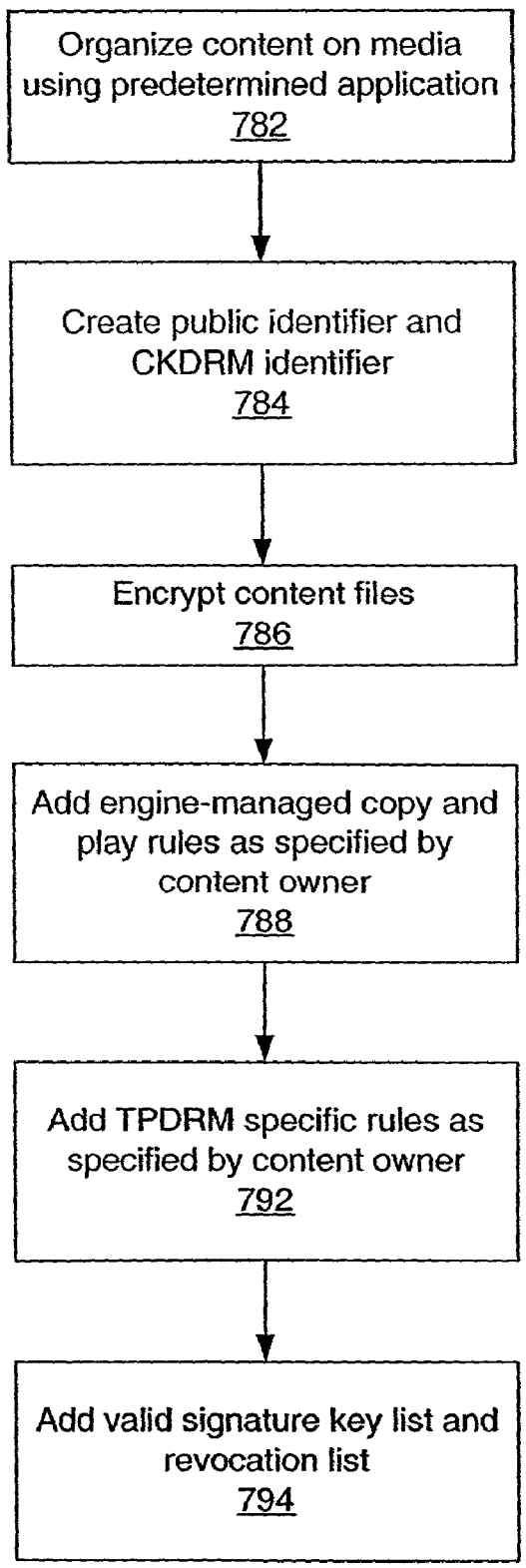
FIG. 7G illustrates a method for organizing content according to an embodiment of the present invention.

Another part of the security system requires a mastering process. The media disks discussed herein, in an exemplary embodiment, organize content according to the method shown in FIG. 7G. As shown, the method begins with block 782, wherein content is organized on the media using a predetermined application. In one embodiment, the application uses a dongle attached to a machine that is running a tool. Within the dongle, an ASIC with an embedded random key generator may act as a secret key generator. In another embodiment, the application is not part of the mastering process, but is delivered as a DLL or library to third-party authoring houses. The DLL or library may require a third-party authoring house to authenticate itself to the DLL or library prior to creating CKDRM content. In another embodiment, the dongle and the application work together such that the dongle does not work except with a particular registered version of a DLL or library.

In one embodiment, the application is responsible for content security by, as shown in block 784, creating a public identifier and a CKDRM identifier; in block 786, encrypting the content files; in block 788, adding engine-managed copy and play rules as specified by the content owner; in block 792, adding TPDRM specific rules as specified by the content owner; in block 794, adding a revocation list. As one of skill in the art will appreciate, however, the functions performed by the mastering application may include a portion, all or one of the above-provided functions.

The application discussed above could be a part of a mastering, an authoring or a premastering portion of manufacturing a media disk. Thus, for example, the application includes a business method for creating locked and unlocked content on a disk wherein the mastering process is followed by an authoring process, followed by a premastering process.

In one embodiment, the use of mastered content on the disk provides a method of detecting counterfeit disks posing as pre-mastered disks. For example, as discussed below, in an embodiment, an identifier for pre-mastered disks has at least a portion of the identifier pre-mastered. This enables detection of identifiers posing as pre-mastered, as more fully explained herein.

Figure 7H:
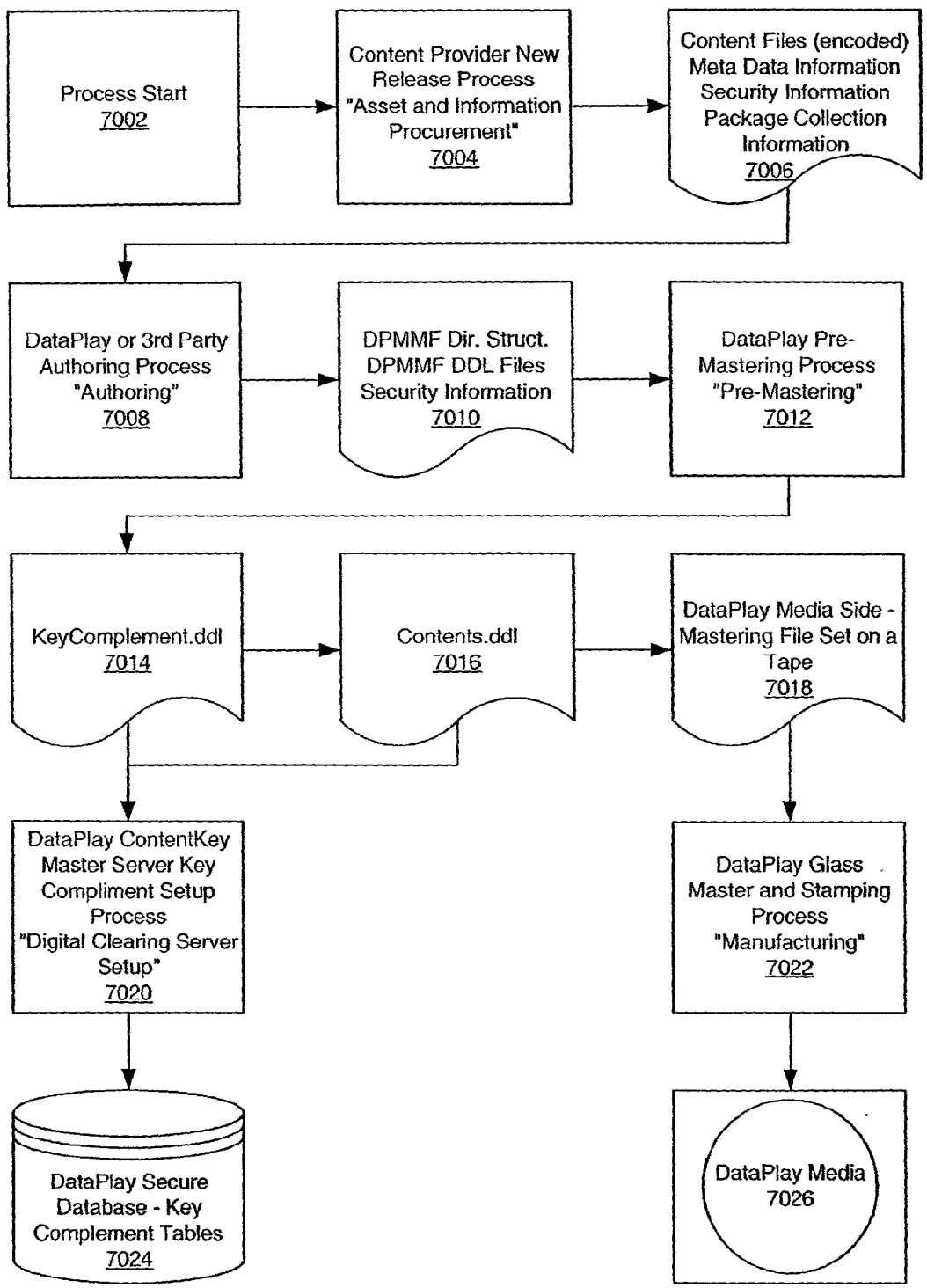
FIG. 7H illustrates a mastering process.
Figure 71:
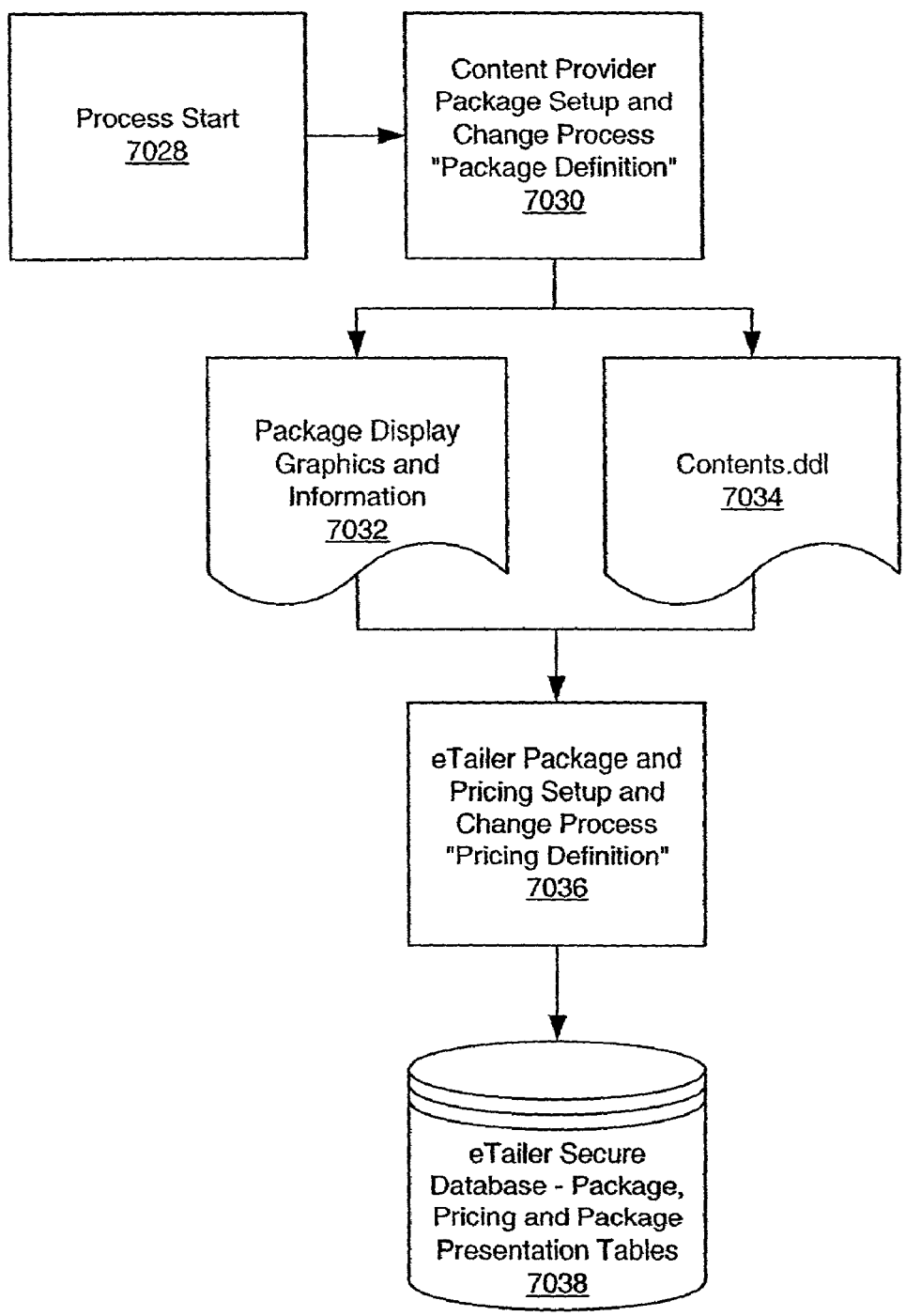

Referring now to FIG. 7H, a process flow diagram presents one embodiment of a process flow for a process including a mastering process for creating media and setting up a clearing type server. The process begins at block 7002. Block 7004 provides for a new release process for asset and information procurement. Block 7006 provides that one or more of content files, metadata information, security information and package collection information is transferred to media. Content files may include files that a consumer or user will play and any asset files tied to particular content. In one embodiment, the process assumes that all files are encoded with a proper media coder-decoder (codec). The metadata information provides a description of the assets that will accompany a content file. The metadata information may include graphics and lyrics. In an embodiment, the information is provided in a structured format which may are may not be in a standard format for all content providers. In one embodiment, the metadata is on a per-track and per-media basis. The security information transferred to the media provides rules governing the way the consumer or user can interact with the content. The interactions with the content may include copying, rendering, and manipulating the content, as in, for example, placing notes in a margin or electronic highlighting of electronic books.

In one embodiment the rules provide a revocation list and TPDRM rules for a third-party digital rights management scheme. The TPDRM rules provide the rules that the consumer may be restricted to regarding playing and copying content. The TPDRM rules further include details such that authoring and mastering process as described herein receive data as to the files that are initially locked. In one embodiment, a revocation list is defined by a content provider, the revocation list providing a list of all player devices, player applications and servers that have been revoked for reasons determined by a revoking party. The package collection information provides a specification as to how any secondary content is to be grouped and how it should be displayed to a user or consumer. The package collection information must include specifications for each package, such as display images and package description.

Block 7008 provides for an authoring process wherein all the files provided by a content provider are packaged according to predetermined specifications. In one embodiment, the specifications include organizing the data in a directory structure such as a DataPlay MMF directory structure. In one specification, the structure requires directories containing encoded content files, a directory structure, a content manager, an autorun.inf and a contents.ddl file. More specifically, the content manager provides files that are used to present the content on media to a consumer or a user, such as an executable file, a mini-website, or a proprietary or form defined by a content provider. The autorun.inf file provides data to the autorun handler as discussed herein and interacter therewith to launch the content manager. The contents.ddl file may be stored within the MMF directory structure to be used with a TPDRM. The contents.ddl file may include a package collection, advertisements and package SKUs. More particularly, a package collection may include a unique identifier for all secondary content on a side of a media and may contain a reference to one or more advertisements. The advertisements may be grouped as a package and used by a presentation layer to display the secondary content and offers. An SKU herein may be defiend by a content provider and reference one or more files on the media. The MMF DDL files include files that describe the relationship between content and asset files.

As part of an authoring process, a content provider chooses whether to use a CKDRM, TPDRM, or a combination of both DRMs. After and depending on the DRM chosen, content files are packaged with encryption and all content and files as necessary for the chosen DRM to work properly. Block 7012 provides for a pre-mastering process in which a master file set is stored and delivered on a media, such as a tape. In one embodiment, each file set may provide a single side on a media disk. Another process performed in the premastering process is generating a keyComplement.ddl file that configures a secure database, such as the CKDRM secure database. The KeyComplement.ddl file may include a package collection identifier including a full file path, a file handle, a key complement such as a complement to a 128 bit number and a key version. Finally, the premastering process includes passing the contents.ddl file.

Block 7022 and 7026 provide for passing the mastered file set on a media such as a tape to a glass master for stamping the content in manufacturing to produce, in block 7026, a media disk. The glass masters create one or more stampers for mass producing the media disks that may be distributed to consumers or other users. On the server side, block 7020 provides that a master server receive data in a secure database. More particularly, a server process includes loading a key complement and package to a key mapping database table or tables with information specified in the keycomplement.ddl and contents.ddl files.

Referring now to FIG. 7I, the process described in FIG. 7H is performed with another process that may be performed at the same time as the process described in FIG. 7H. More particularly, FIG. 7I provides for creation of a package collection, packaged advertisements and SKUs to be provided during the process of FIG. 7H. Block 7028 provides for a start of the process to set up an Internet retailer (eTailer). Block 7030 provides for a content provider to perform a package setup and a change process "package definition." More particularly, in blocks 7032 and 7034, content providers provide eTailers with a contents.ddle file 7034 and package display graphics and information 7032 that may be part of a package presentation to a consumer or user. Generally, eTailers are interested in a packageCollectionSKU. ETailers may not be interested in a PackageCollectionID, which is passed to the eTailer via a URL. An eTailer may pass the PackageCollectionID to a clearinghouse server and then discard.

Block 7036 provides that an eTailer sets up and changes pricing for packages received based on packages specified as available by a content provider. In one embodiment, the configuring a databse with package pricing and package presentation data is defined completely or in pertinent part by an eTailer such that the configuration conforms with an existing format of the eTailer, such as a "shopping cart," or "catalog maintenance" format. Another configuration performed by an eTailer may include choosing to specify discount models and advertising. This embodiment enables an eTailer to advertise based on demographics and particular consumers and users.

Another aspect of the security provided by the SEC system relates to the use of one or more random number generators. As discussed, in one embodiment, a random number reaches the media via a mastering process. In another embodiment, a random number generator is also present within an engine. For example, each engine produced may include non-volatile memory holding a random number. One method of generating the random number, is by using high quality generation software, such as FIPS-186-compliant software. The random number generator within an engine may be receptive to seeding by one or more techniques. For example, a seed may be a random number created at the time a master is created; a random number created upon manufacturing of the engine; a random number created and embedded in the firmware; a PublicSideId; a number generated from a spin up time number; a number generated from a servo calibration time number; a seek time; BCA fields; a number generated from long-term collection data such as spin-up count, read/write error rate, or the like; a number generated from servo/read/write calibration values from manufacturing stored in the non-volatile memory; a number generated from calculating read-write-read timing; a number generated from inputs to analog-to-digital converters; and any number that may be a function of any of the above numbers.

Functions Between an Engine and a Host

Referring now to Table 3, functions for exchanging information between an engine and a host are illustrated. The host may be a Player, DRM, kiosk or server. In a copy mode, as further discussed below, a destination engine is a host.

TABLE 3

| CKDRM Functions | TPDRM Functions | DPS Functions |
| --- | --- | --- |
| CKDRM Play 312 | TPDRM Play 320 | File System Write 374 |
| CKDRM Unlock 360 | TPDRM Copy 340 | File System Read 372 |
| CKDRM Copy 330 | | |
| Record Unlocked content 362 | | |
| Record Locked content 364 | | |
| CKDRM Record 350 | | |

As shown, the primary functions include CKDRM play 312, TPDRM play 320, CKDRM copy 330, TPDRM copy 340, record content 350, including recording locked content 364 and recording unlocked content 362 and CKDRM Unlock 360. One media optionally holds both content 362 and 364 as pre-recorded CKDRM content. The authoring, pre-mastering and mastering tools each play a role. For example, a content provider may specify the CKDRM properties including the lock/unlock state, play/no-play state, number of allowed CKDRM copies, number of allowed TPDRM copies, and the number of copies a TPDRM may make from its copy. Additional TPDRM rules may be specified for specific TPDRMs.

Play Function

More specifically, CKDRM play 312 permits unlocked, playable CKDRM content to play on any player. The CKDRM play function delivers electronic content from an engine to a player along with the information needed to decrypt and render the delivered format. The engine governs whether permissions exist for the play 312 function. In one embodiment, function 312 does not decrement a play count. Rather, play permissions for unlocked and playable CKDRM content are implicitly unbounded by count or time.

Figure 8:
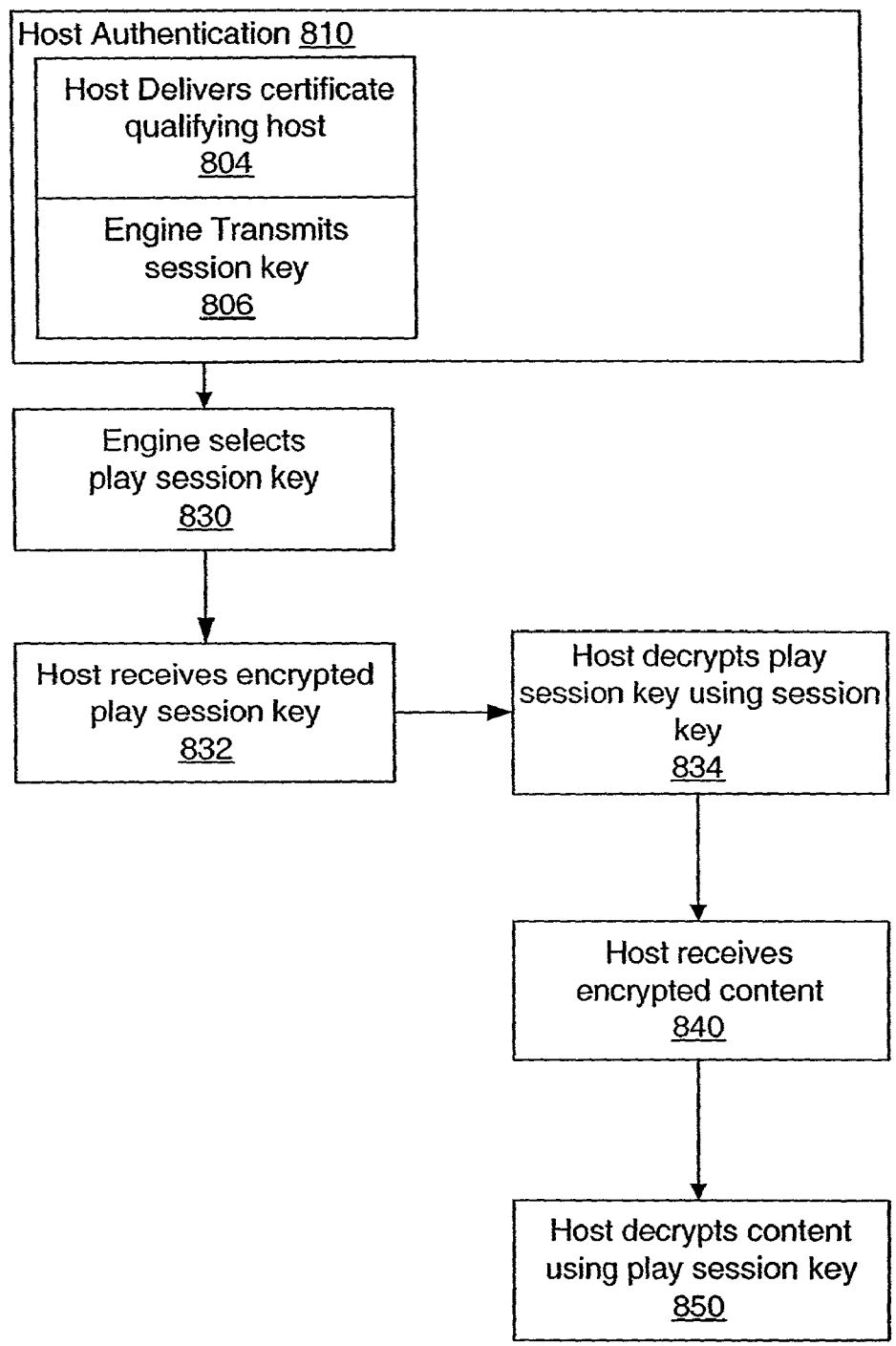
FIG. 8 illustrates a flow diagram of the API for the CKDRM play function according to an embodiment of the present invention.

Referring to FIG. 8, a flow diagram illustrates the API for the CKDRM play function 312. The API requires that a player or host be certified following a certification procedure prior to opening the API. The host is not allowed to store the content in any way that allows access to any other entity, even encrypted until the host is authenticated. The API further does not permit players to temporarily store decrypted content or transfer decrypted content via an insecure channel. According to a host authentication procedure 810, block 804 provides for a host to deliver a certificate qualifying a host. An engine coupled to the host in block 806, transmits a session key. After authentication, the engine selects a decryption play session key 830. Block 832 requires delivery of a play session key from the engine to the host, such as a player. A player receives this play session's decryption key for a specified file. Block 834 provides that a host decrypts the play session key using a session key. Block 840 provides that the player receives encrypted content. Block 850 provides that the play session decryption key received at block 832 decrypts the content.

Unlike CKDRM play, the TPDRM play 320 permits unlocked CKDRM content to play via a TPDRM. The TPDRM play function 320 delivers electronic content from an engine to the TPDRM along with the information needed to decrypt and render the delivered format. The governance of whether permissions exist for this function is enforced by the TPDRM. The CKDRM does not decrement play counts, check for time restrictions or any other governance. Rather, the TPDRM is capable of governing and/or changing its own metadata as part of its play function.

Copy Function

Another function is the CKDRM copy function 330. Function 330 permits copying of pre-recorded, unlocked content from one media to another media when there are remaining copy permissions. The CKDRM copy function 330 decrements the number of permissible copies remaining on an original media. More particularly, CKDRM, in one embodiment, provides for creating a limited number of copies. Any copies from media with a limited number of copies using the CKDRM copy function 330 share the qualities of the original copy in that they are playable in any player. The copies, however, may not themselves be copied. A content provider optionally specifies the number of copies that may be made from an original. Each time a copy is made the CKDRM copy function 330 decrements the number of remaining allowed copies.

Figure 9:
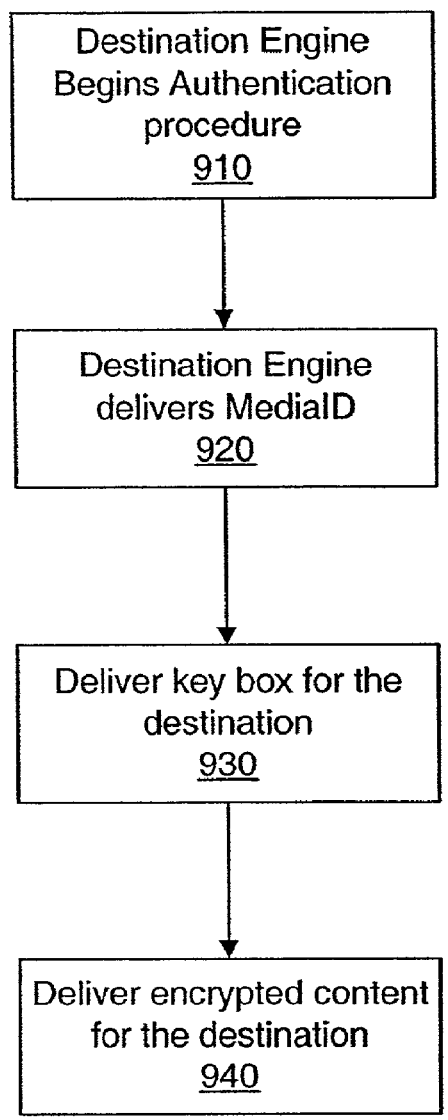
FIG. 9 illustrates a method for the CKDRM copy API protocol according to an embodiment of the present invention.

Referring to FIG. 9, the method for the CKDRM copy API protocol is illustrated. Block 910 provides for authentication of the destination engine. More specifically, a source engine makes sure that the destination is a valid engine so that secure content is not given out indiscriminately. Block 920 provides that the destination engine delivers a media identifier to which the new copy is to be bound. Block 930 provides for delivering of a key box for the destination. In block 930 the destination engine receives the keys necessary to use the content. In particular, these are the decryption keys for playing the content. In an exemplary embodiment, the keys are delivered pre-bound to the destination media. Block 940 provides for copying the encrypted content. DFS commands are used for copying the content. In one embodiment, the copy function 330 is supported in environments with one engine and sufficient buffer for temporary storage of content, as well as in environments with two engines.

TDDRM copy function 340 permits unlocked content to be copied by a TPDRM if there are remaining TPDRM copy permissions. The TPDRM copy function 340 decrements the number of permissible copies remaining for a source file. Like CKDRM copy function 330, TDDRM copy function 340 provides for creating a limited number of copies. The resultant copies are governed by the TPDRM. A content provider may specify the number of copies that may be made from a file.

To receive a copy of content, a certified TPDRM copies content from the domain of the CKDRM to the TPDRM. The content delivered will be encrypted and the decryption key(s) will be delivered to the receiving DRM.

Figure 10:
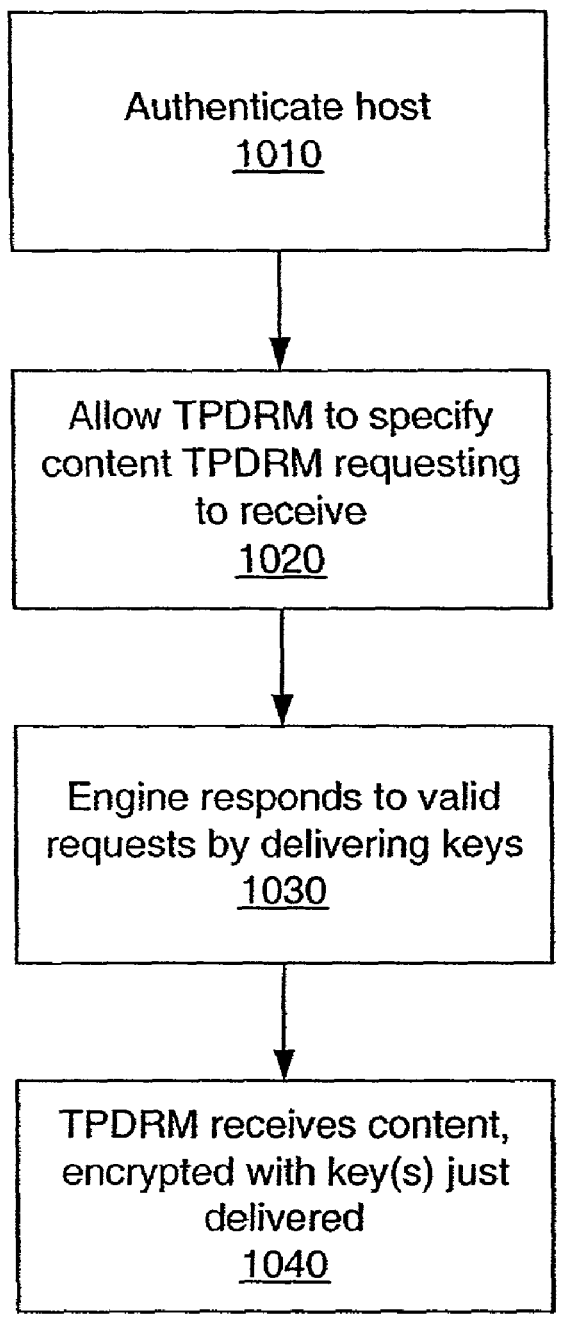
FIG. 10 illustrates a third party DRM copy method according to an embodiment of the present invention.

FIG. 10 illustrates the TPDRM copy method according to an embodiment. Block 1010 provides for host authentication. More specifically, as described above relative to FIG. 6, an engine verifies that a host is a certified DRM and trusted to receive content. Block 1020 provides for allowing a TPDRM to specify the content the TPDRM is requesting to receive. An engine governs the number of copies allowed for TPDRMs based on the initial number specified by a content provider and the number of copies previously delivered. In block 1030, an engine responds to valid requests by delivering the keys with which the delivered content must be decrypted. The delivery of keys is a sufficient action for a TPDRM copy and decrements the number of remaining allowed copies. Block 1040 provides that the TPDRM receives the content, encrypted with the key(s) just delivered.

Record Function

Another function provided by the CKDRM is recording content 350. Recording content 362 permits content providers that author, pre-master and master content to provide electronic content that may be replicated as unlocked content. The data imported as unlocked is readable and encrypted. Conversely, recording content 364 permits content providers that author, pre-master, and master pre-recorded to provide content that may be replicated as locked content. This content is not playable until it is unlocked. The locked content may, however, be unlocked using the CKDRM, after which the content has the same qualities as unlocked content.

CKDRM record 350 further includes importing to the domain of CKDRM from a kiosk, player or a TPDRM. In this form, the content will play in any player. Other types of CKDRM recording 350 include acquiring content through electronic distribution and playing the content on players.

Figure 11:
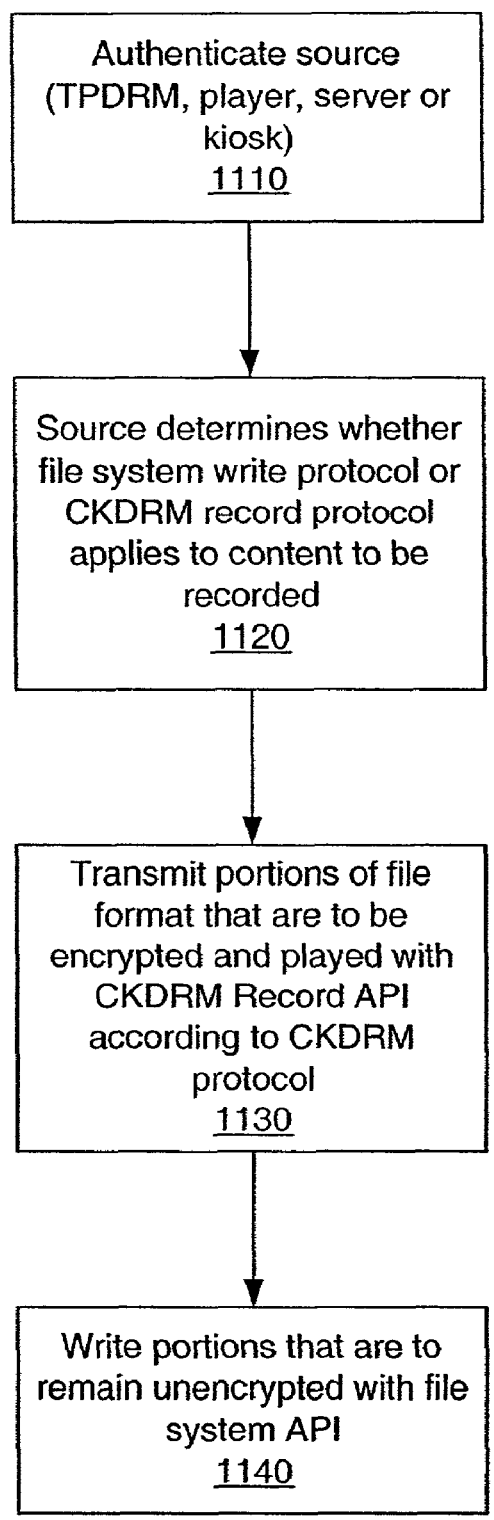
FIG. 11 illustrates a method of recording content using the CKDRM according to an embodiment of the present invention.

FIG. 11 illustrates a method of recording content. Block 1110 provides for a source, one of a TPDRM, player, server or kiosk, to be authenticated according to an authentication procedure. Block 1120 provides that the source determine whether a file system write protocol or a CKDRM record protocol applies to the content to be imported. In block 1130 portions of a file format that are to be encrypted and written with a CKDRM Record API are transmitted according to the CKDRM protocol. In block 1140 portions that are to remain unencrypted are written with the file system API.

Governed content can be brought into the CKDRM domain in three ways. One way is to use a TPDRM that governs the content and is capable of a handoff into CKDRM. Another is to construct a server that governs the content and uses the CKDRM record protocol. In contrast to the CKDRM unlock method, recording requires transfer of all of the content information. The third way is to construct a kiosk. The kiosk, in an embodiment, has its own engine and functions as a server with an engine.

Unlock Function

CKDRM unlock 360 is another function shown in Table 3. In one embodiment, the unlock content 360 function applies only to locked content. An application that can connect to a clearinghouse is required for the unlock transaction. When a user operating a media, such as a disk, satisfies predetermined transaction requirements, a secure method changes the state of the content on a media from locked to unlock.

According to an embodiment, locked content can be unlocked by authorized transactions. The authorized transactions include those transactions following rules selected by a content provider. For example, a content provider may control whether content can be played and the number of copies that may be made by TPDRMs.

Content that is pre-recorded in a locked state can be unlocked. In one embodiment, in the locked state the set of keys on the media are not sufficient to render the content. The unlock method delivers the complement of the keys. In another embodiment, the unlock method delivers data that matches the keys on the media to prove the authenticity of the clearing house. This data may also be referred to as key complements.

Figure 12:
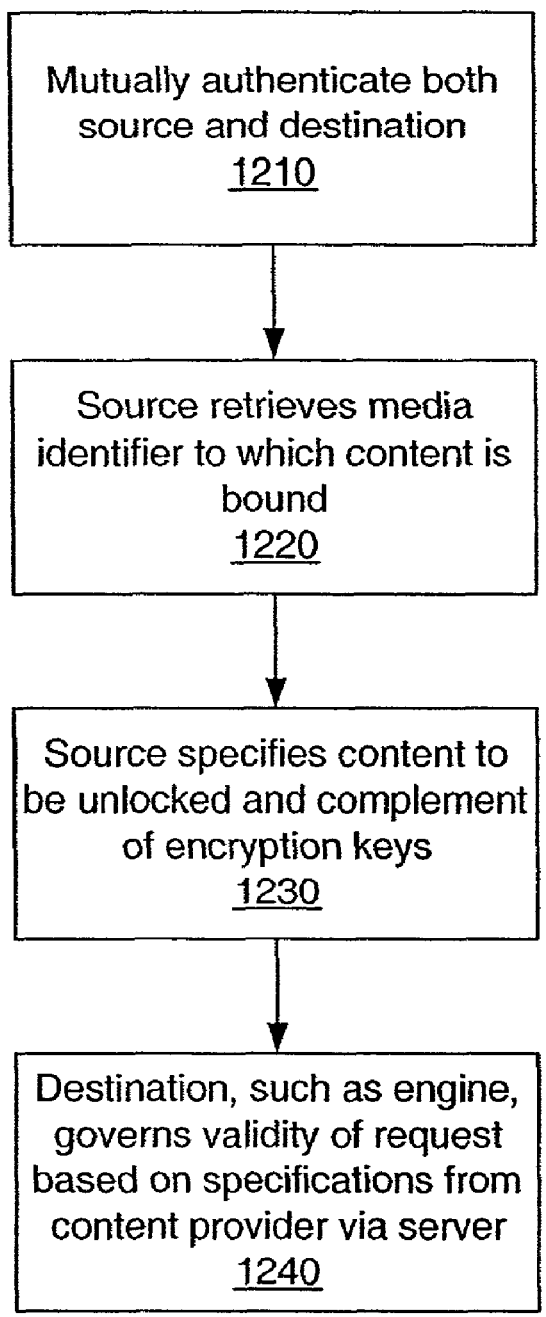
FIG. 12 illustrates a method of unlocking content according to an embodiment of the present invention.

FIG. 12 illustrates a method of unlocking content. More specifically, block 1210 provides that a first step in the method is mutual authentication of both source and destination. Block 1220 provides that a source, such as a server, retrieve a media identifier to which the content is bound. Block 1220 provides that the source specifies the content to be unlocked and the complement of encryption keys. Block 1230 provides that the destination, such as an engine, govern the validity of the request based on the specifications from a content provider via a server. In one embodiment, the server performing the unlocking must be specified as a legitimate unlocking source by the content provider at the time of authoring or mastering the media on which the content is stored.

File System Functions

A default function of CKDRM is governed by the file system 374 of Table 3, above. The file system allows access at the file level. The file system API does not participate in rules governance or the encryption methods used by the CKDRM.

The file system functions include a file read 372. More particularly, only data in the file storage area may be read by any device via the file system. In one embodiment, an engine interface and the file system are open architectures, with a file system API that is open without requiring an authenticated host. According to an embodiment, the file read 372 may be used by any host, such as a player, to access data without establishing an authenticated connection and without using cryptographic methods that may be in an engine.

Write function 374 identifies a file system write function, whereby a device writes data into the file storage area through the file system API. Like the file system read function 372, the write function 374 is optionally part of an open architecture such that an engine interface and the file system are open and the file system API is open, obviating the need for an authenticated host. The file write function 374 may be used by any host to store data without establishing an authenticated connection and without using an engine's cryptographic methods.

Methods Performed by the Engine

The functions of the CKDRM described above gives an overview of the CKDRM and functions. An engine performs these functions in conjunction with other parts of the SEC system as described above with reference to FIG. 2. An engine, as referred to herein, is a component that provides read and write access to digital media. The engine may reside in a host or be coupled to a host and performs the functions using commands that one of skill in the art will appreciate are exemplary in nature and can be defined according to system and design requirements. Additional functions between components and applications in a host application are within the scope of the present invention. The term host application may refer to the device to which the engine is directly attached, an application on a connected device such as a PC, or a server implementing the CKDRM clearinghouse.

Each of the methods of a protocol includes either or both CKDRM and file system commands. The methods described below are available to any certified entity as limited by the entity's certificate. Devices embedding an engine are required to expose the file system and CKDRM APIs through data I/O interfaces implemented by the device. In one embodiment, exposing the file system and CKDRM APIs allows a device embedding an engine to act as a surrogate for another entity.

Figure 13:
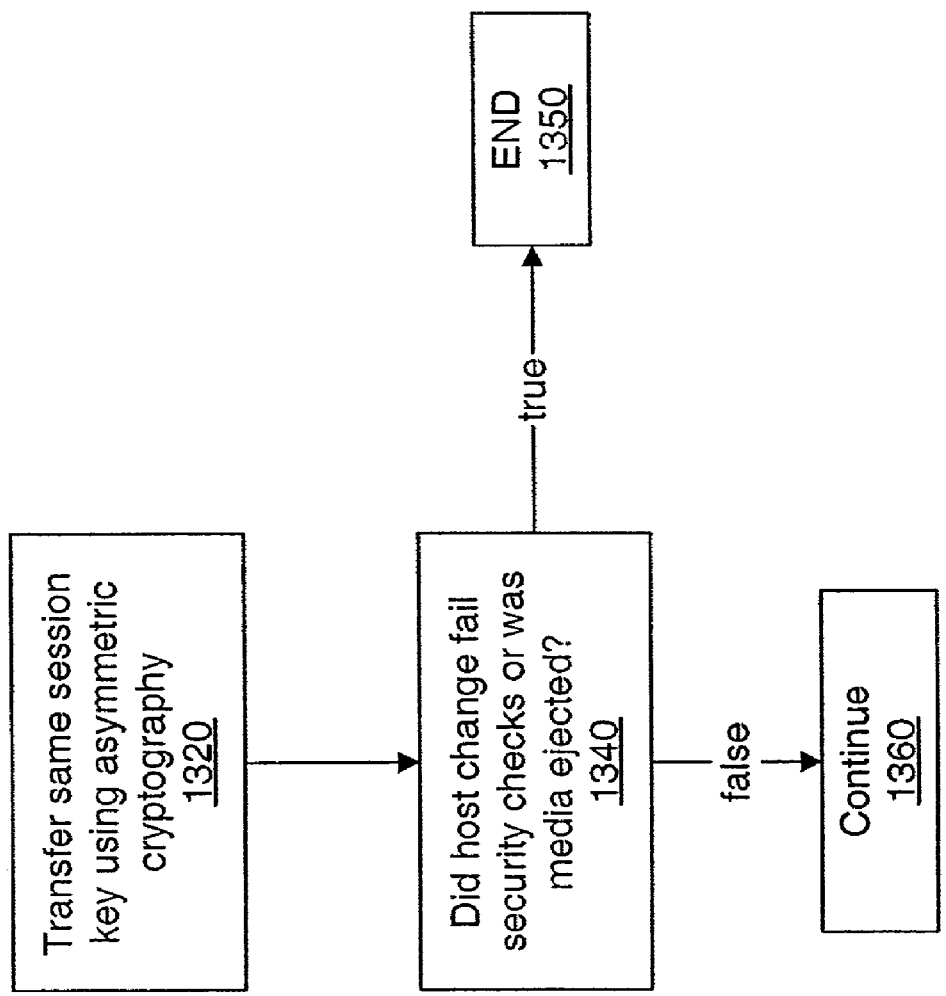
FIG. 13 illustrates a method for the CKDRM copy API protocol according to an embodiment of the present invention.

Communication with an engine, according to an embodiment, requires a secure session. The authentication procedure described above results in a new secure session and a secure session key. FIG. 13 illustrates an exemplary embodiment for obtaining a secure session via an authentication procedure. Block 1320 provides that the secure session key is transferred under asymmetric cryptography. In this embodiment, the session key is a symmetric key, thereby allowing for fast encryption and decryption of data. Block 1340 asks whether a host change occurred or if media was ejected from a device. When block 1340 is true, the secure session is ended in block 1350. If false, the secure session continues in block 1360. Thus, a secure session is unique to a particular host, engine and media combination.

Once a secure session is established, the engine is able to perform functions. The engine firmware provides functionality to the CKDRM and TPDRM methods, including lock/unlock, CKDRM play, CKDRM copy permissions, and CKDRM copy permissions. For CKDRM and TPDRM copy permissions, the engine allows one of copy freely, counted first generation copies and unlimited first generation copies.

A secure session enables an engine to enter the CKDRM domain, including performing the CKDRM and TPDRM functions. The CKDRM functions performed by an engine follow protocols. Each protocol from the perspective of an engine is explained in further detail below.

CKDRM Copy

Figure 14:
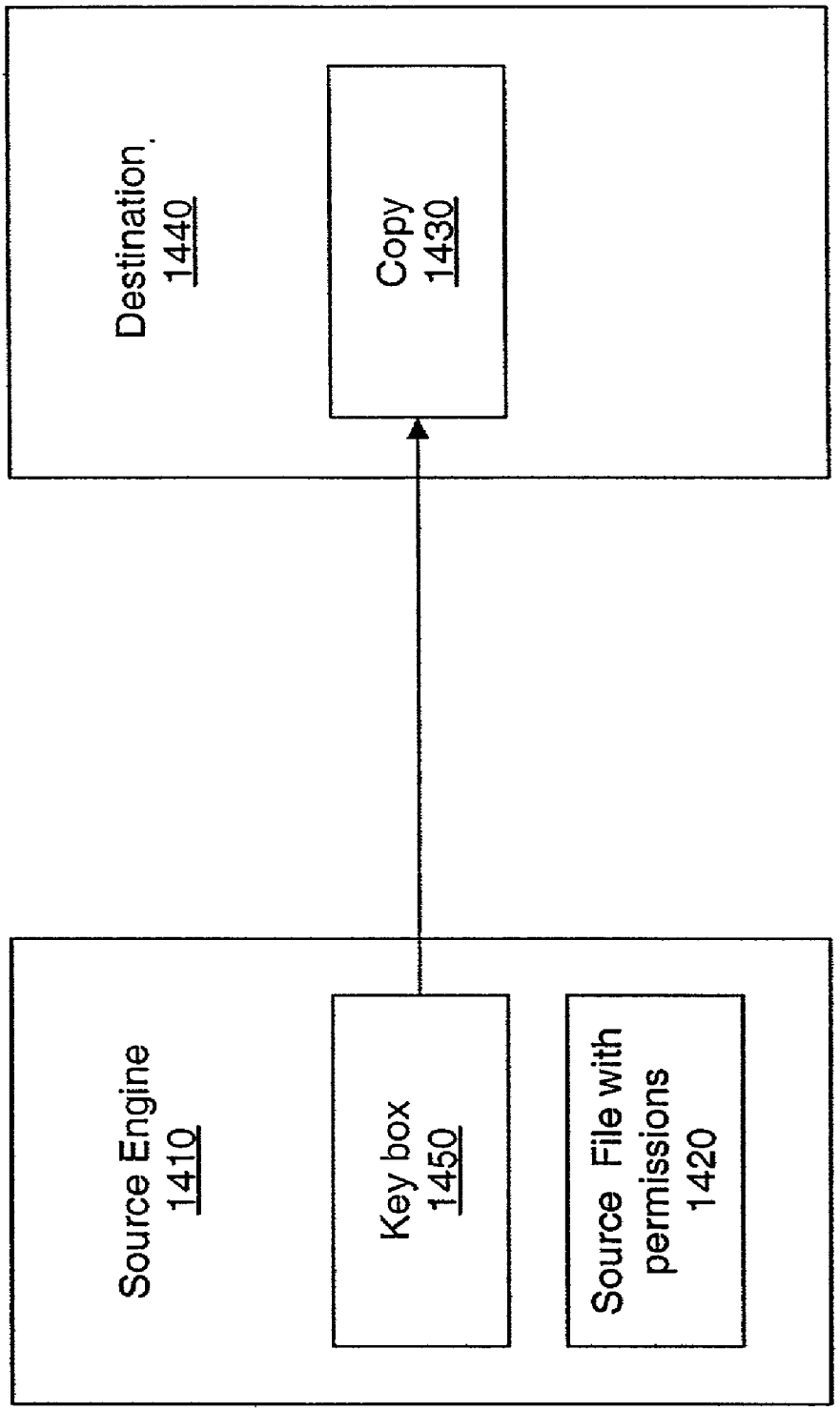
FIG. 14 illustrates an engine performing a CKDRM Copy method that copies content within the CKDRM domain according to an embodiment of the present invention.

FIG. 14 illustrates an engine performing a CKDRM Copy method that copies content within the CKDRM domain. For example, referring to FIG. 14, a source engine 1410 holds governed content that is within the CKDRM domain. In one implementation, a source file 1420 may be designed to such that source file 1420 must be unlocked and have remaining CKDRM copy permissions before the method continues. In another implementation, the status of source file 1420 is irrelevant, for example, in superdistribution models. In the example, the destination 1440 is the CKDRM domain. The resulting copy 1430 will be governed content and the file will be unlocked and have CKDRM play permissions but no CKDRM copy permissions. As part of the method and to enable playing of the copy, a key box 1450 is transferred. According to an embodiment, during the execution of the command that transfers the keybox 1450, the source file 1420 decrements remaining CKDRM copy permissions.

According to one embodiment of the copy protocol, a secure session is established between, for example, two engines, a source engine 1410 and destination engine 1440. In an embodiment, source engine 1410 runs a secure API and is exposed only to hosts with CKDRM Copy permissions. The destination engine 1440 includes an open API. Thus, the method is exposed to all hosts. Each engine has a host. A single device may be the host for both the source and destination engines, or each engine may have a different host. In the latter case, the two hosts must communicate according to a host protocol.

The CKDRM Copy protocol uses commands that one of skill in the art appreciates are exemplary in nature, but are provided for purposes of explanation. The protocol uses the CKDRM commands CKCMD_AUTHENTICATE and CKCMD_GET_CKDRM_COPY.

The command CKCMD_AUTHENTICATE provides that the destination engine 1440 authenticates itself to source engine 1410 to establish the trust that source engine must have in the destination engine to allow CKDRM methods to be used. The source host sends the destination engine's CKDRM certificate in the command packet. The source engine responds with the session key for the secure session.

In response to the command CKCMD_GET_CKDRM_COPY a key box is requested for a specified file and destination. The source engine 1410 returns the key box 1450 and a revocation list for the file and the destination.

CKDRM Record

Another method performed by an engine is the CKDRM record, which provides a method of bringing content into the CKDRM domain. The method assumes that a source is governed content that is outside the CKDRM domain. The destination is the CKDRM domain. The resulting copy is governed content.

The CKDRM Record method begins with establishing a secure session between an engine and a host. Thus, the method is a secure API that is exposed only to hosts with CKDRM record permissions. The commands CKCMD_AUTHENTICATE, CKCMD_GET_CERTIFICATE, CKCMD_CREATE_FILE and CKCMD_RECORD_APPEND are included in the record protocol. More particularly, CKCMD_AUTHENTICATE provides that the host supplying the content authenticates itself to an engine to establish the trust that the engine must have in the host to allow CKDRM methods to be used. Accordingly, the host sends its CKDRM certificate in a command packet, and the engine responds with the session key for the secure session.

The command CKCMD_GET_CERTIFICATE directs the host supplying the content to authenticate the engine to establish the trust that the host must have in the engine to allow content to be sent. The engine sends its CKDRM certificate in the data transfer.

The command CKCMD_CREATE_FILE creates a new CKDRM file. More particularly, the host specifies the record session key for transferring content and the content is transferred with CKCMD_RECORD_APPEND commands from the host to the engine.

The command packet sent by the host includes basic DFS elements including the location in the directory structure and the file name, which may be explicitly specified in the command packet. The command packet further explicitly specifies CKDRM rules and a revocation list. In one embodiment, the balance of the command packet includes other objects in a file that may be set to defaults and may be modified using DFS commands. In one embodiment, the received content is appended to the end of the file.

Figure 15:
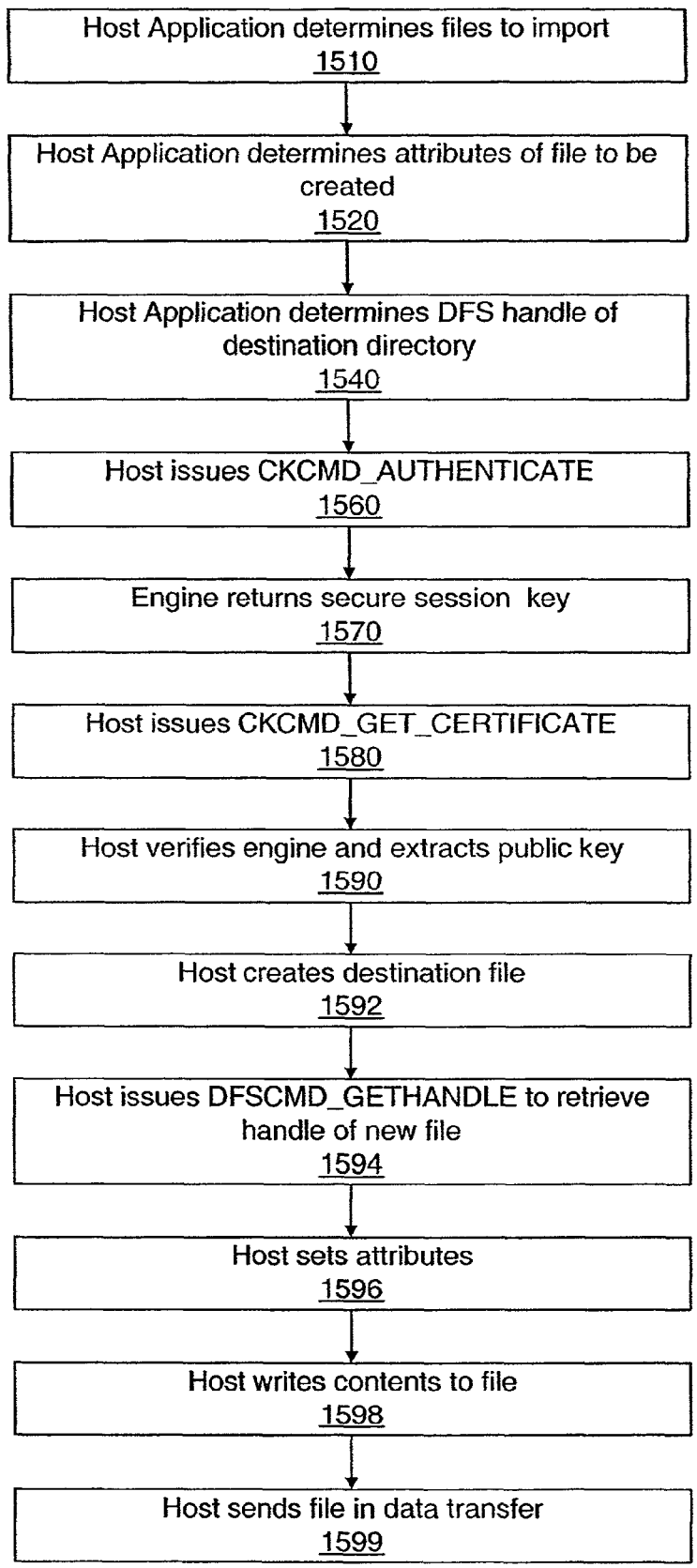
FIG. 15 illustrates a recording scenario according to an embodiment of the present invention.

From the viewpoint of a host, the record scenario is described with reference to FIG. 15. In block 1510, a host application determines the file to import into CKDRM and its directory path. In block 1520, the host determines the attributes of the file to be created including its directory path, file name, attributes, M type, CKDRM permissions, revocation list, allowed CKDRM copies and allowed DRM copies. In block 1540, the host determines the DFS handle of the destination directory.

In block 1560, the host issues the command CKCMD_AUTHENTICATE to initiate a secure session between the host and the engine. Certificate is set to the host's CKDRM certificate. In block 1570, the engine returns the secure session key in ESessionKey. In block 1580, the host issues CKCMD_GET_CERTIFICATE to authenticate the engine. Certificate is set to the engine's CKDRM certificate. In block 1590, the host verifies the engine and extracts its public key. In block 1592, the host creates the destination file using CKCMD_CREATE_FILE.

The created destination file, in one embodiment, includes data that controls the use of the file. For example, the data optionally includes information such as: the handle of the destination directory; the length of the revocation list; the encoded CKDRM permissions and attributes; the allowed CKDRM copies; the allowed DRM copies; the encrypted secure session key; and the value which is the ESessionKey value returned by the engine for CKCMD_AUTHENTICATE. Additional data includes the encrypted record session key selected by the host; the message authentication code calculated by the host for the revocation list data; the message authentication code calculated by the host for the command packet; the name of the file encoded as a DFSNAME data type; and the revocation data associated with the file.

In block 1594, the host issues a DFSCMD_GETHANDLE command to retrieve the handle for the newly created file. In bock 1596, the host sets the attributes and MIME type to the correct state. In block 1598, the host writes the content to the file using one or more CKCMD_RECORD_APPEND commands. The CKCMD_RECORD_APPEND command includes the following fields: RecordOptions, which may have RECORD_FOREVER asserted; RecordFile, which is the DFS handle of the file to which to write and the Handle field returned by the engine for the preceding CKCMD_CREATE_FILE command; ByteCount, which is the number of bytes in the file, and if RECORD_FOREVER is asserted in Record options then ByteCount may be any value; EsessionKey, which is the encrypted secure session key, and same value as the ESessionKey value returned by the engine for CKCMD_AUTHENTICATE; and ErecordKey, which is the encrypted record session key selected by the host, and the ERecordKey value sent by the host in the CKCMD_CREATE_FILE command.

In block 1599 the host sends the entire file in the data transfer. In one embodiment, if more than one CKCMD_RECORD_APPEND command is used then ERecordKey must always be the same and the data must always be the content encrypted with the single record session key represented by the single ERecordKey value. In another embodiment, the ErecordKey may change for each CKCMD_RECORD_APPEND command.

CKDRM Play

Figure 16:
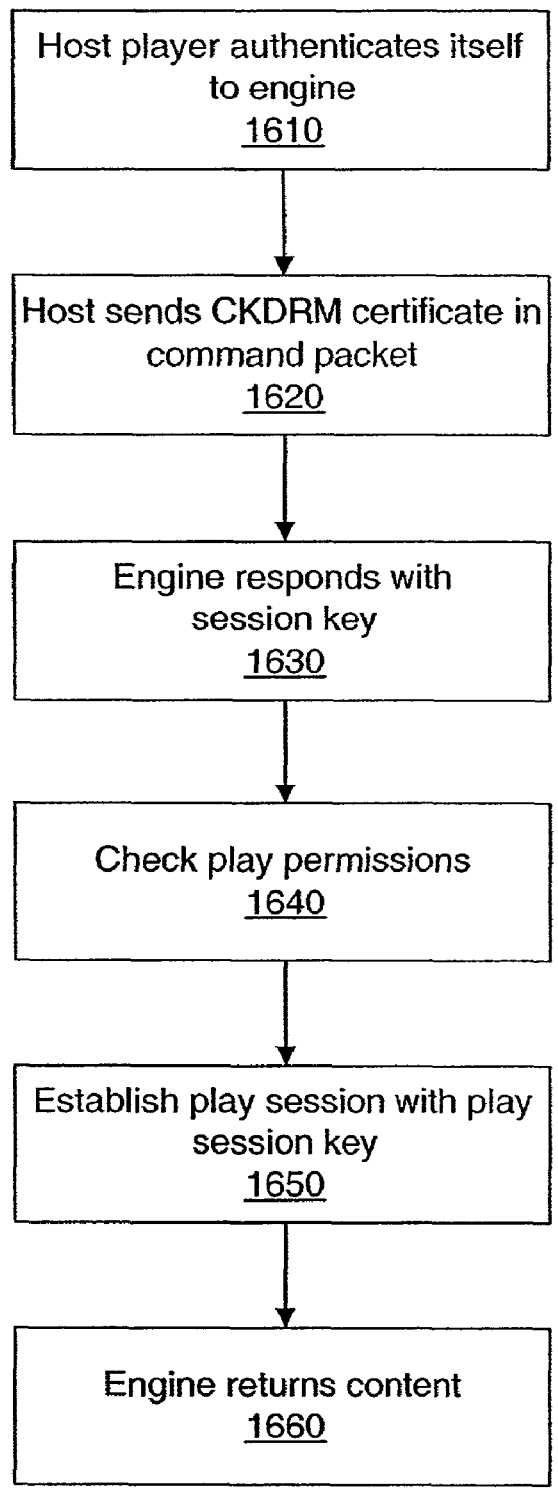
FIG. 16 illustrates a method of playing content governed by CKDRM according to an embodiment of the present invention.

CKDRM Play is a method of playing content governed by CKDRM. As shown in FIG. 16, a source is governed content that is within the CKDRM domain. According to the method, the source file must be unlocked and have CKDRM play permissions. The destination is a host acting in the role of a Player.

According to the protocol shown in FIG. 16, the CKDRM play protocol first establishes a secure session between an engine and a host. According to an exemplary embodiment, the CKDRM Play method is a secure API and is exposed only to hosts with CKDRM Play permissions. The CKDRM Play protocol uses the commands CKCMD_AUTHENTICATE, CKCMD_GET_CKDRM_PLAY_KEY and CKCMD_PLAY.

The method begins in block 1610 with the command CKCMD_AUTHENTICATE which directs the host Player to authenticate itself to the engine to establish the trust that the engine must have in the destination to allow CKDRM methods to be used. In block 1620, the host sends its CKDRM certificate in the command packet. The engine responds in block 1630 with the session key for the secure session.

Next, in block 1640, the command CKCMD_GET_CKDRM_PLAY_KEY directs that the CKDRM Play permissions be checked. In block 1650, the play session is established and the play session key is returned for a specified file. In block 1660, the command CKCMD_PLAY directs the engine to return the content from the specified file.

Figure 17:
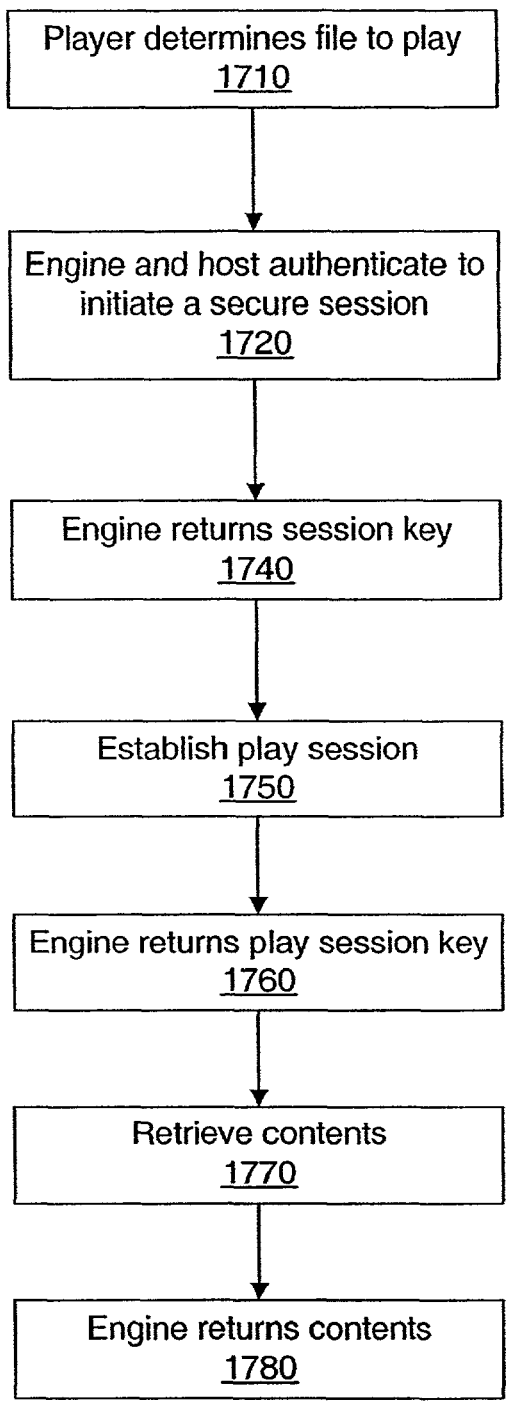
FIG. 17 illustrates a more detailed play method using commands according to an embodiment of the present invention.

FIG. 17 illustrates a more detailed play method using the commands described above. In block 1710, a Player determines the file to play. A user inserts the source media in the engine and the host, in block 1720, issues a CKCMD_AUTHENTICATE command to initiate a secure session between the engine and the host. In block 1720, the certificate is set to the host's CKDRM certificate. In block 1740 the engine returns the secure session key in ESessionKey.

In block 1750 the host issues a CKCMD_GET_CKDRM_PLAY_KEY command to establish a play session and get the play session key for the file. The ESessionKey is the encrypted secure session key, and holds the same value as the ESessionKey value returned by the engine for CKCMD_AUTHENTICATE. In block 1760, the engine returns the play session key in EplayKey. In block 1770, the host issues one or more CKCMD_PLAY commands to retrieve the contents. In response, the engine returns the contents in block 1780.

In one embodiment of the invention, the CKCMD_Play command provides that the contents are retrieved and does not stop retrieving due to unrecoverable errors. More specifically, in one embodiment, a field PlayOptions is set with PLAY_STREAMING asserted, which provides for streamed play and no stopping on a play error. Additionally, with the command PLAY_TO_EOF asserted, the content is played to the end of file, ignoring the ByteCount field.

The CKDRM for the play commands works with the DFS API. For example, the command PlayFile is a DFS command that is set to specify the DFS handle of the file to play. As in other methods performed by the CKDRM the Play function ESessionKey is the encrypted secure session key, and the same value as the ESessionKey value returned by the engine for CKCMD_AUTHENTICATE. Other useful data fields include ByteOffset, which is set to zero to start the play at the start of the file; and ByteCount, which may be set to the number of bytes the host wishes to receive.

CKDRM Unlock

Figure 18:
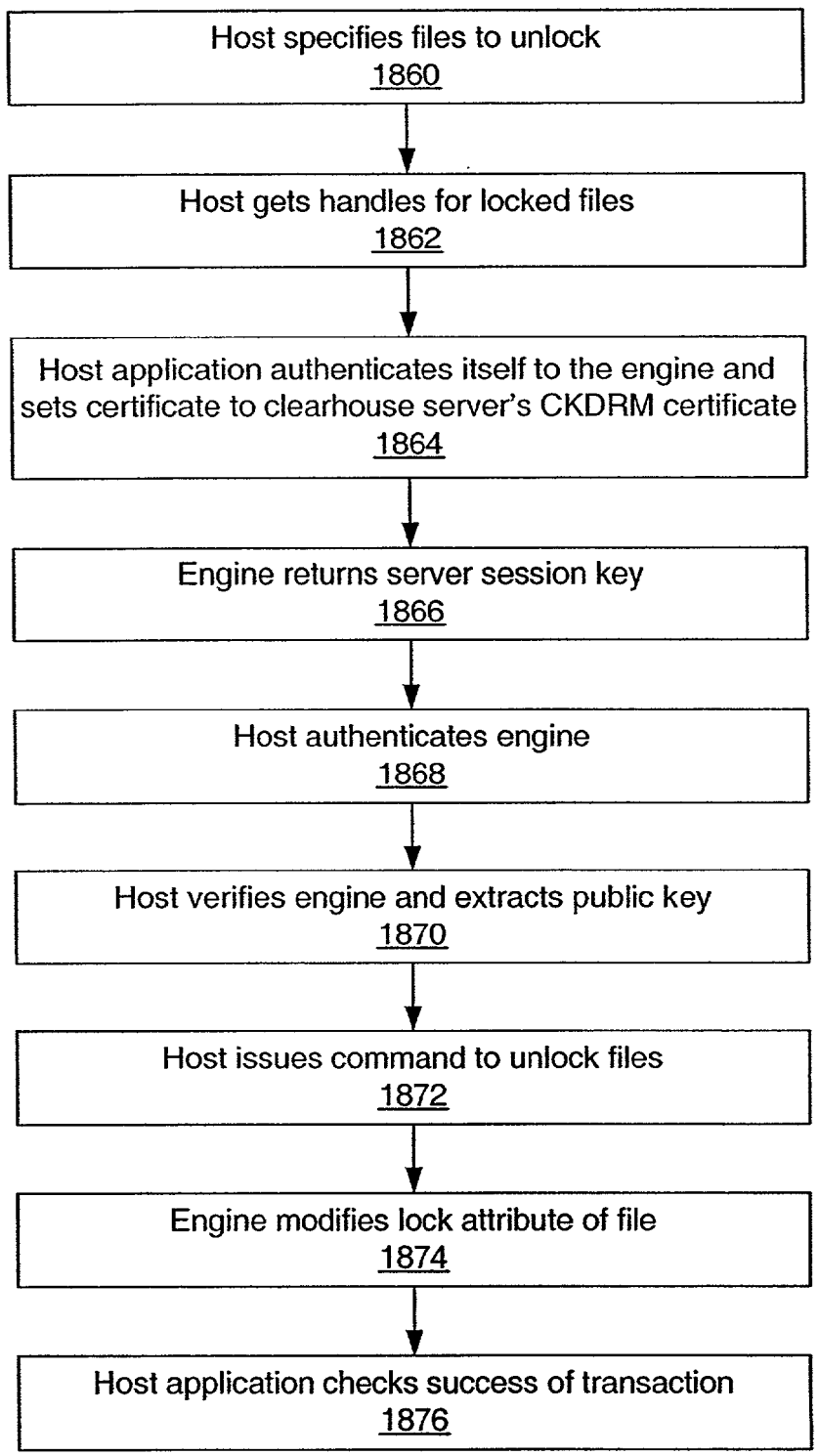
FIG. 18 illustrates a flow diagram for a CKDRM unlock according to an embodiment of the present invention.

Another method performed by the CKDRM is illustrated in FIG. 18. CKDRM Unlock is a method of changing the state of a CKDRM file from locked to unlocked. The target is governed content that is within the CKDRM domain. Upon successful completion of this method, the target file will be unlocked. The permissions and metadata are otherwise unchanged.

FIG. 18 illustrates the protocol for CKDRM Unlock. The commands used in the protocol include CKCMD_AUTHENTICATE, CKCMD_GET_CERTIFICATE and CKCMD_UNLOCK_FILES. The security required for the unlock mandates that a secure session exist between an engine and a host. Thus, the CKDRM Unlock method is a secure API and is exposed only to hosts with CKDRM Unlock permissions.

After the host determines the files to unlock in block 1860, the host, in block 1862 gets the handles for the locked files in the form of a list. In one embodiment, the list is obtained by traversing the directory structure and noting all of the files whose attributes indicate that the file is locked. In another embodiment, the associations format also specifies the locked content and some information about offer packages.

In block 1864, the host application issues the CKCMD_AUTHENTICATE command to authenticate itself to the engine and initiate a secure session. Certificate is set to a clearinghouse server's CKDRM certificate. In block 1866, the engine returns the secure session key in field ESessionKey.

In block 1868, the host issues the command CKCMD_GET_CERTIFICATE to authenticate the engine. Certificate is set to the engine's CKDRM certificate. In block 1870 the host verifies the engine and extracts its public key.

Next, in block 1872, the command CKCMD_UNLOCK_FILES directs that the host specify the files to unlock. The number of files to unlock is specified in a FileCount field in the data transfer. The DFS handles of the files to unlock are specified in the Handle field of the FileSet array of the data transfer. In block 1874 the engine modifies the Lock attribute of the files specified by field FileSet.

Other data useful to the unlock method includes the following fields: FileCount, which is set to the number of files to unlock; EunlockKey, which is the encrypted unlock key for the encryption and decryption of key complements; EmediaId, which is the encrypted media identifier and the public media identifier of the destination media; FileSet, which is set to the list of identifiers of the files to unlock, including the DFS handle of the file in each entry; and the EKeyComplement field, which is the encrypted key complement, where the key complement comes from the appropriate database. The unlock key is used to encrypt the key complement values. Additionally, the field DataMac is set to the hash of FileSet field of the data packet.

Finally, in block 1876, the host application checks whether the transaction was successful by getting the state of the files that were to be unlocked.

TPDRM Copy

TPDRM Copy is a method of sending governed content out of the CKDRM domain. The source is governed content that is within the CKDRM domain. The source file must be unlocked and have TPDRM copy permissions. The TPDRM copy permissions, according to an embodiment, include either a non-zero TPDRM Copy Count value, a TPDRM Copy Freely state, or an Unlimited First Generation TPDRM Copy state. The destination is the domain of a TPDRM. The resulting copy is governed content governed by the destination TPDRM. In an exemplary embodiment, the source file's remaining TPDRM Copy Count is decremented during the CKCMD_GET_DRM_COPY command, if necessary.

Figure 19:
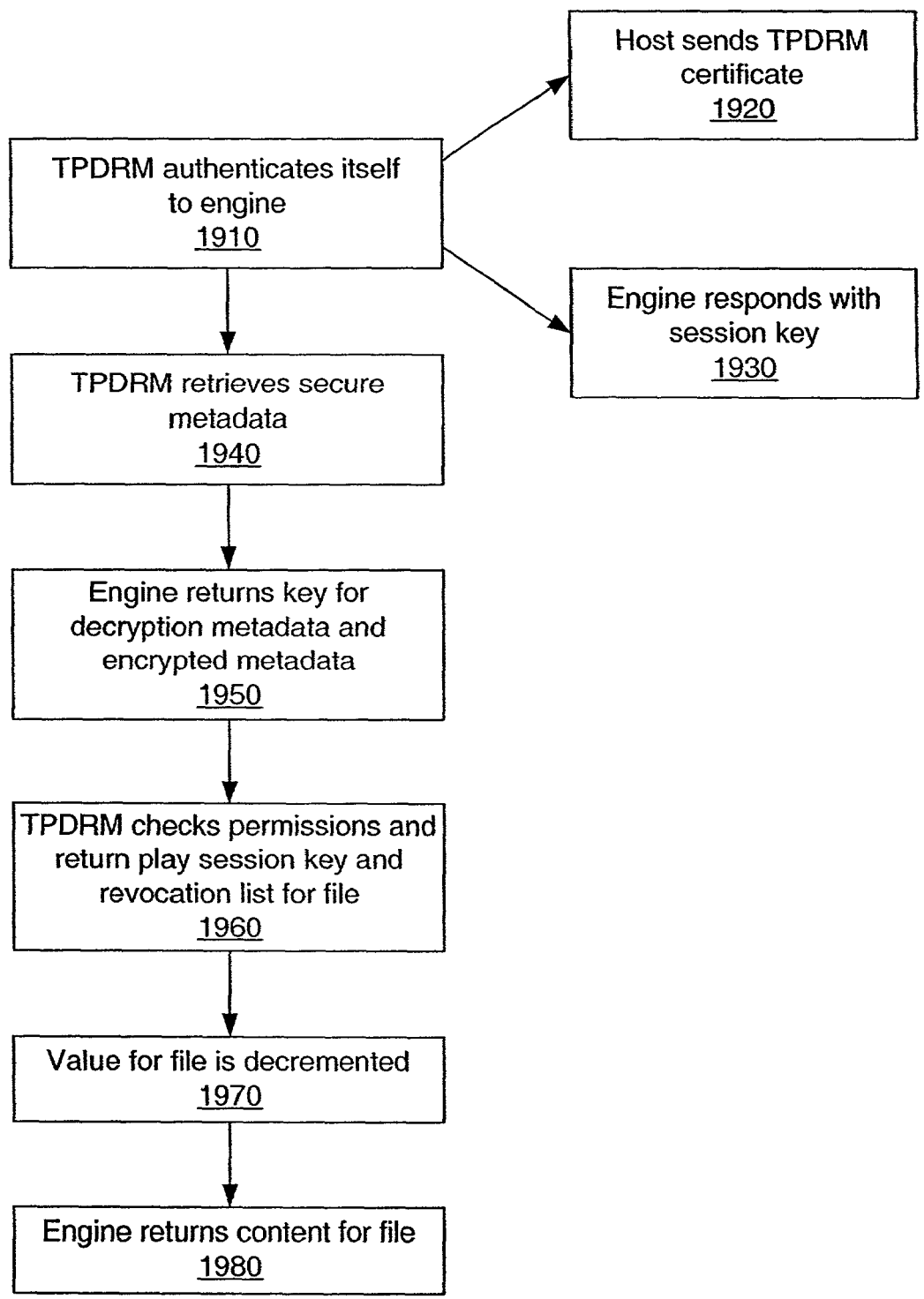
FIG. 19 illustrates a TPDRM Copy protocol in flow diagram form according to an embodiment of the present invention.

FIG. 19 illustrates the TPDRM Copy protocol. Like other methods described above, the TPDRM Copy requires a secure session between an engine and a host. Thus, the TPDRM Copy method is a secure API and is exposed only to hosts with DRM Copy permissions. DRM Copy protocol uses commands CKCMD_AUTHENTICATE, CKCMD_GET_METADATA, CKCMD_GET_DRM_COPY and CKCMD_PLAY.

In block 1910, the command CKCMD_AUTHENTICATE directs the TPDRM to authenticate itself to the engine to establish the trust that the engine must have in the TPDRM to allow CKDRM methods to be used. In block 1920, the host sends the TPDRM's CKDRM certificate in the command packet. In block 1930, the engine responds with the session key for the secure session.

In block 1940, the command CKCMD_GET_METADATA directs that the TPDRM retrieve secure metadata associated with the file to be played. In block 1950, the engine returns a key for decrypting the metadata. The engine also returns, in block 1950, the encrypted metadata.

In block 1960, the command CKCMD_GET_DRM_COPY directs that the engine checks TPDRM Copy permissions, establish the play session and return the play session key and revocation list for a specified file. In block 1970, the command TPDRM Copy Count directs that the value for the file be decremented, if necessary. In block 1980, the command CKCMD_PLAY directs that the engine return the content from the specified file.

Figure 20:
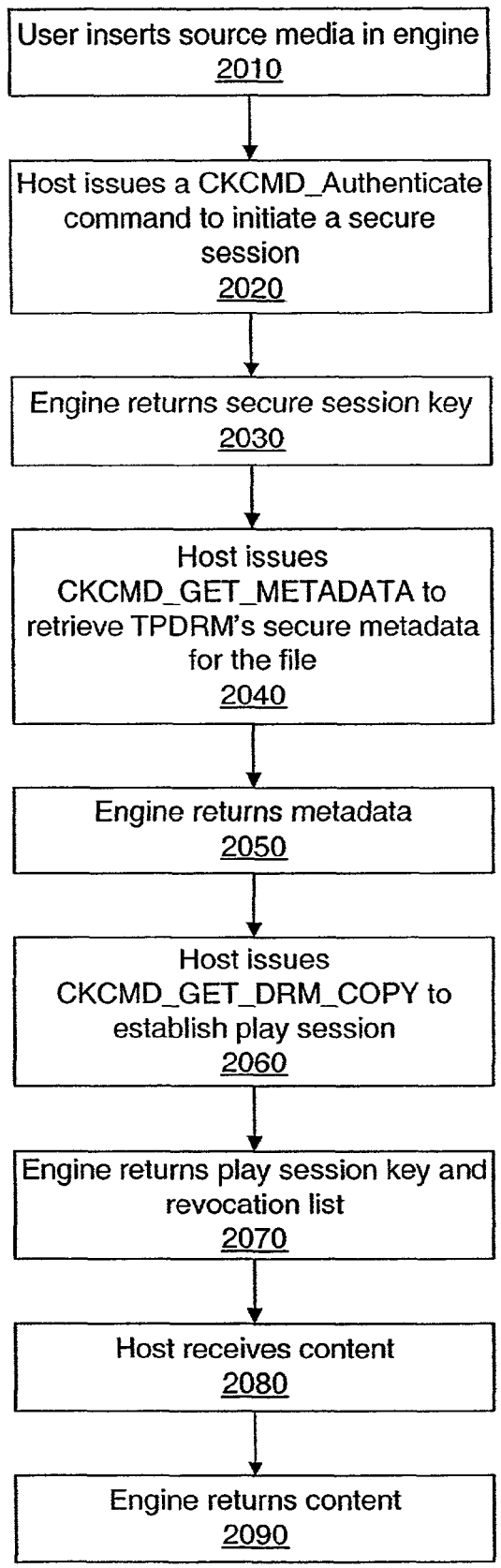
FIG. 20 illustrates a flow diagram of a method for TPDRM Copy according to an embodiment of the present invention.

FIG. 20 illustrates an exemplary method of the TPDRM Copy. As shown, the TPDRM application determines the set of files to copy. In block 2010 a user inserts the source media in the engine. In block 2020, the host issues a CKCMD_AUTHENTICATE command to initiate a secure session between the engine and the host. The certificate is set to the TPDRM's CKDRM Certificate. In block 2030, the engine returns the secure session key in ESessionKey. In an exemplary embodiment, the host TPDRM's CKDRM Certificate includes a MetadataIdentifier field.

In block 2040, the host issues a CKCMD_GET_METADATA command to retrieve the TPDRM's secure metadata associated with the file. The field AssociatedFile is set to the DFS handle of the associated file, the file to copy. ESessionKey is the encrypted secure session key, and has the same value as the ESessionKey value returned by the engine for CKCMD_AUTHENTICATE. In block 2050, the engine returns Metadata, i.e., the metadata associated with the file specified by AssociatedFile and with the TPDRM specified by the certificate received in the CKCMD_AUTHENTICATE command.

In an exemplary embodiment, the TPDRM enforces TPDRM governance rules, including the rules specified by its metadata, and determines whether there currently are copy permissions for the TPDRM for the file. In an embodiment of the method, the TPDRM must not copy the content if there are no copy permissions.

In block 2060, the host issues a CKCMD_GET_DRM_COPY command to establish the play session and get the play session key for the file. The field SourceFile is the DFS handle of the file to be copied. In block 2070, the engine returns the play session key in EPlayKey, and the revocation list in RevocationList. In block 2080, according to one embodiment, the host issues one or more CKCMD_PLAY commands to retrieve the contents. The fields of the play commands include: PlayOptions, which is set with PLAY_STREAMING deasserted (play normal; stop on play error) and PLAY_TO_EOF asserted (play to the end of the file; ignore the ByteCount field); PlayFile, which is set to specify the desired file, which may be the DFS handle of the file to copy; ByteOffset, which is set to zero to start the play (copy) at the start of the file; ByteCount, which may be set to any value; and EsessionKey, which is the encrypted secure session key, and the same value as the ESessionKey value returned by the engine for CKCMD_AUTHENTICATE. In block 2090, the engine returns the content.

Read Secure Metadata

Read Secure Metadata is a method of accessing content that is in the CKDRM domain and owned by a third party. In one embodiment, the associated file must be unlocked. The metadata is associated with the file and with the host identified for the secure session.

As with other methods, the protocol first establishes a secure session between an engine and a host. Thus, the Read Secure Metadata method is a secure API and is exposed only to hosts with Read Secure Metadata permissions.

Figure 21:
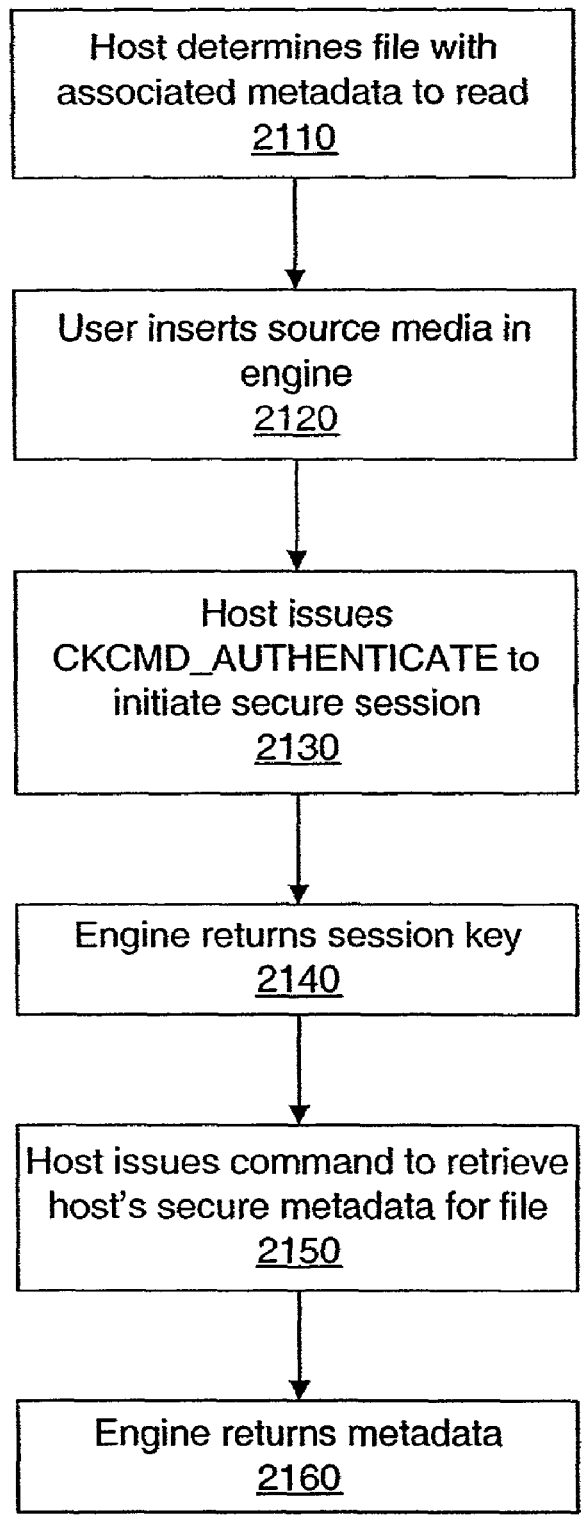
FIG. 21 illustrates a Read Secure Metadata protocol according to an embodiment of the present invention.

FIG. 21 illustrates the Read Secure Metadata Protocol. The Read Secure Metadata protocol uses the commands CKCMD_AUTHENTICATE and CKCMD_GET_METADATA. As described above, the command CKCMD_AUTHENTICATE directs the host to authenticate itself to the engine to establish the trust that the engine must have in the destination to allow CKDRM methods to be used. In response, the host sends its CKDRM certificate in the command packet. The engine responds with the session key for the secure session.

The command CKCMD_GET_METADATA directs the host to read its secure metadata associated with the file. In response, the engine returns a key for decrypting the metadata and also returns the encrypted metadata.

Referring to FIG. 21, in block 2110, the host first determines the file associated with the metadata to be read. Accordingly, the exchange includes, in block 2120, a user inserting the source media in the engine. In block 2130, the host issues a CKCMD_AUTHENTICATE command to initiate a secure session between the engine and the host. The certificate is set to the host's CKDRM certificate. In block 2140, the engine returns the secure session key in ESessionKey. In block 2150, the host issues a CKCMD_GET_METADATA command to retrieve the host's secure metadata associated with the file. The field AssociatedFile is set to the DFS handle of the file with which the metadata is associated. The field ESessionKey is the encrypted secure session key, and holds the same value as the ESessionKey value returned by the engine for CKCMD_AUTHENTICATE. In block 2160, the engine returns Metadata, the metadata associated with the file specified by AssociatedFile and with the host specified by the certificate received in the CKCMD_AUTHENTICATE command.

Write Secure Metadata

The Write Secure Metadata provides a method asserting content that is in the CKDRM domain and owned by a third-party. In one embodiment, the associated source file must be unlocked, however, the status of the associated source file may be altered according to design requirements. The metadata is associated with the file and with the host identified for the secure session.

The protocol establishes a secure session between an engine and a host. Thus, the Write Secure Metadata method is a secure API and is exposed only to hosts with Write Secure Metadata permissions. The Write Secure Metadata protocol uses the commands CKCMD_AUTHENTICATE, CKCMD_GET_CERTIFICATE and CKCMD_SET_METADATA.

As discussed above, the command CKCMD_AUTHENTICATE directs a host to authenticate itself to an engine to establish the trust that the engine must have in the destination to allow CKDRM methods to be used. In response, the host sends its CKDRM certificate in the command packet. The engine responds with the session key for the secure session.

The command CKCMD_GET_CERTIFICATE directs the host supplying the content to authenticate the engine to establish the trust that the host must have in the engine to allow content to be sent. The engine sends its CKDRM certificate in the data transfer.

The command CKCMD_SET_METADATA directs the host to write its secure metadata associated with the file. In response, the host sends a key for decrypting the metadata and the encrypted metadata.

Figure 22A:
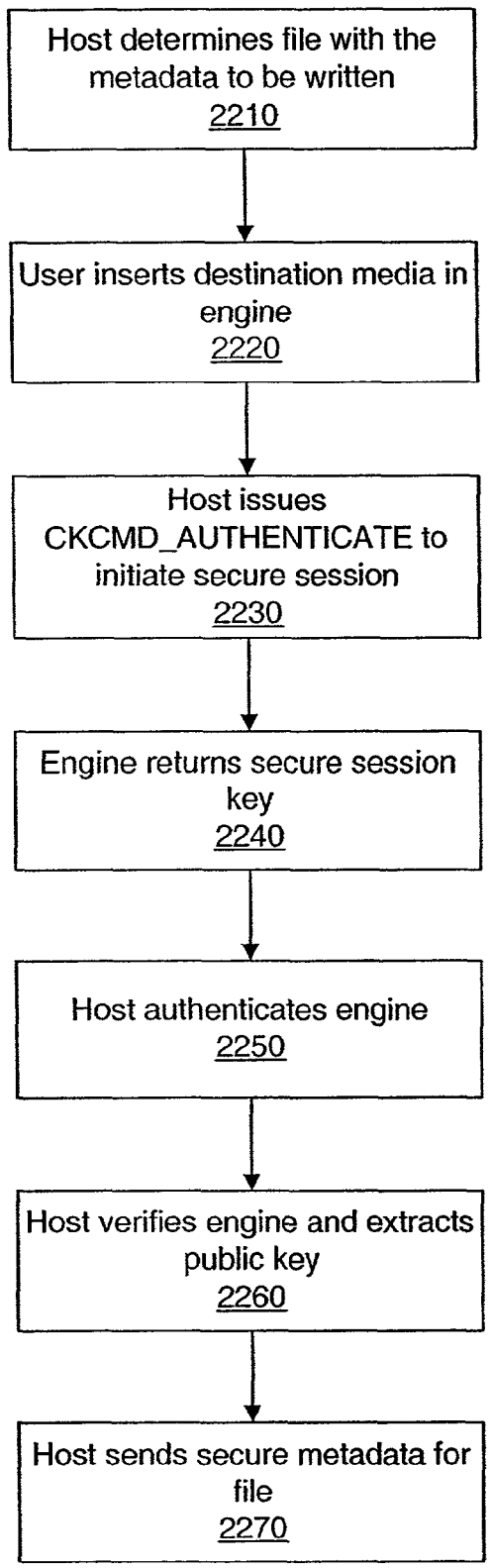
FIG. 22A illustrates a flow diagram of a protocol for a host to write its secure metadata according to an embodiment of the present invention.

FIG. 22A illustrates the protocol for the Write Secure Metadata method. In block 2210, the host first determines the file associated with the metadata to be written. In block 2220, a user inserts the destination media in the engine. In block 2230, the host issues a CKCMD_AUTHENTICATE command to initiate a secure session between the engine and the host. The certificate is set to the host's CKDRM certificate. In block 2240, the engine returns the secure session key in ESessionKey. In block 2250, the host issues CKCMD_GET_CERTIFICATE to authenticate the engine. The certificate is set to the engine's CKDRM certificate. In block 2260, the host verifies the engine and extracts its public key.

In block 2270, the host issues a CKCMD_SET_METADATA command to send the host's secure metadata associated with the file. The field AssociatedFile is set to the DFS handle of the file with which the metadata is associated. The field ESessionKey is the encrypted secure session key, and same value as the ESessionKey value returned by the engine for CKCMD_AUTHENTICATE. The field Metadata is the metadata associated with the file specified by AssociatedFile and with the host specified by the certificate received in the CKCMD_AUTHENTICATE command.

Referring to Table 4A, below, the permissions are given for the commands provided above.

TABLE 4A

Permissions for commands:

| Command | Current Secure Session | Locked Object | Host Permissions | Objects Permissions | Notes |
|---|---|---|---|---|---|
| CKCMD AUTHENTICATE | Current session broken, new session initiated | Not applicable | Valid CKDRM Certificate | Not applicable | The signatures in the CKDRM Certificate must verify with the public keys, including the CA public key from the Valid Signature Key List. |
| CKCMD CREATE FILE | Required | Not applicable | CKDRM Record | Parent directory: DFS Write | The directory in which the new file is to be created must have DFS Write permissions. |
| CKCMD GET CERTIFICATE | Not required | Not applicable | | Not applicable | This is a non-secure command in the CKDRM API. |
| CKCMD GET CONTENT KEY COPY | Required | Disallowed | CKDRM Copy | Non-zero CK Copy Count, CK Copy Freely or Unlimited First Generation CK Copies | |
| CKCMD GET CKDRM ID | Not required | Not applicable | | Not applicable | This is an non-secure command in the CKDRM API. |
| CKCMD GET CKDRM PLAY KEY | Required | Disallowed | CKDRM Play | CKDRM Play, DFS Read | |
| CKCMD GET TPDRM COPY | Required | Disallowed | TPDRM Copy | Non-zero TPDRM Copy Count, TPDRM Copy Freely or Unlimited First Generation TPDRM Copies | |
| CKCMD GET METADATA | Required | Disallowed | Read Secure Metadata | | The file must have metadata for the host. |
| CKCMD PLAY | Required | Disallowed | CKDRM Play | CKDRM Play or TPDRM Copy, DFS Read | |
| CKCMD RECORD APPEND | Required | Allowed | CKDRM Record | CKDRM Record, DFS Write | Turn off DFS Write and DFS Write Modification to disallow further recording. |
| CKCMD SET KEYBOX | Not required | Disallowed | | | The file must not have CKDRM metadata. This is an non-secure command in the CKDRM API. |
| CKCMD SET METADATA | Required | Disallowed | Write Secure Metadata | | |
| CKCMD UNLOCK FILES | Required | Allowed | CKDRM Unlock | | The file must have CKDRM metadata. |

Referring to Table 4A, the following commands, RECORD_APPEND, PLAY, GET_DRM_PLAY_KEY, GET_DRM_COPY, GET CKDRM_PLAY_KEY, GET_CKDRM_COPY and CREATE_FILE each include as part of their protocol a consideration of a media identifier. One media identifier is a unique identifier that is created during the mastering or pre-mastering process of a media. It may be unique for a master or for each media, depending on design requirements. Another media identifier is a unique identifier that is created during field use of the media. It is unique for each media, e.g., media disk. In each case, however, the media identifier may be pre-recorded on a disk for content that was mastered or pre-mastered, or the like. Further, in each case, the media identifier may be written on media, such as a disk, for content that was written. The pre-recorded media identifier may, therefore, exist only in that portion of media dedicated to mastered/pre-mastered content, and the written media identifier will exist only in that portion of a media dedicated to written information. Referring to Table 4B, below, the types of identifiers that are possible in the SEC system are provided. As shown, there are four types of identifiers including pre-recorded identifiers for pre-recorded content, pre-recorded identifiers for written content, written identifiers for pre-recorded content and written identifiers for written content. Pre-recorded locked content and pre-recorded locked content that was later unlocked uses only the media identifier that was pre-recorded. The SEC system, in one embodiment, uses two of the four types of identifiers, so the existence of the other two types indicates a counterfeit disk.

TABLE 4B

| | Pre-Recorded Content | Written Content |
|---|---|---|
| Pre-Recorded Media Identifier | Used by the SEC system | Counterfeit |
| Written Media Identifer | Counterfeit | Used by the SEC system |

Referring to Table 4A, the following commands, RECORD-APPEND, PLAY, GET_DRM_PLAY_KEY, GET_DRM_COPY, GET_CKDRM_PLAY_KEY, GET_CONTENT_KEY_COPY and CREATE_FILE each include as part of their protocol a consideration of a media identifier. The media identifier is a unique identifier that is created during the mastering or pre-mastering process for media. It may be unique for a master or for each disk, depending on design requirements. In each case, however, the media identifier will be pre-recorded on a disk if the content was mastered or pre-mastered, or the like. The media identifier, will, therefore, exist only in that portion of a disk dedicated to mastered/pre-mastered content. Referring to Table 4B, below, the types of identifiers that are possible in the SEC system are provided. As shown, there are four types of identifiers, including pre-recorded, hybrid with both pre-recorded and written components to the identifiers, written-only identifiers, and counterfeit. The media types for the four types of identifiers include media holding pre-recorded locked content that was later unlocked, media holding only unlocked content, and those holding a mixture of both types. According to an unlock protocol, when content is unlocked, the identifier for the content has a portion of the identifier that is pre-recorded and a portion of the identifier that is written. Thus, for media holding pre-recorded content later unlocked, the identifier will always have a pre-recorded identifier associated with it.

TABLE 4B

| | Pre-Recorded | Hybrid | Written | Counterfeit |
|---|---|---|---|---|
| Media holds pre-recorded locked content that was later unlocked | YES | YES | YES | NO |
| Media holds Pre-Recorded unlocked at purchase | YES | NO | N/A | NO |

Figure 22B:
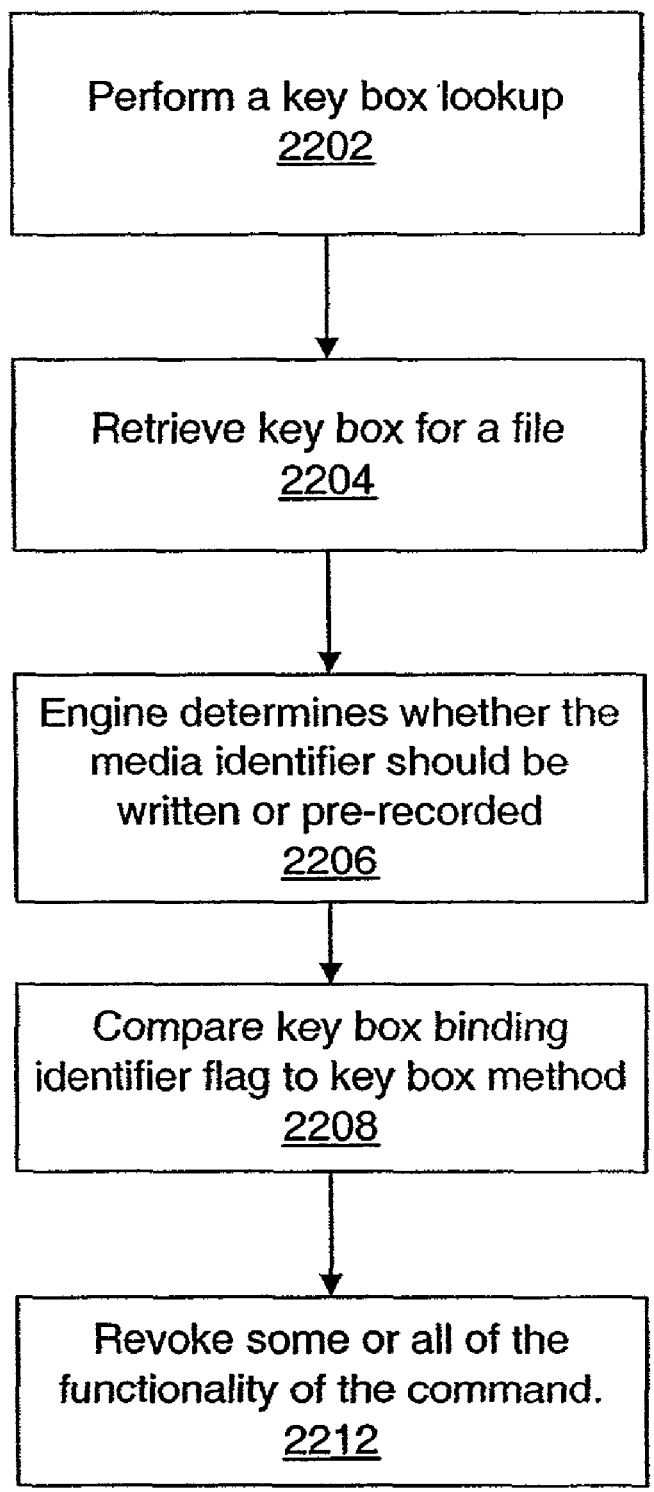
FIG. 22B illustrates a flow diagram for a method of detecting counterfeit media according to an embodiment of the present invention.

Referring to Table 4B in combination with FIG. 22B, a method for determining whether content is counterfeit is provided. The method may operate during the commands RECORD-APPEND, PLAY, GET_DRM_PLAY_KEY, GET_DRM_COPY, GET_CKDRM_PLAY_KEY, GET_CONTENT_KEY_COPY and CREATE_FILE, or any other commands according to design requirements. Block 2202 provides for performing a key box lookup. Block 2204 provides for retrieving the key box for a file. In an embodiment, the key box is encrypted and bound to a location. In block 2206, an engine determines whether the media identifier should be written or pre-recorded according to the action desired by the command. In block 2208 the key box binding identifier flag is compared with a key box read method, however, the implementation depends on the command chosen. Further, in block 2208, the method according to the command chosen is compared against the associated media identifier for the command and/or an identifier flag associated with the media identifier. If the identifier or identifier flag is not pre-recorded for those identifiers that require a pre-recorded identifier or flag, block 2212 provides for a revocation of some or all of the functionality of the command. In one embodiment, an identifier that is a counterfeit will identify itself to an engine as a pre-recorded identifier, when, in fact, the identifier is located in a portion of a disk for written content. The determination by the engine of whether the identifier is pre-recorded or written will depend on how the identifier identifies itself as well as the location of the identifier on the media. Thus, counterfeit media disks will be prevented from full functionality.

Table 5, below provides DFS command permissions, including the suggested state for pre-recorded and CKDRM files:

| File type | Read/ Modify | Write/ Modify | Move/ Modify | Rename/ Modify | Delete/ Modify | Comments |
|---|---|---|---|---|---|---|
| After file creation but before recording is complete | On/ Off | On/ On | Off/ On | Off/ On | Off/ Off | Leave write permissions on while recording. |

-continued

| File type | Read/ Modify | Write/ Modify | Move/ Modify | Rename/ Modify | Delete/ Modify | Comments |
|---|---|---|---|---|---|---|
| After recording is complete | On/ Off | Off/ Off | Off/ On | Off/ On | Off/ Off | Turn off DFS Write and DFS Write Modification. Disallow move, rename and delete, but allow these permissions to be modified. |

The first part of each entry is the state of the DFS permission attribute, and the second part is the state of the field in the DFS Attribute Modification Mask. When the Attribute Modification Mask is off further changes to the permission attribute are disallowed.

CKDRM Commands discussed above are part of the CKDRM and function according to the tables provided below:

CKCMD_AUTHENTICATE: Verifies and validates host authenticity and establishes a secure session.

TABLE 6

Command Initiation

| Register Name | Value | Description |
|---|---|---|
| Control Reg | FUNCTION CODE = 011 | Reset byte count pointer to low byte. |
| Byte Count Reg | CKCMD_AUTHENTICATE_SIZE | Command packet size. |
| Control Reg | FUNCTION CODE = 001 | Start command. |

TABLE 7

Command Packet

| Byte Offset | Field Name | Type | Description |
|---|---|---|---|
| 0 | HostCmd | U8 | Command code. |
| 1 | CkSubCmd | U8 | Sub-command code. |
| 2:241 | Certificate | CKDRM_CERTIFICATE | The host's CKDRM certificate. |

TABLE 8

Data Transfer (from engine to host)

| Byte Offset | Field Name | Type | Description |
|---|---|---|---|
| 0:37 | ESessionKey | WRAPPED_KEY | The session key for the new secure session. |

According to an embodiment, any host is allowed access to CKCMD_AUTHENTICATE. The host must deliver a valid CKDRM Certificate for the command to be successful. Any current secure session is broken. A successful execution results in a new current secure session. The parameters for the command and the settings include: HostCmd set to DPICMD_CK_COMMAND; CkSubCmd is set to CKCMD_AUTHENTICATE; Certificate is set to the host's CKDRM certificate; and ESessionKey is the secure session key encrypted using Protocol Public Key from the host's CKDRM Certificate. An implicit authentication occurs if the host can correctly decrypt ESessionKey.

As discussed above with reference to the methods performed by the engine, the authenticate command causes a host to deliver its CKDRM certificate to the engine. The engine verifies and validates the certificate. The engine also extracts the method permissions. The engine creates a secure session key and saves the key and the host certificate. The host becomes the current host for the secure session and subsequent CKDRM commands. In an exemplary embodiment, initiating the authenticate command terminates any existing secure session. A successful command initiates a new secure session. The ESessionKey value also serves as the secure session identifier.

CKCMD_GET_CERTIFICATE: Transfers the engine's CKDRM certificate to the host.

TABLE 9

Command Initiation

| Register Name | Value | Description |
|---|---|---|
| Control Reg | FUNCTION CODE = 011 | Reset byte count pointer to low byte. |
| Byte Count Reg | CKCMD_GET_CERTIFICATE_SIZE | Command packet size. |
| Control Reg | FUNCTION CODE = 001 | Start command. |

TABLE 10

Command Packet

| Byte Offset | Field Name | Type | Description |
|---|---|---|---|
| 0 | HostCmd | U8 | Command code. |
| 1 | DfsSubCmd | U8 | Sub-command code. |

TABLE 11

Data Transfer (from engine to host)

| Byte Offset | Field Name | Type | Description |
|---|---|---|---|
| 0:239 | Certificate | CKDRM_CERTIFICATE | The engine's CKDRM Certificate. |

Any host is allowed access to CKCMD_AUTHENTICATE.

The parameters used by the command include: HostCmd set to DPICMD_CK_COMMAND; CkSubCmd set to CKC- MD_GET_CERTIFICATE; Certificate, i.e., the engine's CKDRM certificate. The CKCMD_GET_CERTIFICATE command transfers the engine's CKDRM certificate to the host so that the engine's certificate may be sent to another engine (through CKCMD_AUTHENTICATE) as part of the CKDRM Copy method, Record method, Write Metadata method and Unlock method, as required.

CKCMD_CREATE_FILE: Checks CKDRM Record permissions, creates a new CKDRM file object within the given directory and establishes a write/record session.

TABLE 12

Command Initiation

| Register Name | Value | Description |
|---|---|---|
| Control Reg | FUNCTION CODE = 011 | Reset byte count pointer to low byte. |
| Byte Count Reg | CKCMD_CREATE_FILE_SIZE_NO_NAME + n | Command packet size. |
| Control Reg | FUNCTION CODE = 001 | Start command. |

TABLE 13

Command Packet

| Byte Offset | Field Name | Type | Description |
|---|---|---|---|
| 0 | HostCmd | U8 | Command code. |
| 1 | DfsSubCmd | U8 | Sub-command code. |
| 2:3 | RevocationsByteCount | U16 | The number of bytes to expect in the revocation list. |
| 4:7 | Parent | DFSHANDLE | The directory in which to create the file. |
| 8:9 | CKDRMState | CKDRM_STATE | Encoded CKDRM attributes and permissions for this file. Refer to the encoding. |
| 10 | CKDRMCopies | U8 | The number of CKDRM copies allowed. |
| 11 | DrmCopies | U8 | The number of DRM copies allowed. |
| 12:15 | Reserved | U16[2] | Reserved. |
| 16:31 | ESessionKey | WRAPPED_KEY | The current secure session key. |
| 32:47 | ERecordKey | WRAPPED_KEY | The record session key. |
| 48:67 | RevocationMac | MAC | The MAC for the attached revocation list. |
| 68:87 | CommandMac | MAC | The message authentication code. |
| 88:n + 87 | Name | DFSNAME | File name of n bytes. |

TABLE 14

CKDRMState fields (CKDRM_STATE type)

| Bit Name | Description |
|---|---|
| FILE_CKDRM_COPY_FREELY | Indicates whether the CKDRM copies may be made without restriction. |
| FILE_CKDRM_LOCKED | 0 = create an unlocked file<br>1 = create a locked file |
| FILE_CKDRM_PLAY | Indicates whether the CKDRM Play method is allowed. |
| FILE_DRM_COPY_FREELY | Indicates whether the DRM copies may be made without restriction. |
| FILE_UNLIMITED_FIRST_GENERATION_CK_COPIES | Indicates whether first generation CKDRM copies may be made without limit. |
| FILE_UNLIMITED_FIRST_GENERATION_DRM_COPIES | Indicates whether first generation DRM copies may be made without limit. |

TABLE 15

Data Transfer (from host to engine)

| Byte Offset | Field Name | Type | Description |
| --- | --- | --- | --- |
| 0:RevocationByte Count-1 | Revocation List | | The revocation list for the file. |

The command CKCMD_CREATE_FILE requires a current secure session. Only hosts with CKDRM Record method permissions are allowed access to CKCMD_CREATE_FILE. Parent must specify a directory with write permissions. The parameters of the command with settings includes: HostCmd is set to DPICMD_CK_COMMAND; CkSubCmd is set to CKCMD_CREATE_FILE; RevocationByteCount is the number of bytes to expect in the data phase of the command; Parent is the handle of the directory in which to create the file.

CKDRMState are the CKDRM attributes and permissions of the file. The member fields of the CKDRMState field is specified by the CKDRMState Fields table. CKDRMCopies specifies the number of CKDRM copies that are allowed for the file. This is the initial value of the CKDRM Copy Count value. The CKDRM Copy method must be allowed to make use of a non-zero value.

DrmCopies specifies the number of DRM copies that are allowed for the file. This is the initial value of the DRM Copy Count value. The DRM Copy method must be allowed to make use of a non-zero value.

ESessionKey is the current secure session key and is related to the CKDRM method CKCMD_AUTHENTICATE.

ERecordKey is the record session key for this file and is encrypted with the engine's public key. This is the ERecordKey value that must be used for all CKCMD_RECORD_APPEND commands for this file. This implies that the data for the CKCMD_RECORD_APPEND commands for this file are encrypted with this record session key. RevocationMac is the message authentication code of the data phase. CommandMac is the message authentication code for the command packet. It is calculated over the preceding fields of the command packet, bytes 0 through 67, inclusive. Name is the DFS name of the file. RevocationList is the revocation list for the file.

The command CKCMD_CREATE_FILE creates a CKDRM file object in the specified directory. The file initially has a file length of zero. The handle for the created file may be obtained using the DFSCMD_GETHANDLE command. The handle is used in subsequent CKCMD_RECORD_APPEND commands. The file attributes, and MIME type are set to default values. The CKDRM metadata is set as specified by the CKDRMState, CKDRMCopies, DrmCopies and RevocationList fields.

CKCMD_GET_CKDRM_COPY: Checks CKDRM Copy permissions and transfers the key box for a particular file and destination identifier. Decrements the CKDRM Copy Count for the file, if necessary. The transfer is from the engine to the host.

TABLE 19

Command Initiation

| Register Name | Value | Description |
| --- | --- | --- |
| Control Reg | FUNCTION CODE = 011 | Reset byte count pointer to low byte. |
| Byte Count Reg | CKCMD_GET_CKDRM_COPY_SIZE | Command packet size. |
| Control Reg | FUNCTION CODE = 001 | Start command. |

TABLE 20

Command Packet

| Byte Offset | Field Name | Type | Description |
| --- | --- | --- | --- |
| 0 | HostCmd | U8 | Command code. |
| 1 | DfsSubCmd | U8 | Sub-command code. |
| 2:3 | Reserved | U16 | Reserved. |
| 4:7 | SourceFile | DFSHANDLE | The file for which to get the key box. |
| 8:39 | CKDRMId | U256 | The identifier for the destination of the copy. |
| 40:55 | ESessionKey | WRAPPED_KEY | The current secure session key. |

TABLE 21

Data Transfer (from engine to host)

| Byte Offset | Field Name | Type | Description |
| --- | --- | --- | --- |
| 0:n | KeyBox | | The key box for SourceFile and the destination. |

In an embodiment, the command CKCMD_GET_CKDRM_COPY functions only during a current secure session. Only hosts with CKDRM Copy method permissions are allowed access to CKCMD_GET_CKDRM_COPY. Source file must have either a non-zero CKDRM Copy Count value, a CKDRM Copy Freely state or an Unlimited First Generation CKDRM Copies state. In one embodiment, CKCMD_GET_CKDRM_COPY is allowed for locked files or files with zero copy counts in cases in which the destination file is marked as locked.

The parameters of the fields provided in the tables include: HostCmd is set to DPICMD_CK_COMMAND; CkSubCmd is set to CKCMD_GET_CKDRM_COPY; SourceFile is the DFS handle for the file for which to get the key box; CKDRMId is the identifier the destination to which the delivered key box belongs. The identifier must be the delivered results of a CKCMD_GET_CKDRM_ID command to the destination engine. ESessionKey is the current secure session key. KeyBox is created by the engine. KeyBox is the keys and revocation list for the file specified by SourceFile and the destination specified by CKDRMId. The engine returns KeyBox to the host.

The command CKCMD_GET_CKDRM_COPY is used during the CKDRM Copy method to obtain a key box which may be delivered to a destination. This key box is associated with SourceFile. It provides the necessary information for accessing (playing) the content that is secured in the file in the copy that resides at the destination. If SourceFile has a CKDRM Copy Freely state then the resulting copy also has a CKDRM Copy Freely State. Otherwise, the resulting copy has no CKDRM copy permissions.

If SourceFile has an Unlimited First Generation CKDRM Copy state then the CKDRM Copy Count is unchanged. Otherwise, if the CKDRM Copy Count is not zero then the CKDRM Copy Count is decremented by the engine and stored back to the media prior to completion of the command. Delivery of KeyBox is associated with decrementing the Copy Count.

If SourceFile has a CKDRM Copy Freely state then the resulting copy also has a CKDRM Copy Freely State. Otherwise, the resulting copy has no DRM copy permissions. The field KeyBox must subsequently be delivered to the destination engine to complete the CKDRM Copy transaction as described by the CKDRM Copy Method section.

CKCMD_GET_CKDRM_ID: Returns information for the currently inserted media.

TABLE 22

Command Initiation

| Register Name | Value | Description |
|---|---|---|
| Control Reg | FUNCTION CODE = 011 | Reset byte count pointer to low byte. |
| Byte Count Reg | CKCMD_GET_CKDRM_ID_SIZE | Command packet size. |
| Control Reg | FUNCTION CODE = 001 | Start command. |

TABLE 23

Command Packet

| Byte Offset | Field Name | Type | Description |
|---|---|---|---|
| 0 | HostCmd | U8 (unsigned 8 bit value) | Command code. |
| 1 | CkSubCmd | U8 | Sub-command code. |
| 2:3 | Reserved | U16 | Reserved. |
| 4:19 | ESessionKey | WRAPPED_KEY | The current secure session key. |

TABLE 24

Data Transfer (from engine to host)

| Byte Offset | Field Name | Type | Description |
|---|---|---|---|
| 0:31 | CKDRMId | U256 | The CKDRM identifier for the currently inserted media. |

According to an embodiment, the command CKCMD_GET_CKDRM_ID allows any host access to CKCMD_GET_CKDRM_ID. However, the engine must have media inserted.

The parameters shown in the tables above include: HostCmd, which may be set to DPICMD_CK_COMMAND. CkSubCmd, which may be set to CKCMD_GET_CKDRM_ID. ESessionKey is the current secure session key. CKDRMId represents the identifier for the currently inserted media and the current secure session. CKCMD_GET_CKDRM_ID returns information specific to the media and is used by various CKDRM methods to provide media-specific information. Other identifiers, such as a public media identifier are available through the DFS API.

CKCMD_GET_CKDRM_PLAY_KEY: Checks CKDRM Play permissions and establishes a play session.

TABLE 25

Command Initiation:

| Register Name | Value | Description |
|---|---|---|
| Control Reg | FUNCTION CODE = 011 | Reset byte count pointer to low byte. |
| Byte Count Reg | CKCMD_GET_CKDRM_PLAY_KEY_SIZE | Command packet size. |
| Control Reg | FUNCTION CODE = 001 | Start command. |

TABLE 26

Command Packet

| Byte Offset | Field Name | Type | Description |
|---|---|---|---|
| 0 | HostCmd | U8 | Command code. |
| 1 | DfsSubCmd | U8 | Sub-command code. |
| 2:3 | Reserved | U16 | Reserved |
| 4:7 | PlayFile | DFSHANDLE | The file handle for which the key is needed. |
| 8:23 | ESessionKey | WRAPPED_KEY | The current secure session key. |

TABLE 27

Data Transfer (from engine to host)

| Byte Offset | FieldName | Type | Description |
|---|---|---|---|
| 0:15 | EPlayKey | AES_KEY | The play session key for the specified file. |

The command, according to one embodiment, requires a current secure session. Further, only hosts with CKDRM Play method permissions are allowed access to CKCMD_GET_CKDRM_PLAY_KEY. PlayFile must specify a file that is unlocked and has CKDRM Play and DFS Read permissions.

The parameters used by the command include: HostCmd set to DPICMD_CK_COMMAND; CkSubCmd set to CKCMD_GET_CKDRM_PLAY_KEY; PlayFile is the DFS handle for the file for which the play session key is to be returned; ESessionKey is the current secure session key. EPlayKey is the play session key encrypted with the secure session key. The play session key is specific to the file specified by PlayFile. More particularly, the play session key is the key with which the file will be encrypted in the subsequent CKCMD_PLAY commands for PlayFile.

The command CKCMD_GET_CKDRM_PLAY_KEY transfers the decryption key for a particular file from the engine to the host. The command must be issued prior to every CKDRM play session. The key value selected is used for the duration of the play session. The host must not assume that the key will be the same for the file each time it is played off the media. The content of the file in the form that can be decrypted by the play session key may be obtained through the CKCMD_PLAY command.

CKCMD_GET_DRM_COPY: Checks TPDRM Copy permissions and establishes a play session. Decrements the TPDRM Copy Count value, if necessary.

TABLE 29

Command Initiation

| Register Name | Value | Description |
| --- | --- | --- |
| Control Reg | FUNCTION CODE = 011 | Reset byte count pointer to low byte. |
| Byte Count Reg | CKCMD_GET_DRM_COPY_SIZE | Command packet size. |
| Control Reg | FUNCTION CODE = 001 | Start command. |

TABEL 30

Command Packet:

| Byte Offset | Field Name | Type | Description |
| --- | --- | --- | --- |
| 0 | HostCmd | U8 | Command code. |
| 1 | DfsSubCmd | U8 | Sub-command code. |
| 2:3 | Reserved | U16 | Reserved |
| 4:7 | SourceFile | DFSHANDLE | The file for which to get the key. |
| 8:23 | ESessionKey | WRAPPED_KEY | The current secure session key. |

TABLE 31

Data Transfer (from engine to host)

| Byte Offset | Field Name | Type | Description |
| --- | --- | --- | --- |
| 0:15 | EPlayKey | AES_KEY | The play session key for the specified file. |
| 16:n | Revocation List | | The CKDRM revocation list associated with the file. |

The command CKCMD_GET_DRM_COPY requires a current secure session. Only hosts with TPDRM Copy method permissions are allowed access to CKCMD_GET_DRM_COPY. SourceFile must specify a file that is unlocked. Source file must have either a non-zero TPDRM Copy Count value, a TPDRM Copy Freely state or an Unlimited First Generation TPDRM Copies state.

The parameters required by CKCMD_GET_DRM_COPY and settings include: HostCmd is set to DPICMD_CK_COMMAND; CkSubCmd is set to CKCMD_GET_DRM_COPY; SourceFile is the DFS handle for the file for which to get the key; ESessionKey is the current secure session key. The field EPlayKey is the play session key encrypted with the secure session key. The play session key is specific to the file specified by SourceFile. That is, the play session key is the key with which the content is encrypted in subsequent CKCMD_PLAY commands for SourceFile. RevocationList is the revocation list for the file.

The command CKCMD_GET_DRM_COPY is used to obtain the key for a file. It is used in the DRM Copy method.

If the DRM Copy Count value associated with the file is not zero then the DRM Copy Count is decremented and rewritten to the media prior to completion of the command. CKCMD_GET_DRM_COPY is used during the DRM Copy method to obtain a play session key which may be stored along with the contents from a CKCMD_PLAY command. The files revocation list is also obtained and must be delivered whenever this content is imported to CKDRM. If SourceFile has a CKDRM Copy Freely state then the resulting copy also has a CKDRM Copy Freely State. Otherwise, the resulting copy has no CKDRM copy permissions, If SourceFile has a TPDRM Copy Freely or Unlimited First Generation CKDRM Copy state then the TPDRM Copy Count is unchanged. Otherwise, if the TPDRM Copy Count is not zero then the TPDRM Copy Count is decremented by the engine and stored back to the media prior to completion of the command. Delivery of EPlayKey is associated with decrementing the TPDRM Copy Count.

CKCMD_GET_METADATA: Checks Read Secure Metadata permissions and transfers third-party, host-specific secure metadata from the media to the host.

TABLE 32

Command Initiation

| Register Name | Value | Description |
| --- | --- | --- |
| Control Reg | FUNCTION CODE = 011 | Reset byte count pointer to low byte. |
| Byte Count Reg | CKCMD_GET_METADATA_SIZE | Command packet size. |
| Control Reg | FUNCTION CODE = 001 | Start command. |

TABLE 33

Command Packet

| Byte Offset | Field Name | Type | Description |
| --- | --- | --- | --- |
| 0 | HostCmd | U8 | Command code. |
| 1 | DfsSubCmd | U8 | Sub-command code. |
| 2:3 | Reserved | U16 | Reserved |
| 4:7 | Associated File | DFSHANDLE | The file handle with which the metadata is associated. |
| 8:23 | ESessionKey | WRAPPED_KEY | The current secure session key. |

TABLE 34

Data Transfer (from engine to host)

| Byte Offset | Field Name | Type | Description |
| --- | --- | --- | --- |
| 0:n − 1 | Metadata | | The metadata associated with a particular file and host; n bytes. |

The command CKCMD_GET_METADATA functions during a current secure session. Only hosts with Read Secure Metadata method permissions are allowed access to CKCMD_GET_METADATA. SourceFile must specify a file that is unlocked. SourceFile must specify a file that has metadata specific to the MetadataIdentifier value for the host.

The parameters required by the command and settings include: HostCmd is set to DPICMD_CK_COMMAND; CkSubCmd is set to CKCMD_GET_METADATA; ESessionKey is the current secure session key. See CKCMD_AUTHENTICATE for more information; Metadata is the metadata for the file that is securely stored. The metadata may be limited to 1024 bytes per file per host.

CKCMD_GET_METADATA returns third-party, host-specific secure metadata associated with a file. The metadata returned may be the metadata written by the last CKCMD_SET_METADATA for this host and file. If there has been no such command issued then the metadata pre-recorded for this file and host is returned. In an exemplary embodiment, the engine does not interpret the metadata in any way. The metadata may only be accessible to the host for the current secure session and only the metadata for that specific host may be accessible.

CKCMD_PLAY: Transfers secure content from the engine to the host under an established play session.

TABLE 35

Command Initiation

| Register Name | Value | Description |
|---|---|---|
| Control Reg | FUNCTION CODE = 011 | Reset byte count pointer to low byte. |
| Byte Count Reg | CKCMD_PLAY_SIZE | Command packet size. |
| Control Reg | FUNCTION CODE = 001 | Start command. |

TABLE 36

Command Packet:

| Byte Offset | Field Name | Type | Description |
|---|---|---|---|
| 0 | HostCmd | U8 | Command code. |
| 1 | DfsSubCmd | U8 | Sub-command code. |
| 2:3 | PlayOptions | U16 | Play options. Refer to the encoding. |
| 4:7 | PlayFile | DFSHANDLE | File to play. |
| 8:15 | ByteOffset | U64 | Byte offset within the file from which to play. |
| 16:23 | ByteCount | U64 | Number of bytes to transfer. |
| 24:39 | ESessionKey | WRAPPED_KEY | The current secure session key. |
| 40:55 | EPlayKey | AES_KEY | The current play session key. |

TABLE 37

PlayOptions Encoding

| Bit Number | Bit Mask Name | Description |
|---|---|---|
| 0 | PLAY_STREAMING | 0 = play normal; stop on play error<br>1 = streamed play; no stop on play error |
| 1 | PLAY_TO_EOF | 0 = play normal; stop when given byte count reached<br>1 = play to the end of the file; ignore the |

TABLE 37-continued

PlayOptions Encoding

| Bit Number | Bit Mask Name | Description |
|---|---|---|
|  |  | ByteCount field in the command packet |
| 2:15 |  | Reserved. |

According to an embodiment, the command operates during a current secure session. Only hosts with CKDRM Play or DRM Copy method permissions are allowed access to CKCMD_PLAY. PlayFile must specify a file that is unlocked. PlayFile must specify a file that has DFS Read permissions. PlayFile must specify a file that has CKDRM Play or DRM Copy permissions. In the CKDRM Play method the received content may not be stored; in the DRM Copy method the received content may be stored.

The parameters required by the command include: HostCmd, which may be set to DPICMD_CK_COMMAND; CkSubCmd may be set to CKCMD_PLAY; PlayOptions are the options for this command. PlayFile is the DFS handle of the file to access; ByteOffset is the location within the file to start the transfer.

Because of the encryption of the file, the ByteOffset value could be a multiple of 16. In one embodiment, the value must be a multiple of 16. ByteCount is the number of bytes to transfer. If the PLAY_TO_EOF bit is asserted in PlayOptions then this field is ignored; otherwise, ByteCount must be a multiple of 16. ESessionKey is the current secure session key. See CKCMD_AUTHENTICATE for more information. EPlayKey is the play session key for the file specified by PlayFile, encrypted with the secure session key. The value may be the same as the value returned by the engine in the EPlayKey field in a preceding command for the same file. For the CKDRM Play method the preceding command is CKCMD_GET_CKDRM_PLAY_KEY. For the DRM Copy method, the preceding command is CKCMD_GET_DRM_COPY. The data returned is the file contents, encrypted with the play session key.

CKCMD_PLAY returns the content of the file encrypted with the play session key. Other than the encryption of content, CKCMD_PLAY is functionally equivalent to DFS_READFILE. Refer to the DataPlay File System commands specification for a complete description of the options and end-of-file behavior.

CKCMD_RECORD_APPEND: Checks CKDRM Record permissions and transfers secure content from a host to the end of a file.

TABLE 38

Command Initiation

| Register Name | Value | Description |
|---|---|---|
| Control Reg | FUNCTION CODE = 011 | Reset byte count pointer to low byte. |
| Byte Count Reg | CKCMD_RECORD_APPEND_SIZE | Command packet size. |
| Control Reg | FUNCTION CODE = 001 | Start command. |

TABLE 39

Command Packet

| Byte Offset | Field Name | Type | Description |
|---|---|---|---|
| 0 | HostCmd | U8 | Command code. |
| 1 | DfsSubCmd | U8 | Sub-command code. |
| 2:3 | RecordOptions | U16 | Record options. Refer to the encoding. |
| 4:7 | RecordFile | DFSHANDLE | File to record. |
| 8:15 | ByteCount | U64 | Number of bytes to transfer. |
| 16:31 | ESessionKey | WRAPPED_KEY | The current secure session key. |
| 32:47 | ERecordKey | WRAPPED_KEY | The current record session key. |

TABLE 40

RecordOptions Encoding

| Bit Number | Bit Mask Name | Description |
|---|---|---|
| 0 | RECORD_FOREVER | 0 = record normal; transfer the number of bytes specified by ByteCount<br>1 = record forever; the ByteCount field is ignored |
| 1:15 | | Reserved. |

The CKCMD_RECORD_APPEND, in one embodiment, requires a current secure session. Only hosts with CKDRM Record method permissions are allowed access to CKCMD_RECORD_APPEND. RecordFile must specify a file with CKDRM Record and DFS Write permissions. The file may be locked or unlocked.

The parameters used by the command include: HostCmd, which may be set to DPICMD_CK_COMMAND; CkSubCmd may be set to CKCMD_RECORD_APPEND; RecordOptions are the options for this command and are encoded and behave as described by a RecordOptions Encoding table; RecordFile is the DFS handle of the file to access; ByteCount is the number of bytes to transfer, however, if the RECORD_FOREVER bit is asserted in RecordOptions then this field is ignored; ESessionKey is the current secure session key; ERecordKey is the current record session key and may be encrypted with the engine's protocol key. In an embodiment, the same record session key must be used for all instances of this command, and must match the record session key from the CKCMD_CREATE_FILE command that created the file. The data received is the content to add to the file. The data is encrypted with at least the record session key.

According to an embodiment, CKCMD_RECORD_APPEND adds content to the end of the file specified. CKCMD_RECORD_APPEND is functionally the opposite of CKCMD_PLAY. It is functionally equivalent to DFSCMD_WRITE_APPEND except for the encryption of the data.

CKCMD_SET_KEYBOX: Transfers a key box from the host for a particular file. The key box provides keys for unlocking data and may be bound to the media when content is pre-mastered.

TABLE 41

Command Initiation:

| Register Name | Value | Description |
|---|---|---|
| Control Reg | FUNCTION CODE = 011 | Reset byte count pointer to low byte. |
| Byte Count Reg | CKCMD_SET_KEYBOX_SIZE | Command packet size. |
| Control Reg | FUNCTION CODE = 001 | Start command. |

TABLE 42

Command Packet

| Byte Offset | Field Name | Type | Description |
|---|---|---|---|
| 0 | HostCmd | U8 | Command code. |
| 1 | DfsSubCmd | U8 | Sub-command code. |
| 2:3 | Reserved | U16 | Reserved |
| 4:7 | AssociatedFile | DFSHANDLE | The file associated with KeyBox. |

TABLE 43

Data Transfer (from host to engine)

| Byte Offset | Field Name | Type | Description |
|---|---|---|---|
| 0:n | KeyBox | | The key box for the file. |

There must be a current secure session. Any host may be allowed access to CKCMD_SET_KEYBOX. AssociatedFile must specify a file that is unlocked and does not have a key box or CKDRM metadata.

The parameters required by the command include: HostCmd is set to DPICMD_CK_COMMAND; CkSubCmd is set to CKCMD_SET_KEYBOX; AssociatedFile is the DFS handle for the file with which KeyBox is associated; KeyBox is the key box for the file specified by AssociatedFile and the destination specified by CKDRMId.

The command directs that the engine writes the key box to the media and associates it with the specified file, thereby enabling the file for permissible CKDRM methods.

CKCMD_SET_METADATA: Checks Write Secure Metadata permissions and transfers third-party, host-specific secure metadata from the host to the media.

TABLE 44

Command Initiation

| Register Name | Value | Description |
|---|---|---|
| Control Reg | FUNCTION CODE = 011 | Reset byte count pointer to low byte. |
| Byte Count Reg | CKCMD_SET_METADATA_SIZE | Command packet size. |
| Control Reg | FUNCTION CODE = 001 | Start command. |

TABLE 45

Command Packet

| Byte Offset | Field Name | Type | Description |
|---|---|---|---|
| 0 | HostCmd | U8 | Command code. |
| 1 | DfsSubCmd | U8 | Sub-command code. |
| 2:3 | Reserved | U16 | Reserved |
| 4:7 | Associated File | DFSHANDLE | The file with which the metadata is associated. |
| 8:23 | ESessionKey | WRAPPED_KEY | The current secure session key. |

TABLE 46

Data Transfer (from host to engine)

| Byte Offset | FieldName | Type | Description |
|---|---|---|---|
| 1:n − 1 | Metadata | | The secure metadata associated with a particular file and host; n bytes. |

There must be a current secure session. Only hosts with Write Secure Metadata method permissions are allowed access to CKCMD_SET_METADATA. AssociatedFile must specify a file that is unlocked. AssociatedFile may already have metadata specific to the MetadataIdentifier value for the host.

The parameters HostCmd is set to DPICMD_CK_COMMAND; CkSubCmd is set to CKCMD_SET_METADATA; AssociatedFile is the DFS handle for the file with which the metadata is associated; ESessionKey is the current secure session key. See CKCMD_AUTHENTICATE for more information; Metadata is the metadata associated with the file for the current host to be securely stored.

CKCMD_SET_METADATA is the complement function to CKCMD_GET_METADATA. This command writes DRM- or host-specific secure metadata to the DataPlay media for a particular file. The metadata received will be returned for subsequent CKCMD_GET_METADATA commands for this host and file. If AssociatedFile already has metadata specific to the MetadataIdentifier value for the host then it is overwritten by the new metadata.

The engine writes the metadata to the media and associates it with the specified file and the host for the current secure session. The engine does not interpret the metadata in any way.

The secure metadata will only be accessible to the host specified by the Metadata Identifier fields of the host CKDRM certificate for the current secure session.

CKCMD_UNLOCK_FILES: Checks CKDRM Unlock permissions and unlocks files.

TABLE 47

Command Initiation:

| Register Name | Value | Description |
|---|---|---|
| Control Reg | FUNCTION CODE = 011 | Reset byte count pointer to low byte. |
| Byte Count Reg | CKCMD_UNLOCK_SIZE | Command packet size. |
| Control Reg | FUNCTION CODE = 001 | Start command. |

TABLE 48

Command Packet

| Byte Offset | Field Name | Type | Description |
|---|---|---|---|
| 0 | HostCmd | U8 | Command code. |
| 1 | CkSubCmd | U8 | Sub-command code. |
| 2:3 | FileCount | U16 | Number of files to unlock, n. |
| 4:7 | Reserved | U16[2] | Reserved. |
| 8:23 | EUnlockKey | WRAPPED_KEY | The unlock key for EKeyComplement decryption. |
| 24:39 | EMediaId | U128 | The public unique media identifier. |
| 40:59 | DataMac | MAC | The message authentication code for the data transfer. |

TABLE 49

Data Transfer (from host to engine)

| Byte Offset | Field Name | Type | Description |
|---|---|---|---|
| 0:24n − 1 | FileSet | FILE SET[n] | A list of identifiers of the files to unlock. |

TABLE 50

FILE_SET data structure

| Byte Offset | Field Name | Type | Description |
|---|---|---|---|
| 0:3 | Handle | DFSHANDLE | The file to unlock. |
| 4:23 | EKeyComplement | U160 | The complement of the key set for the file. |

There must be a current secure session. Only hosts with CKDRM Unlock method permissions are allowed access to CKCMD_UNLOCK_FILES. The Handle fields in the FileSet list must each specify a file and must have CKDRM metadata.

The parameters for the CKCMD_UNLOCK_FILES include: HostCmd is set to DPICMD_CK_COMMAND; CkSubCmd is set to CKCMD_UNLOCK_FILES; FileCount is the number of files to unlock; EUnlockKey is the encrypted unlock key and is the key with which key complements are encrypted to form EKeyComplement values; EMediaId is the encrypted media identifier; DataMac is the message authentication code for the data packet. It is calculated over the FileSet field; FileSet is an array of identifiers of the files to unlock, the number of entries for which is the value specified by FileCount, each entry for which is a FileSet Element; the Handle field is the DFS handle of the file to unlock; the EKeyComplement field is the complement of the key set for the file, i.e., the complete key box may not be on the media and this field provides the remaining key box information needed to decrypt the file; and EKeyComplement is the complement value encrypted with the engine's public key.

The command CKCMD_UNLOCK_FILES instructs the engine to unlock a set of files. A secure session must be active with the host, and the host must have CKDRM Unlock permissions. In a successful CKCMD_UNLOCK_FILES command, the engine completes each file's key box and changes the attribute from locked to unlocked.

Cryptographic Algorithms

The above-described methods for the TPDRM, CKDRM and DFS use cryptographic algorithms. The manner in which the cryptographic algorithms apply to the methods depends on design requirements. Encryption techniques disclosed herein, therefore, are exemplary in nature, with the number of bits applicable to encrypted techniques being a function of available bit space and cost-efficiency. In one embodiment, AES functions may use 128-bit keys. The public key cryptography may be elliptic curve cryptography or another appropriate type of cryptography.

Referring back to the CKDRM methods, key encryption applies to key complements in the UNLOCK methods. For example, the method CKCMD_UNLOCK_FILES requires that key complements be transported. Thus, an embodiment provides that key complements are transported in EKeyComplement fields. The key complement may be encrypted and decrypted using AES with the unlock key as the AES key pair. Other fields applicable to the UNLOCK method include media identifiers and EmediaId fields. In an embodiment, the method CKCMD_UNLOCK_FILES provides that media identifiers are transported in EMediaId fields. The media identifier may be encrypted and decrypted using AES with a secure session key as the AES key.

The fields for Message Authentication Codes, CommandMac, DataMac, and RevocationMac also apply to the UNLOCK method, and further apply to the CKDRM CREATE FILE method. More specifically, message authentication codes are transported in CommandMac, DataMac, and RevocationMac fields. The message authentication code may be generated using the SHA-1 MAC function. The key for the MAC function is the current secure session key.

Play Session Content Encryption applies to the CKDRM method CKCMD_PLAY. More specifically, play session content may be transported in the data transfer phase of the CKCMD_PLAY method. The content may be encrypted and decrypted using AES with the play session key as the AES key.

Play Session Key encryption applies to the CKDRM methods CKCMD_GET_CKDRM_PLAY_KEY, CKCMD_GET_ DRM_COPY and CKCMD_PLAY. In one embodiment, play session keys may be transported in EPlayKey fields or another appropriate field. The play session key may be encrypted and decrypted using AES with the secure session key as the AES key.

For record session content encryption, the CKDRM uses the method CKCMD_RECORD_APPEND. Record session content may be transported in the data transfer phase of the CKCMD_RECORD_APPEND method. The content may be encrypted and decrypted using AES with the record session key as the AES key. Similarly, for Record Session Key Encryption, ErecordKey, the method CKCMD_CREATE_FILE and CKCMD_RECORD_APPEND.

Record session keys are transported in ERecordKey fields. For one embodiment, the record session key is encrypted using the public key encryption function with the engine's Protocol Public Key as the public key. This public key is from the engine's CKDRM certificate. The encrypted record session key may be decrypted using the private key decryption function with the engine's private key corresponding to the engine's Protocol Public Key.

For Secure Session Key Encryption, the field EsessionKey is for the CKDRM methods CKCMD_AUTHENTICATE, CKCMD_CREATE_FILE, CKCMD_GET_CKDRM_COPY, CKCMD_GET_CKDRM_PLAY_KEY, CKCMD_GET_CKDRM_ID, CKCMD_GET_DRM_COPY, CKCMD_GET_METADATA, CKCMD_PLAY, CKCMD_RECORD_APPEND, CKCMD_SET_METADATA, and CKCMD_UNLOCK_FILES.

Secure session keys may be transported in ESessionKey fields. The secure session key is encrypted using the public key encryption function with the host's Protocol Public Key as the public key. This public key is from the host's CKDRM certificate for the current secure session. The encrypted secure session key may be decrypted using the private key decryption function with the private key corresponding to the host's Protocol Public Key.

For unlock key encryption, an embodiment uses the EunlockKey fields with the CKDRM method CKCMD_UNLOCK_FILES. For this method, the unlock keys are transported in EUnlockKey fields. For an embodiment, the unlock key is encrypted using the public key encryption function with the engine's Protocol Public Key as the public key. The public key may be from the engine's CKDRM Certificate. The encrypted unlock key may be decrypted using the private key decryption function with the engine's private key corresponding to the engine's Protocol Public Key.

One embodiment includes manifest constants including the opcodes below, which of ordinary skill in the art appreciates can be any opcode that doesn't collide. The manifest constants provided below pertain to one exemplary embodiment of non-colliding opcodes.

```
/* ---------------------- Simple Type Definitions ------------------------ */
// CKDRM standard type definitions and bit mask definitions.
// Certicom types (sb_PublicKey, sb_SignatureECDSA) are defined
in Certicom headers.
TYPEDEF (U128, AES_KEY);            // a 128-bit AES key
TYPEDEF (U160, MAC);                // a 160-bit Message Authentication Code
// EXPOSED_METHODS definition, methods exposed by Ckdrm Certificate.
TYPEDEF (U16, EXPOSED_METHODS);
    #define HOST_CKDRM_COPY         0x0001          // bit 0
    #define HOST_CKDRM_PLAY         0x0002          // bit 1
    #define HOST_DRM_COPY           0x0004          // bit 2
    #define HOST_READ_SECURE_       0x0008          // bit 3
    METADATA
    #define HOST_WRITE_SECURE_      0x0010          // bit 4
    METADATA
    #define HOST_CKDRM_RECORD       0x0020          // bit 5
    #define HOST_CKDRM_UNLOCK       0x0040          // bit 6
// CKDRM_STATE definition, CKDRM permission and attribute flags.
TYPEDEF (U16, CKDRM_STATE};
    #define FILE_CKDRM_COPY_FREELY  0x0001          // bit 0
    #define FILE_CKDRM_LOCKED       0x0002          // bit 1
    #define FILE_CKDRM_PLAY         0x0004          // bit 2
    #define FILE_DRM_COPY_FREELY    0x0008          // bit 3
    #define FILE_UNLIMITED_FIRST_   0x0010          // bit 4
    GENERATION_CK_COPIES
#define FILE_UNLIMITED_FIRST_       0x0020          // bit 5
GENERATION_DRM_COPIES
/* ------------------------------ Constants ------------------------------ */
#define DPICMD_CK_COMMAND           0x10
// CKDRM sub-command opcode definitions.
#define CKCMD_AUTHENTICATE          0xF2
#define CKCMD_CREATE_FILE           0xF3
#define CKCMD_GET_CERTIFICATE       0xF4
#define CKCMD_GET_CKDRM_COPY        0xF5
#define CKCMD_GET_CKDRM_ID          0xF6
#define CKCMD_GET_CKDRM_PLAY_KEY    0xF7
#define CKCMD_GET_DRM_COPY          0xF8
#define CKCMD_GET_DRM_PLAY_KEY      0xF9
#define CKCMD_GET_METADATA          0xFA
#define CKCMD_PLAY                  0xFB
#define CKCMD_RECORD_APPEND         0xFC
#define CKCMD_SET_KEYBOX            0xFD
#define CKCMD_SET_METADATA          0xFE
define CKCMD_UNLOCK_FILES          0xFF /* ------------------ General CKDRM Data Structures ------------------ */
// CKDRM Certificate
typedef struct
{                                                   // Bytes
    U16                 CAIdentifier;               // 0:1
    U16                 CertificateFormatVersion;   // 2:3
    U16                 CASignaturePublicKeyId;     // 4:5
    U16                 CryptographyVersion;        // 6:7
    EXPOSED_METHODS     ExposedMethods;             // 8:9
    U16                 Reserved1[3];               // 10:15
    U16                 Company;                    // 16:17
    U16                 Division;                   // 18:19
    U16                 ProductLine;                // 20:21
    U16                 Model;                      // 22:23
    U16                 Revision;                   // 24:25
    U16                 MetadataIdentifier;         // 26:27
    U16                 Reserved2[2];               // 28:31
    sb_PublicKey        CompanySignaturePublicKey;  // 32:77
    sb_SignatureECDSA   CASignature;                // 78:121
    U128                DeviceIdentifier;           // 122:137
    sb_PublicKey        ProtocolPublicKey;          // 138:183
    sb_SignatureECDSA   CompanySignature;           // 184:227
} CKDRM_CERTIFICATE;
// CKCMD_AUTHENTICATE definitions
typedef struct
{                                                   // Bytes
    U8 HostCmd;                                     // 0, value = DPICMD_CK_COMMAND
    U8 CkSubCmd;                                    // 1, value = CKCMD_AUTHENTICATE
```

-continued

```
    CKDRM_CERTIFICATE     Certificate;          // 2:241
} CKCMD_AUTHENTICATE_COMMAND_PACKET;
// CKCMD_CREATE_FILE definitions
typedef struct
{                                                // Bytes
    U8                   HostCmd;                // 0, value = DPICMD_CK_COMMAND
    U8                   CkSubCmd;               // 1, value = CKCMD_CREATE_FILE
    U16                  RevocationByteCount;    // 2:3
    DFSHANDLE            Parent;                 // 4:7
    CKDRM_STATE CKDRM    State;                  // 8:9
    U8                   CKDRMCopies;            // 10
    U8                   DrmCopies;              // 11
    U16                  Reserved[2];            // 12:15
    AES_KEY              ESessionKey;            // 16:31
    AES_KEY              ERecordKey;             // 32:47
    MAC                  RevocationMac;          // 48:67
    MAC                  CommandMac;             // 68:87
    DFSNAME              Name;                   // 88:n + 87
} CKCMD_CREATE_FILE_COMMAND_PACKET;
// CKCMD_GET_CERTIFICATE definitions
typedef struct
{                                                // Bytes
U8 HostCmd;                                      // 0, value = DPICMD_CK_COMMAND
U8 CkSubCmd                                      // 1, value = CKCMD_GET_CERTIFICATE
} CKCMD_GET_CERTIFICATE_COMMAND_PACKET;
// CKCMD_GET_CKDRM_COPY definitions
typedef struct
{                                                // Bytes
    U8                   HostCmd;                // 0, value = DPICMD_CK_COMMAND
    U8                   CkSubCmd;               // 1, value = CKCMD_GET_CKDRM_COPY
    U16                  Reserved;               // 2:3
    DFSHANDLE            SourceFile;             // 4:7
    U256                 CKDRMId;                // 8:39
    AES_KEY              ESessionKey;            // 40:55
} CKCMD_GET_CKDRM_COPY_COMMAND_PACKET;
// CKCMD_GET_CKDRM_ID definitions
typedef struct
{                                                // Bytes
    U8                   HostCmd;                // 0, value = DPICMD_CK_COMMAND
    U8                   CkSubCmd;               // 1, value = CKCMD_GET_CKDRM_ID
    U16                  Reserved;               // 2:3
    AES_KEY              ESessionKey;            // 4:19
} CKCMD_GET_CKDRM_ID_COMMAND_PACKET;
// CKCMD_GET_CKDRM_PLAY_KEY definitions
typedef struct
{                                                // Bytes
    U8                   HostCmd;                // 0, value = DPICMD_CK_COMMAND
    U8                   CkSubCmd;               // 1, value = CKCMD_GET_CKDRM_PLAY_KEY
    U16                  Reserved;               // 2:3
    DFSHANDLE            PlayFile;               // 4:7
    AES_KEY              ESessionKey;            // 8:23
} CKCMD_GET_PLAY_KEY_COMMAND_PACKET;
// CKCMD_GET_DRM_COPY definitions
typedef struct
{                                                // Bytes
    U8                   HostCmd;                // 0, value = DPICMD_CK_COMMAND
    U8                   CkSubCmd;               // 1, value = CKCMD_GET_DRM_COPY
    U16                  Reserved;               // 2:3
    DFSHANDLE:           SourceFile;             // 4:7
    AES_KEY              ESessionKey;            // 8:23
} CKCMD_GET_DRM_COPY_COMMAND_PACKET;
// CKCMD_GET_METADATA definitions
typedef struct
{                                                // Bytes
    U8                   HostCmd;                // 0, value = DPICMD_CK_COMMAND
    U8                   CkSubCmd;               // 1, value = CKCMD_GET_METADATA
    U16                  Reserved;               // 2:3
    DFSHANDLE            AssociatedFile;         // 4:7
    AES_KEY              ESessionKey;            // 8:23
} CKCMD_GET_METADATA_COMMAND_PACKET;
// CKCMD_PLAY definitions
typedef struct
{                                                // Bytes
    U8                   HostCmd;                // 0, value = DPICMD_CK_COMMAND
    U8                   CkSubCmd;               // 1, value = CKCMD_PLAY
    U16                  PlayOptions;            // 2:3, see bit field defintions below
    DFSHANDLE            PlayFile;               // 4:7
    U64                  ByteOffset;             // 8:15
    U64                  ByteCount;              // 16:23
```

```
        AES_KEY              ESessionKey;              // 24:39
        AES_KEY              EPlayKey;                 // 40:55
} CKCMD_PLAY_COMMAND_PACKET;
// PlayOptions bit fields.
        #define PLAY_STREAMING       0x0001            // bit 0
        #define PLAY_TO_EOF          0x0002            // bit 1
// CKCMD_RECORD_APPEND definitions
typedef struct
{                                                     // Bytes
        U8                   HostCmd;                 // 0, value = DPICMD_CK_COMMAND
        U8                   CkSubCmd;                // 1, value = CKCMD_RECORD_APPEND
        U16                  RecordOptions;           // 2:3, see bit field definitions below
        DFSHANDLE            RecordFile;              // 4:7
        U64                  ByteCount;               // 8:15
        AES_KEY              ESessionKey;             // 16:31
        AES_KEY              ERecordKey;              // 32:47
} CKCMD_RECORD_APPEND_COMMAND_PACKET;
// RecordOptions bit field.
#define RECORD_FOREVER       0x0001                   // bit 0
// CKCMD_SET_KEYBOX definitions
typedef struct
{                                                     // Bytes
        U8                   HostCmd;                 // 0, value = DPICMD_CK_COMMAND
        U8                   CkSubCmd;                // 1, value = CKCMD_SET_KEYBOX
        U16                  Reserved;                // 2:3
        DFSHANDLE            AssociatedFile;          // 4:7
} CKCMD_SET_KEYBOX_COMMAND_PACKET;
// CKCMD_SET_METADATA definitions
typedef struct
{                                                     // Bytes
        U8                   HostCmd;                 // 0, value = DPICMD_CK_COMMAND
        U8                   CkSubCmd;                // 1, value = CKCMD_SET_METADATA
        U16                  Reserved;                // 2:3
        DFSHANDLE            AssociatedFile;          // 4:7
        AES_KEY              ESessionKey;             // 8:23
} CKCMD_SET_METADATA_COMMAND_PACKET;
TYPEDEF (CKCMD_SET_METADATA_COMMAND_PACKET, sCKCMD_SET_METADATA_
COMMAND_PACKET);
// CKCMD_UNLOCK_FILES definitions
typedef struct
{                                                     // Bytes
        U8                   HostCmd;                 // 0, value = DPICMD_CK_COMMAND
        U8                   CkSubCmd;                // 1, value = CKCMD_UNLOCK_FILES
        U16                  FileCount;               // 2:3
        U16                  Reserved[2];             // 4:7
        AES_KEY              ESessionKey;             // 8:23
        U128                 EMediaId;                // 24:39
        MAC                  DataMac;                 // 40:59
} CKCMD_UNLOCK_FILES_COMMAND_PACKET;
```

Methods Performed with a Server

Another embodiment of the present invention is directed to interactions between servers and other entities, such as players. Thus, the secure electronic content system includes interactions between servers and hosts and engines to unlock and render secure content. The CKDRM, DFS and TPDRMs described above interact to permit unlocking content in a secure environment.

Figure 23A:
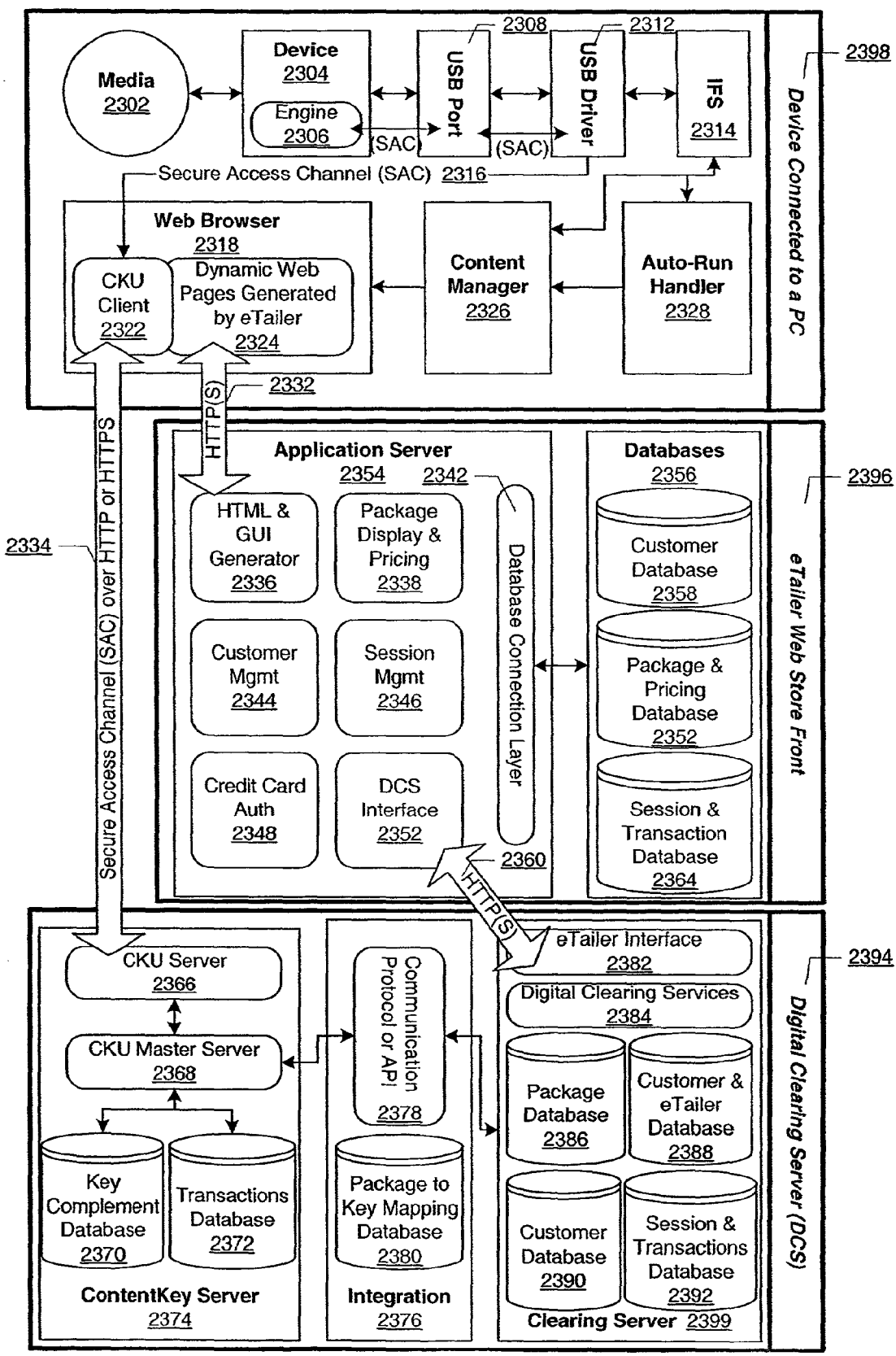
FIG. 23A, an architecture diagram provides an embodiment of the interactions between servers, hosts and engines.

Referring to FIG. 23A, an architecture diagram provides an embodiment of the interactions between servers, hosts and engines. As shown, the server, such as a digital clear server 2394 interacts with both an electronic retailer (eTailer) via web-enabled communication line 2360 and with a device connected to a personal computer (PC) 2398 via a secure access channel 2334. The device connected to the PC 2398 receives the communications from server 2394 via a web browser 2318 wherein a CKU client 2322 receives the communication. The web browser 2318 further includes a dynamic web page(s) that is generated by an eTailer 2324, which receives signals from an application server 2354. Application server 2354, in one embodiment includes a HTML and a GUI generator object 2336, a package display and pricing object 2338, a customer management object 2344, a session management object 2346, a credit card authorization object 2348, a digital clearing server (DCS) interface 2352 and a database connection layer 2342 that couples the application server 2354 to a plurality of databases 2356. The plurality of databases 2356 and the application server 2354 are part of the eTailer web store front 2396. In particular, the databases included in the eTailer web store front 2396 include a customer database 2358, package and pricing database 2362 and a session and transaction database 2364. As one of ordinary skill in the art will appreciate, however, the databases in the eTailer web store front are according to design requirements and may include more or less of the objects and databases described herein. Referring to the device connected to the personal computer 2398, as described above, the web browser 2318 within the device connected to the PC connects via a secure access channel 2334 to a server, such as the digital clearing server 2394. The web browser 2318 is further connected via a secure access channel 2316 to a USB driver 2312 which also follows a secure access protocol to connect the USB driver 2312 to a USB port 2308 and to an engine 2306 coupled within a device 2304. The device 2304 is coupled to media 2302. The USB driver 2312 is coupled, not only via secure access channel 2316, but also via a signal line 2313 to an Installable File System (IFS) 2314. IFS 2314 is coupled to an auto run handler 2328 as described herein, as well as a content manager 2326. Content manager receives signals from both the IFS 2314 and the auto run handler 2328 and provides content as managed by the content manager 2326 to the web browser 2318. The server 2394, receiving signals via both signal line 2360 and signal line 2334 communicates with both the eTailer web store front 2396 and with the device connected to the PC 2398 using HTTP or other appropriate protocol in a web environment. The signal line 2360 coupling the application server 2354 to the digital clearing house server 2394 receives signals at an eTailer interface 2382 within a clearing server 2399. The digital clearing server 2394 includes a clearing server 2399. Clearing server 2399 includes the eTailer interface 2382 which communicates with a plurality of databases, including a packaged database 2386, a customer and eTailer database 2388, a customer database 2390, and a session and transactions database 2392. Also included in the clearing server 2399 is a digital clearing services object 2384. The clearing server 2399 is coupled to a integration object 2376 within the clearing server 2394. Integration object includes a database, more particularly a package to key mapping database 2380. Also included in integration object 2376 is a communication protocol or API 2378. Communication protocol object is coupled to a CKU master server 2368 as well as the package database 2386 within the clearing server 2399. CKU master server 2368 is within the content key server 2374. Content key server 2374 includes at least a key complement database 2370 and a transactions database 2372, each of which are coupled to the CKU master server 2368. CKU master server 2368 is further coupled to a CKU server 2366 which communicates via signal line 2334 to the CKU client 2322 located in the device connected to the PC 2398.

Figure 23B:
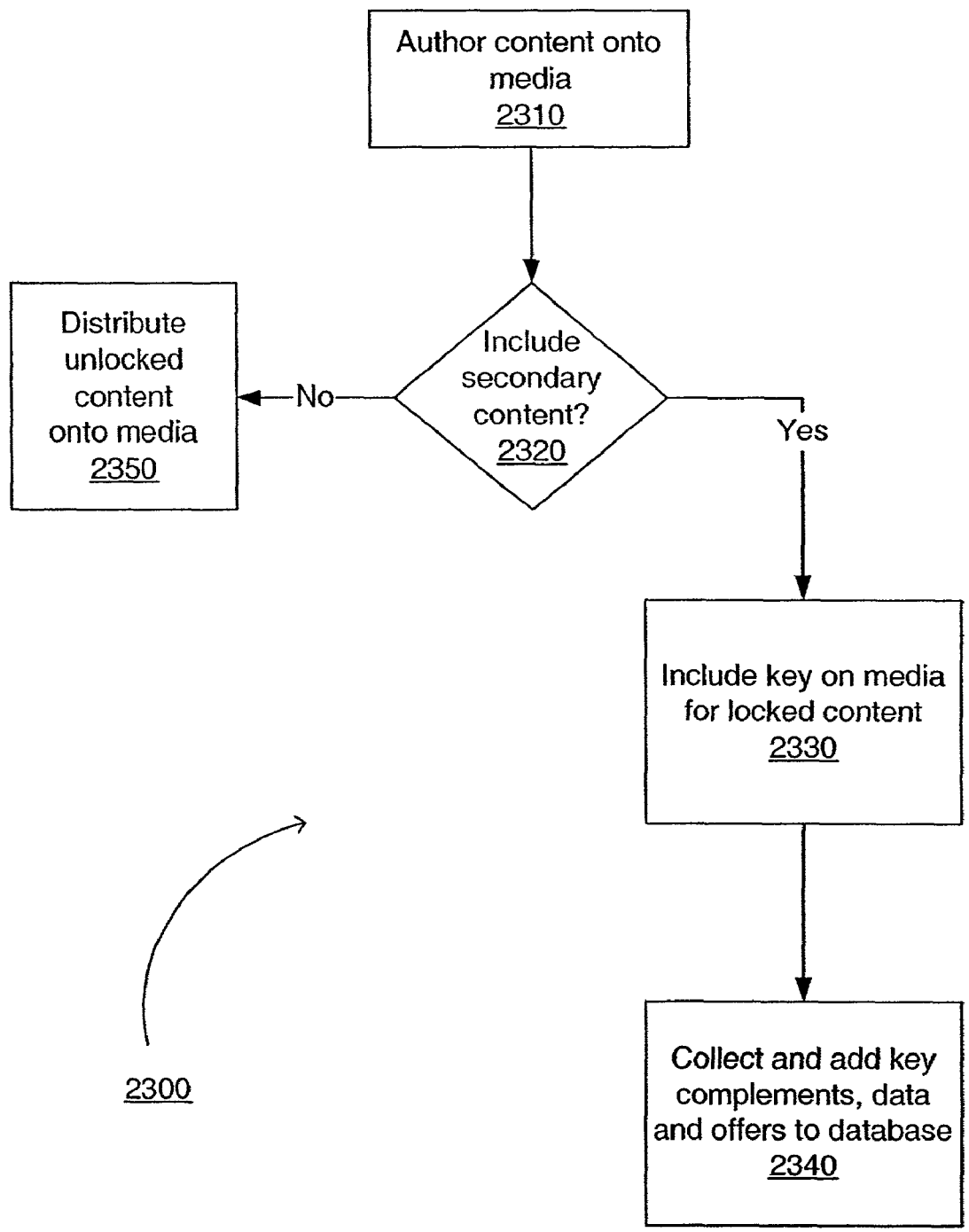
FIG. 23B illustrates an authoring process.

FIG. 23B describes a process from a creation standpoint, showing an authoring process 2300. Block 2310 provides that content is authored for mastering onto media with the Content Provider having the option in block 2320 of including secondary content that can be unlocked by the consumer at some time after the original purchase. If secondary content is not included on the media, block 2350 provides for distributing unlocked content on media. If secondary content is included on the media, the media will include a key mastered onto the media in block 2330. Therefore, media with locked content outputs a Key Complement for every locked file on the media. These Key Complements, along with the associated offer packages, DFS file handles and Media Identifiers (SCIDs) are then collected and added in block 2340 to a secure Key Complement Database that is only accessible by the CKU Master Server.

Figure 24:
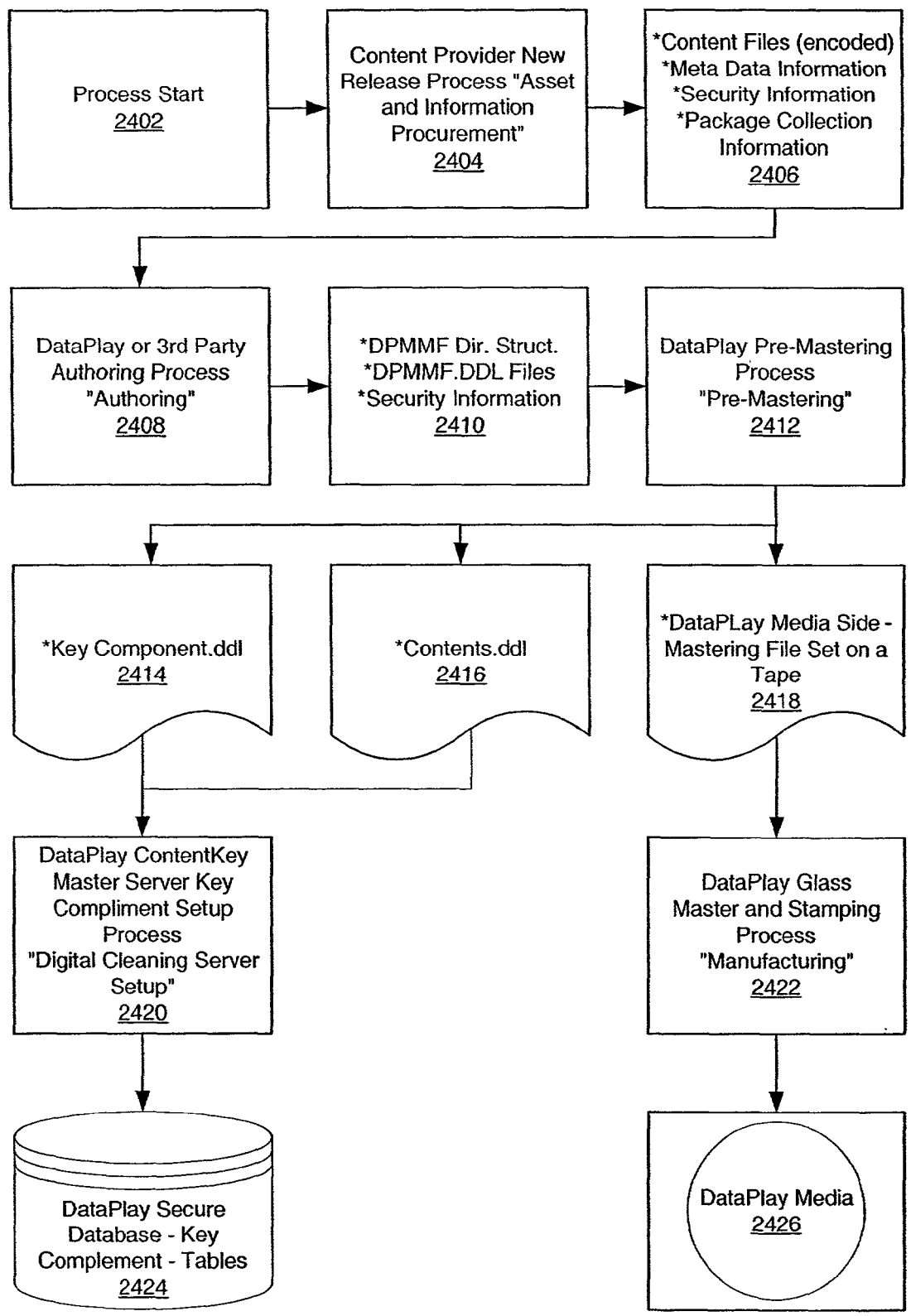
FIG. 24 illustrates a flow diagram for a process of setting up a secure database and secure media.

According to an embodiment, media and clearing house type servers are set up as part of a mastering process, or in other embodiments as part of a setup process for a server and media. More particularly, referring to FIG. 24, a flow diagram illustrates a setup process that results in a secure database and a media, such as a media disk. The clearing house server database configuration flow diagram provides a method of setting up a clearing house type server. Specifically, the process begins with block 2402. Block 2404 provides for a content provider to provide a new release of content to the server in a procurement process such as an "Asset and Information Procurement" as shown. The components included in the procurement process include content files, metadata information, security information, and package collection information, if any. The content files refer to files tied to a particular type or categorized content. These content files, in one embodiment, may include an appropriate media coder-decoder (codec). Metadata information includes any description of components that accompany a content file, such as graphics and lyrics. In one embodiment, the metadata is in a structured format, in other embodiments the format may be determined by individual content providers. Further, an embodiment requires that metadata must be provided on a per-track and per-album basis. The security information refers to rules governing the way the consumer interacts with the content. For example, the information may include a revocation list and TPDRM and CKDRM rules. The revocation list may be denied by a content provider and may include a list of all player devices, player applications and servers that have been revoked. Also included in the components received from a content provider are DRM rules providing restrictions on consumers regarding playing and copying of content. The DRM rules may also include details so that an authoring and mastering process or processes will i5 know the files that require initial locking. Also included in block 2406 is package collection information that specifies how secondary content is to be grouped and how to display the secondary content to the user.

Block 2408 relates to an authoring process which may be accomplished via a DataPlay or third party. Specifically, the authoring process includes packaging all files received by a content provider according to predetermined specifications. In one embodiment, directories are established with the following data: content files (encoded); direction structure; content manager; autorum.inf; and contents.ddl.

The content manager includes files used to present content or media to the consumer, such as an executable, mini-website or some of the form defined by the content provider. The autorun.inf launches the content manager. The contents.ddl file is stored in a common area for use with any DRM. The contents.ddl may include a package collection, advertisements and SKUs. The SKUs may reference one ore more files. The package collection is, in one embodiment, a unique identifier (PCID) for all secondary content or for a side of media. The package collection may include a reference to one or more advertisements, for example, referring to a package collection. Block 2410 provides that part of the authoring process includes providing DPMMF DDL files for describing the relationship between content and asset files.

Block 2412 provides for a pre-mastering process to begin after the authoring process described with regard to block 2408. More particularly, the pre-mastering process includes a content provider providing content subject to a DLM. The pre-mastering process includes three components, 2414, 2416, and 2418. Flag 2414 refers to a key component.ddl function wherein a file called KeyComplement.ddl is generated that will be used to configure a secure content key database. The KeyComplement.ddl file includes a package collection identifier. The package collection identifier, in one embodiment, includes a full file path name, a file handle, a key complement, which may be 128 bits, and a key version. The pre-mastering process further includes a function of passing along a file, contents.ddl that was created during authoring. The file, contents.ddl 2416 is input into a next process, content key packaging process into a content key packaging process. Another portion of the pre-mastering process 2412 is a DataPlay media mastering process wherein files are set on a tape. More particularly, the mastering file set is created in block 2418 that is stored and delivered on a tape, in one embodiment. In other embodiments, the mastering file may be at another type of media. Each mastering file set refers to, in one embodiment, a single side on a media disc. Block 2420 is shown coupled to the contents.ddl block 2416 and the KeyComponent.ddl block 2414. Block 2420, more specifically refers to a master server key complement setup process also known as a digital clearing server setup process that relates to the data migration to a secured database 2424. The master server key complement setup process 2420 provides for loading tables for packaging a key mapping database such that the tables are loaded with information specified in the KeyComponent.ddl and Contents.ddl files. The block 2418, DataPlay mastering file set on tape is shown coupled to the pre-mastering process 2412. More particularly the mastering file set on a tape process 2418 refers to creating one or more "glass masters" if the media is a optical disc. In other embodiments, the mastering file set will be mastered on to an appropriate media type. In an embodiment, glass masters are used to create one or more stampers. Stampers are then used to mass produce media 2426 that will be distributed or available for purchase. The stamping process is a manufacturing process.

Figure 25:
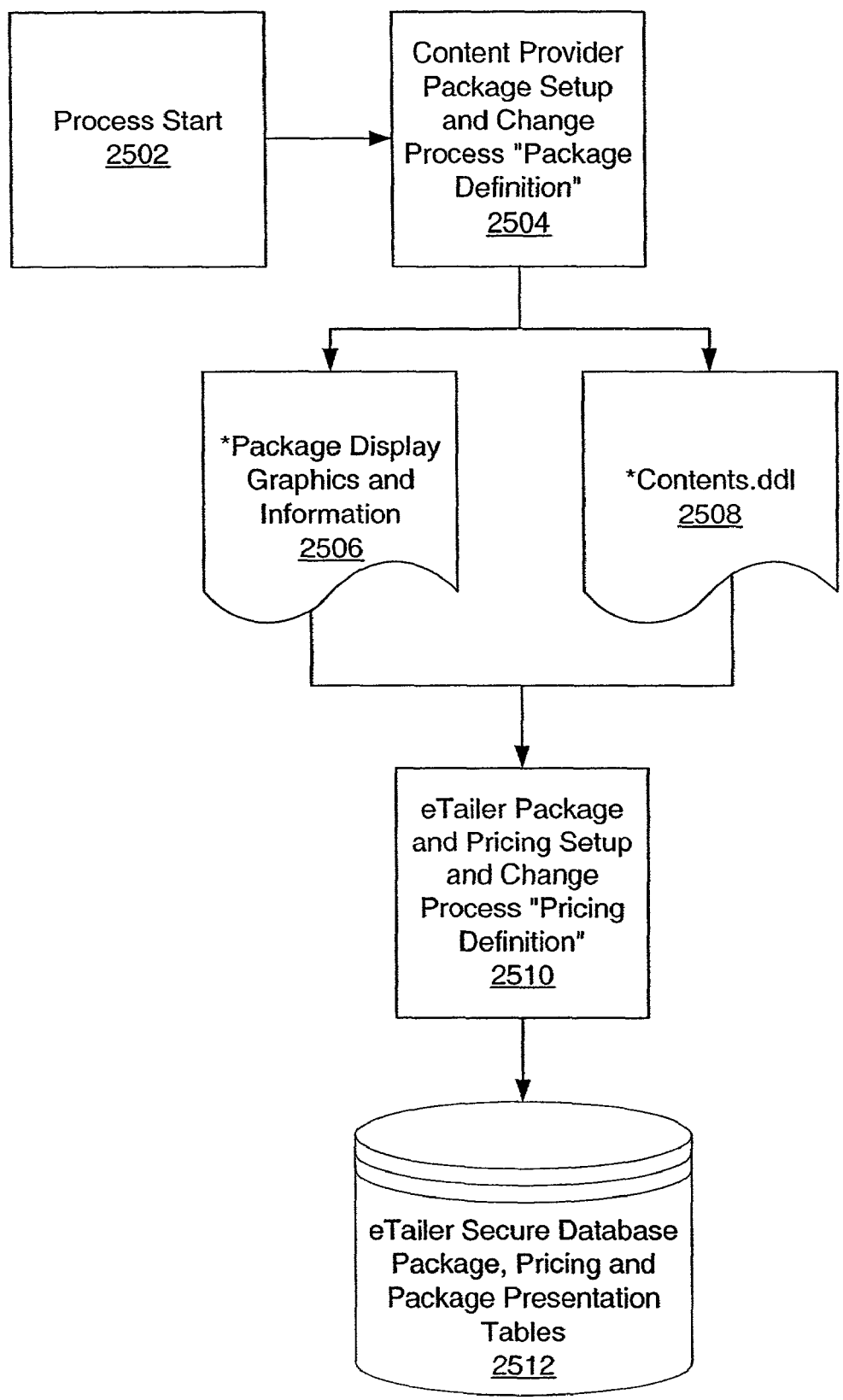
FIG. 25 illustrates a process for a setup for an electronic retailer.

Referring now to FIG. 25 in combination with FIG. 23B, a setup process is provided in a flow diagram for setting up the electronic retailer (eTailer). Referring to FIG. 23B, the eTailer web store front 2396 is shown including an application server 2354 and databases 2356. The setup for that process is described in FIG. 25. More particularly, the process starts at 2502. Block 2504 provides that the content provider package is setup and a change process occurs regarding a package definition. The eTailers generally require a package collection SKU for auditing purposes and other purposes and may not use a package collection ID as described above. Rather, the package collection ID is passed on to an eTailer through a URL, and the eTailer will simply hold it until passing it to a digital clearing server. In one embodiment, the eTailer discards the package collection ID. The content provider, as described above, supplies the eTailers with Contents.dll file as described with reference to FIG. 24, and any graphics that are to be a part of the package presentation to a consumer in block 2508 and 2506. Blocks 2506 and 2508 are shown coupled to block 2510, the eTailer package and pricing setup and change process "pricing definition." More particularly, after a content provider has supplied available packages, the eTailers setup their pricing roles. Technical details for configuring a database with package, pricing, and package presentation data may be completely defined by an eTailer and may conform to an existing "shopping cart" and/or catalog maintenance functionality of the eTailer. In addition to pricing, an ad eTailer, in one embodiment, may choose to specify discount models and advertising specifications. For example, a customer may choose a particular package along with an advertisement tailored for that consumer. Block 2510 is shown coupled to database 2512, eTailer secure database package pricing and presentation tables, the end product of the eTailer database setup. The eTailer secure database tables shown in block 2512 are included in FIG. 23B as package and pricing database 2352 and may it further include customer database 2358.

Figure 26:
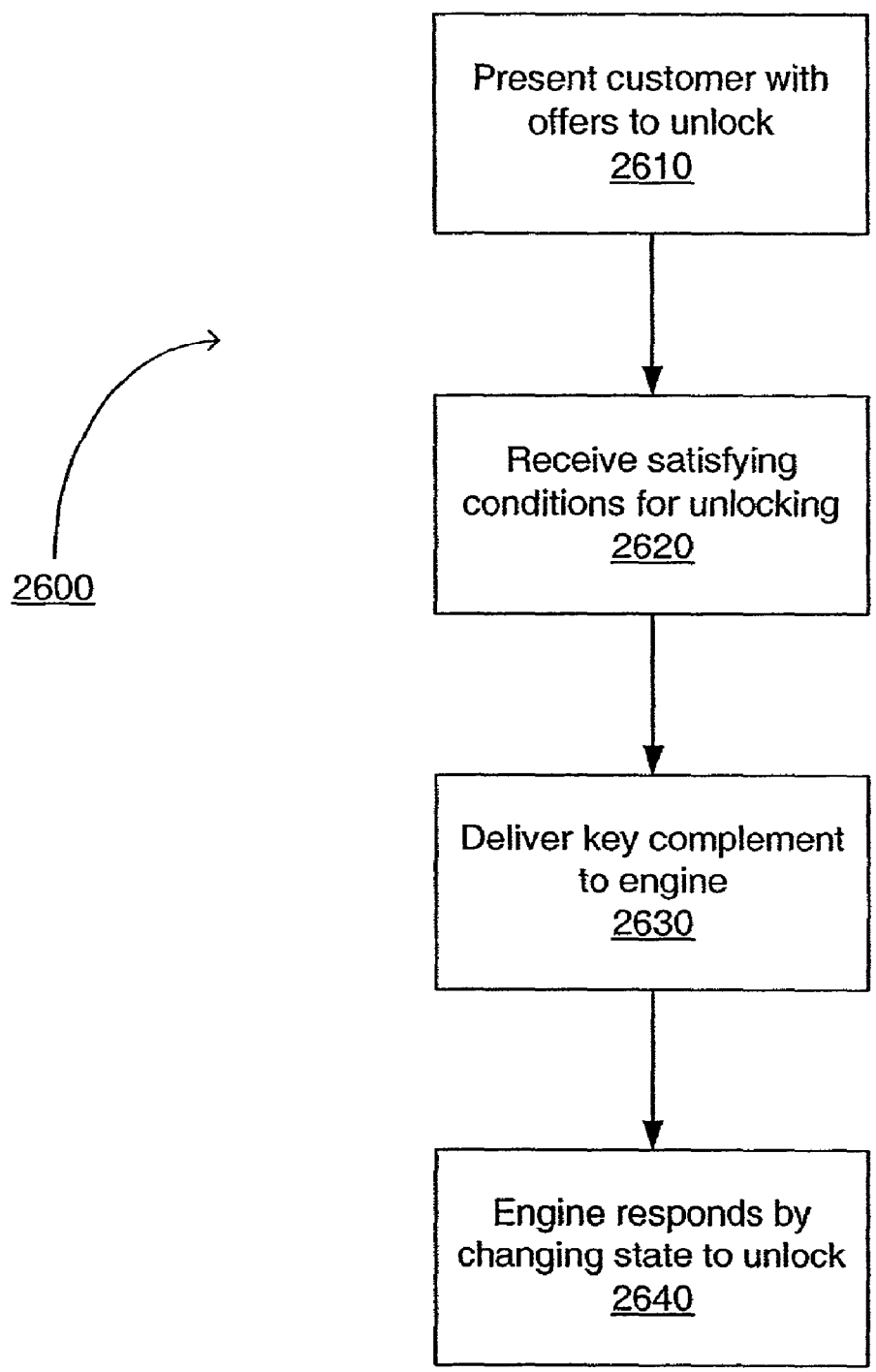
FIG. 26 provides a flow diagram from a consumer perspective of a transaction to unlock content according to an embodiment of the present invention.

FIG. 26 provides a flow diagram from a consumer perspective of a transaction to unlock the content. More specifically, process 2600 provides in block 2610, that a consumer is presented with offers. Block 2620 provides for receiving satisfying conditions for unlocking. For example, conditions for an unlock transaction may be providing payment and/or demographic data. Block 2630 provides for delivering the Key Complement to an engine, for example, through a Secure Authenticated Channel (SAC). The engine then writes this data to the media changing the state of the content from Locked to Unlocked.

Figure 27:
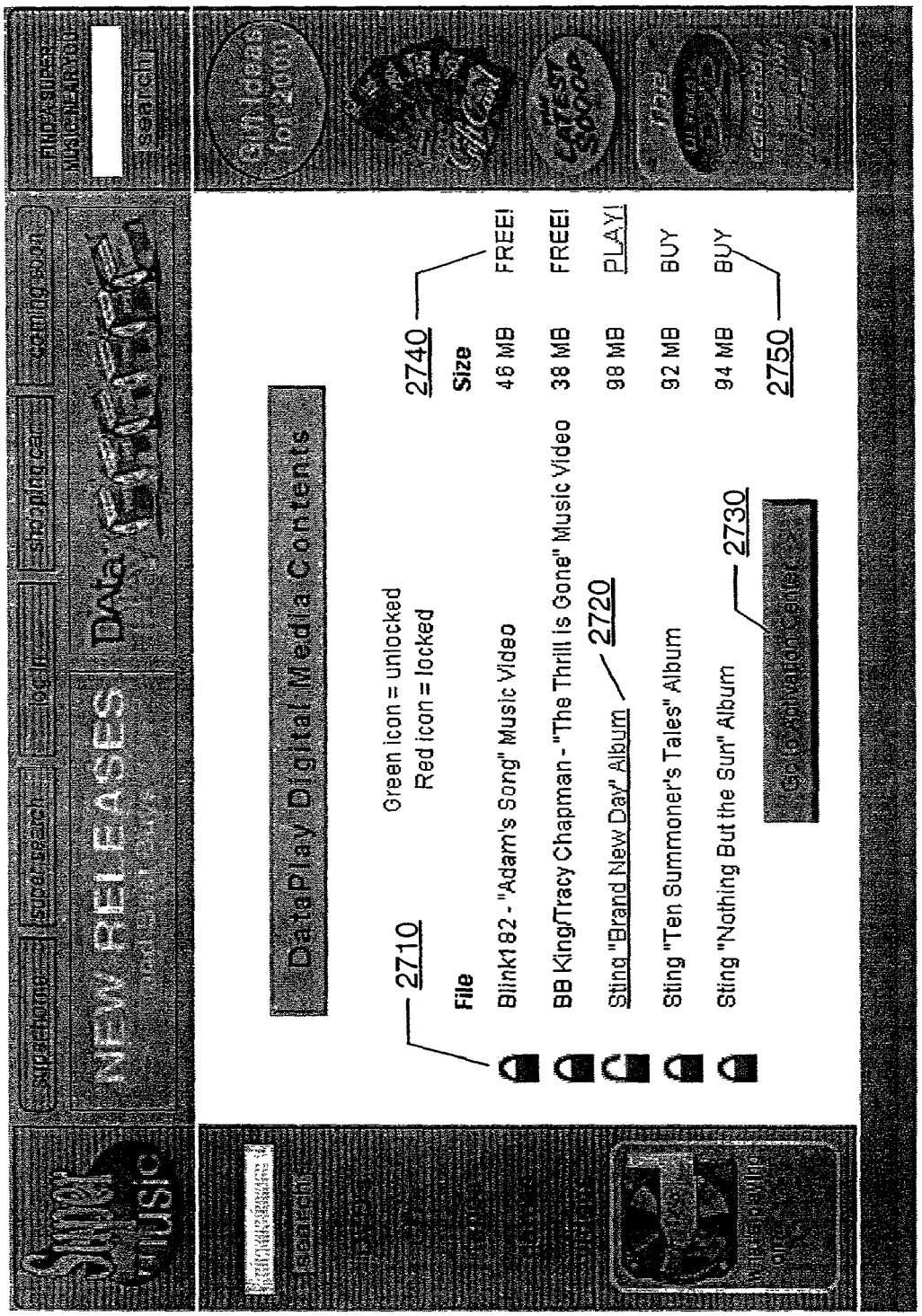
FIG. 27 illustrates an exemplary user interface illustrating a consumer perspective of a transaction to unlock content according to an embodiment of the present invention.

Referring to FIG. 27, an exemplary user interface 2700 is shown. The user interface may be generated by a web server and may include the presentation of a user option that allows the user to elect not to be presented with offers of some sort on future insertions of this media. If the user selects this option, a notation must be made either on the user's system or on the media denoting such. The user interface 2700 shows an embodiment enabling an unlock transaction. More particularly, the interface 2700 may be a web page with hyperlinks, such as 2730 that direct the user to an activation center for entering data necessary to complete an unlock method. Also shown on the web page are indications 2710 of status as to whether media read and interpreted for the interface 2700 contains locked and unlocked files. If a file on the media is locked, a hyperlink to buy 2750 may be presented to the user. For unlocked files, the interface provides a hyperlink 2720 allowing the user to play a selection on the media.

Figure 28:
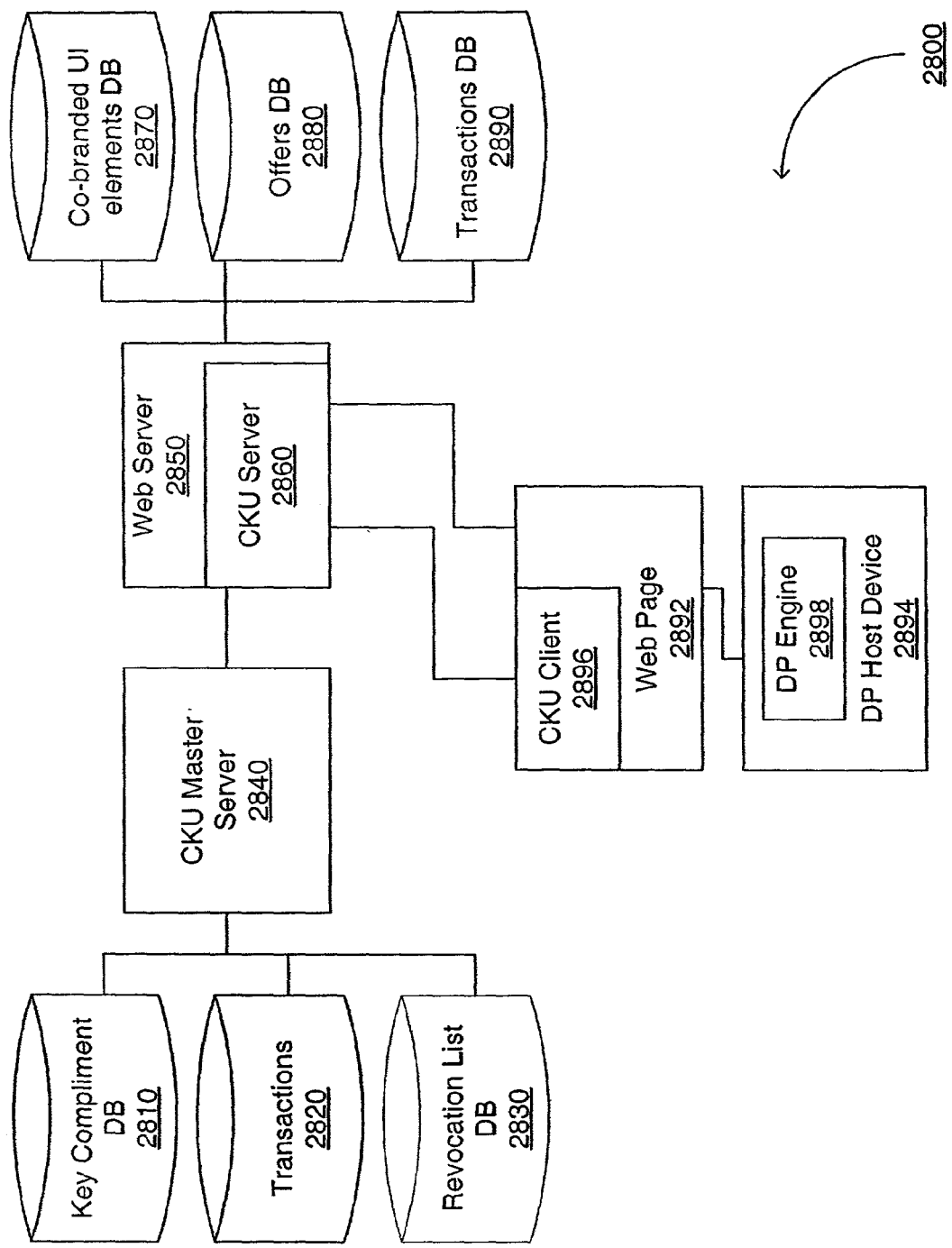
FIG. 28 illustrates a flow diagram of components enabling an unlock process in the SEC system according to an embodiment of the present invention.

The unlock portion of the SEC system is a framework of several components that work together. On embodiment is shown in FIG. 28. As shown, several components work together to unlock secondary mastered content that is stored on pre-mastered media. The framework for the CKU portion of the SEC system, according to one embodiment of the present invention, includes communication protocols that allow flexibility in user choice of both client and server platforms. Further, according to an embodiment, the communication protocols support various business models for unlocking and clearing which may include different components residing at different related component locations. FIG. 28 shows an embodiment of connectivity among components included in FIG. 23B, and a broader perspective of the SEC system.

As shown in FIG. 28, the unlock system includes one or more databases coupled to a master server. In one embodiment, the databases coupled to the master server include a key complement database 2810, a transactions database 2820 and a revocation list database 2830. The master server 2840 is coupled to a web server 2850 that is further coupled to a secure CKU server 2860.

CKU Master Server 2840 may be hosted by a Certificate Authority or other entity responsible for authenticating both engine certificates and CKU Server certificates by checking them against a revocation list. CKU Master Server 2840 may also be responsible for securely delivering Key Complements from a master Key Complement database 2810 to the CKU Servers 2660 that may deliver them to engines 2898.

The CKU Server 2860 may be a server-side runtime object that works with a web application server 2850 and several databases 2870, 2880 and 2890 to manage portions of the CK unlock. CKU server 2860 may be hosted by any entity that requires the capabilities to transact and unlock CKDRM secondary content such as a clearing partner (Reciprocal, DWS, Magex, etc), retailer website or DataPlay.

Each CKU Server 2860 may be issued a unique CKDRM Certificate and public-private encryption key pair for use in establishing the secure authenticated channels (SAC) with the engine 2898 and the CKU Master server 2840. Further, The CKU Server 2860 may incorporate cryptography functionality. For example, the CKU Server 2860 may include functions such as PKI, AES, triple-DES and MAC algorithms. Further, a Random Number Generator (RNG) algorithm, such as one that complies with HIPS-140, may be appropriate.

The web server 2850 is coupled to one or more databases, depending on requirements of the system, such as co-branded elements from third party distributors 2870, offers database 2880, and a transactions database 2890. The CKU server 2860 is coupled to a client server 2896 and a web page 2892 hosted by the client server 2896. The web page 2892 provides an interface for a user to communicate with the other components in the secure electronic ;is content system. More particularly, a host device 2894 holding an engine 2898 may communicate via the web page 2892. The communication between components may be via a standard TCP/IP protocol. The user interface is presented by a web-server 2850 through a browser to an end-user.

As will be appreciated by one of skill in the art, administrative and reporting tools may be appropriate. FIG. 28 shows an offers database 2880 that may contain information about the available secondary content on each pre-mastered media disk, including, for example, pricing, titles, descriptions, etc. Either content providers or retailers may maintain this database.

Also shown is transactions database 2890 which provides a place for recording unlock transactions. The data collected may be used to determine payments to the various entities that take part in the value chain of unlock transactions. The transactions database 2890 may also store temporary state information about transactions in progress. The CKU Server 2860 and Web Server 2850 may require access to this temporary data.

The UI Elements database 2870 may contain information that the web server 2850 uses to construct custom branded pages and sites. This may include branding at the retailer level as well as individual branding based on the particular SKU of media that is being offered.

The databases Key Compliment database 2810 may include unlock codes, such as Key Complements for mastered media. Each individual file that is locked on a piece of media may have a unique Key Complement. These Key Complements, in an exemplary embodiment, are securely delivered from the pre-mastering for manufacturing and stored with corresponding SCID information about the media. Access to this database is strongly guarded. Only a valid CKU Master Server 2840 may have access to this database.

The revocation database 2830 may contain information about revoked engine certificates and revoked CKU Server certificates. The revocation database 2830, in one embodiment, is checked in every transaction to ensure that only authorized participants are allowed to take part in the unlock process.

The transactions database 2820 may record transactions between CKU Servers 2860 and the CKU Master Server 2840.

In one embodiment, CKU Master Server 2840 has exclusive access to the Key Complements Database. The CKU Master Server 2840 may be similar in construction to the CKU Server 2860 and sets up an active "listen" socket that accepts incoming connections. It accepts connections from CKU Servers 2860 seeking to obtain Key complements to perform unlocking operations.

Figure 29:
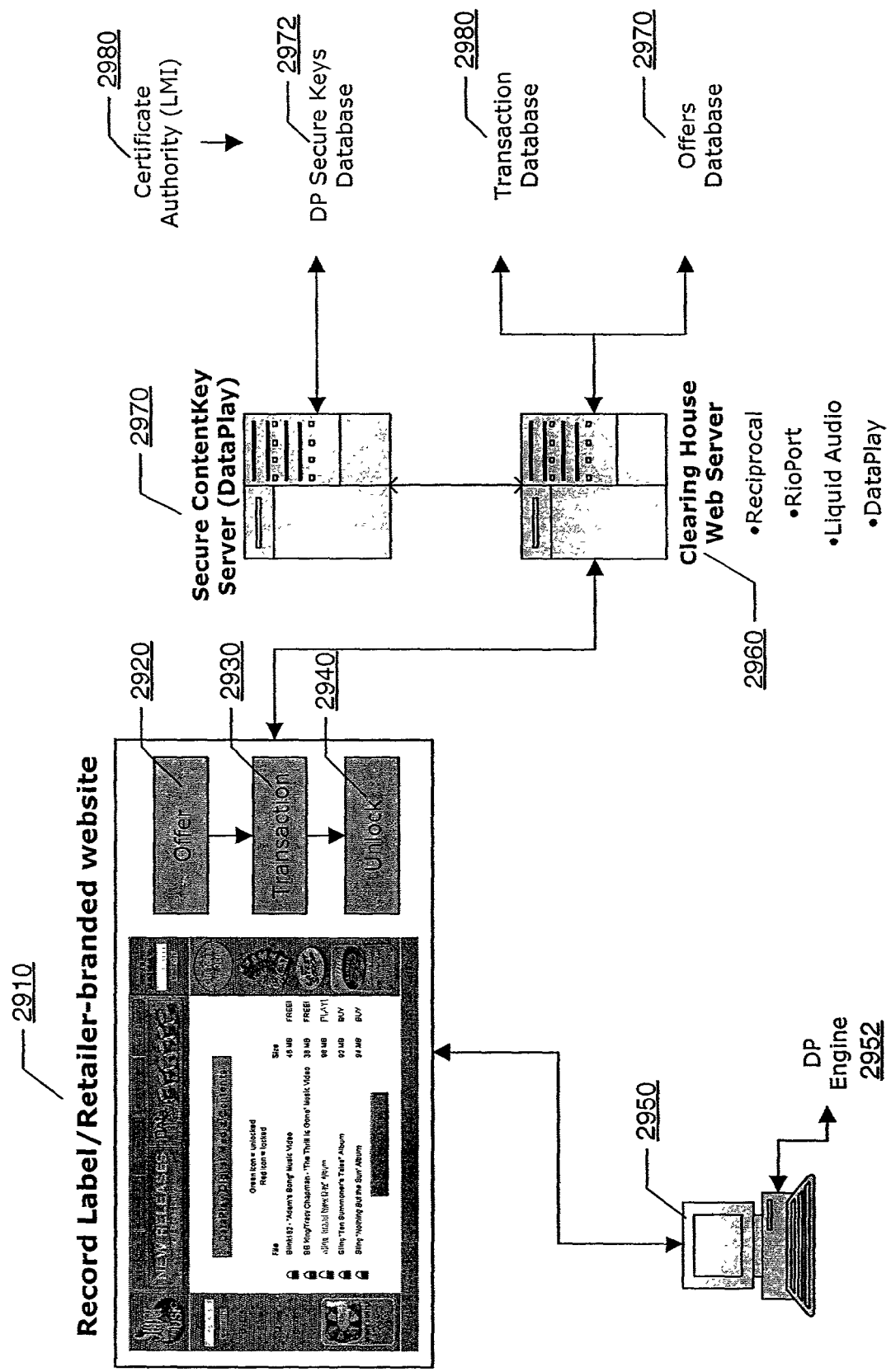
FIG. 29 illustrates a secure electronic content flow diagram according to an embodiment of the present invention.
Figure 30:
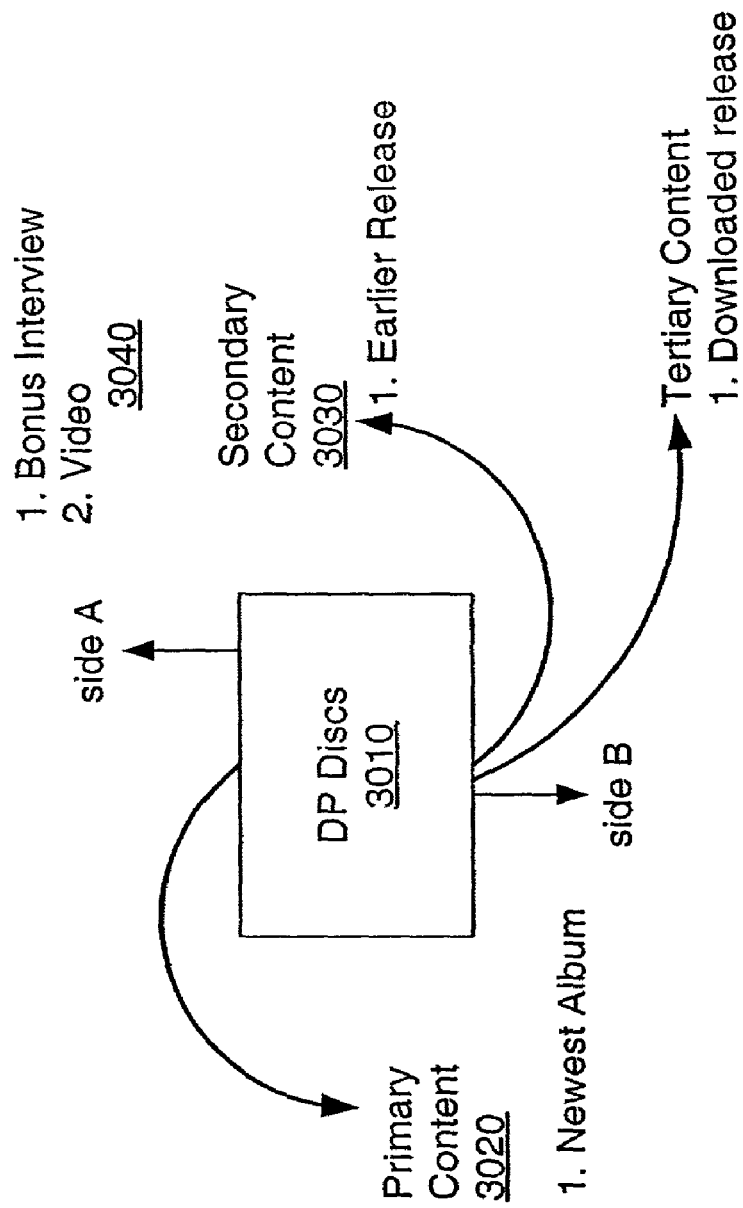
FIG. 30 illustrates content types available on media according to an embodiment of the present invention.

FIG. 29, shows an embodiment of a process beginning with a media disk being inserted into an engine 2952 via a PC 2950 presents a record label or retailer-branded web site 2710 that provides offers 2720, transactions 2730 and unlocks content 2740 via a clearing-house web server 2760 coupled to a transaction database 2680 and an offer database 2670. How the media directs the engine to a particular web site is a method according to an embodiment of the present invention. More particularly, referring to FIG. 30, the media such as DP discs 3010 may be purchased with both primary content 3020 for which the user may have paid, and secondary content 3030, which may include bonus content 3040. Either, both or one of the primary and secondary content may be locked or unlocked, depending on the marketing desired and on the content provide's requirements. For example, a content provider may provide free disks that have a minimal amount of unlocked content. An engine in a player may therefore, be enabled to play only a minimal amount of content.

Figure 31A:
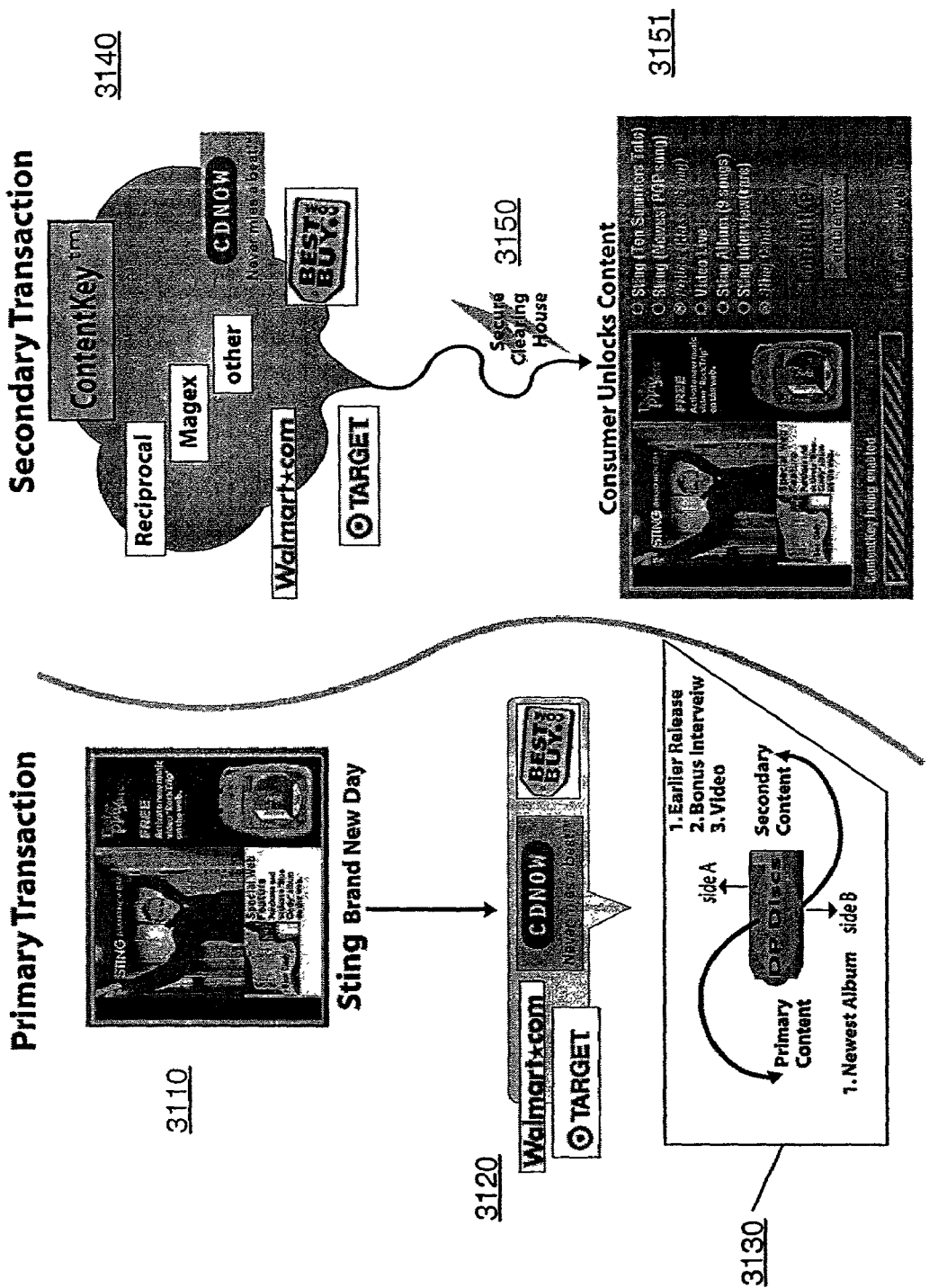
FIG. 31A illustrates a flow diagram of transaction types according to an embodiment of the present invention.

Referring to FIG. 31A, according to one embodiment, media may be purchased at a number of facilities such as those shown in 3120. A consumer may purchase a pre-mastered disk 3110 in a primary transaction and render the content available, as shown in block 3130. In a secondary transaction 3140, the consumer may choose to exercise offers presented via an Internet connection coupled to an engine in 3140 to unlock content 3151 via a secure clearing house 3150.

Figure 31B:
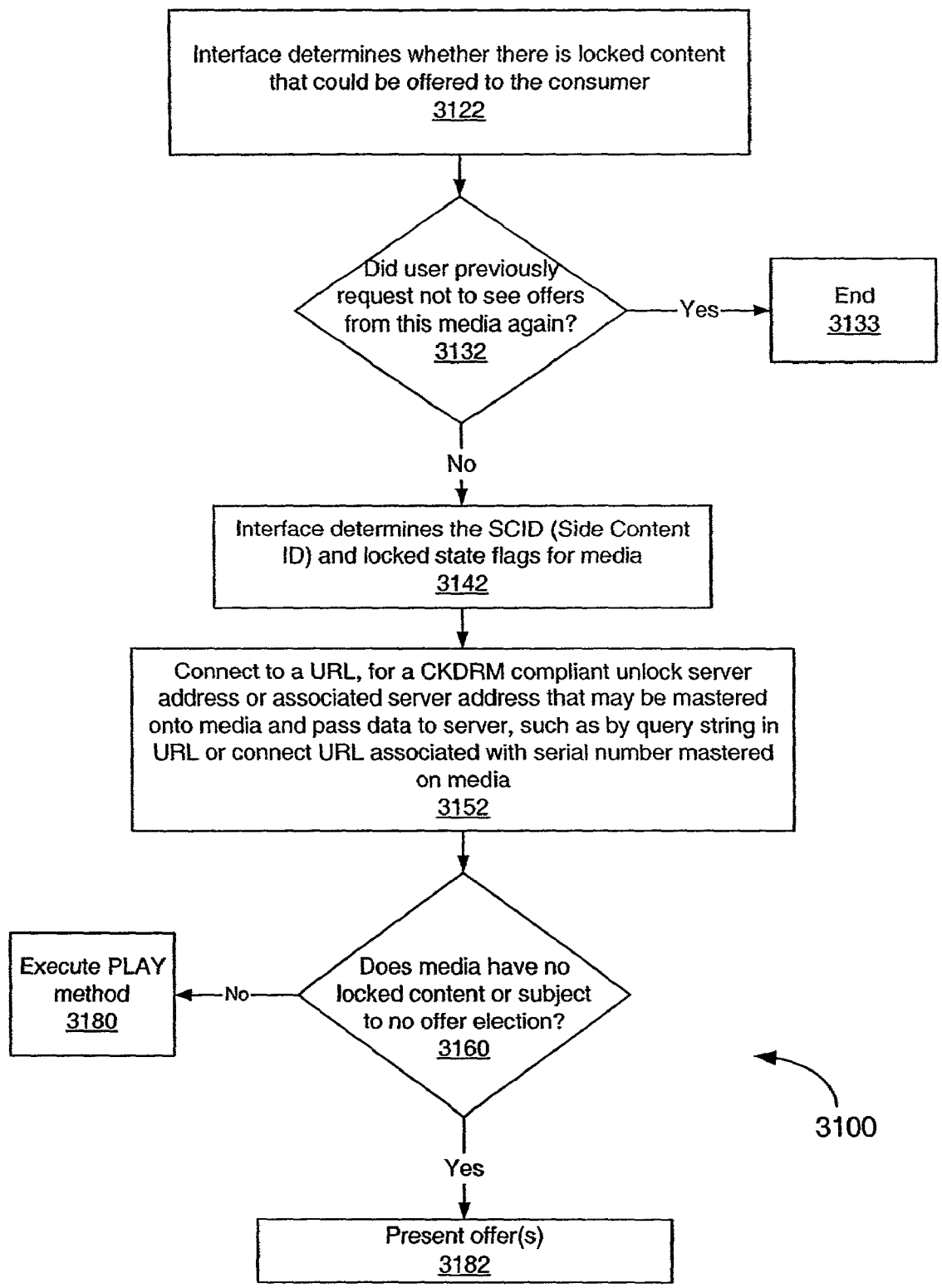
FIG. 31B illustrates a method for a user interface including a method for locating a URL associated with a media disk according to an embodiment of the present invention.

Referring to FIG. 31B, the user interface, and, more particularly, an auto-run handler associated with a user interface performs method 3000. The auto-run handler may be responsible for detecting when media, such as a disk, is inserted into a device connected to a personal computer. Upon detecting the media insertion, the auto-run connects to an engine and determines the state of the media. The state may include identifying the specific media and side and whether or not there is any content available to offer for sale to the consumer. The auto-run handler may also check either the user's system or the media to determine if the user has requested not to be presented any more offers for this disk. Block 3122 determines whether there is locked content that could be offered to the consumer via a user interface. One embodiment of the present invention is directed to a method for a user interface which may be operable via a driver for an engine, or operate in conjunction with the auto-run handler that executes at system startup or upon user selection. The user interface may present menu options to the user including PLAY, EJECT, PURCHASE ADDITIONAL CONTENT, and EXIT.

If there is locked content, the interface determines in block 3132 whether the user previously requested not to see the offers from this media again. If so, the method ends at block 3133. If not, block 3142 provides that the interface determine the SCID (Side Content ID) and the locked state flags for the media. Block 3152 provides for connecting to a URL, such as for a CKDRM compliant unlock server address or associated server address that may be mastered onto the media and pass the data to the server, such as by a query string in the URL. In other embodiments, block 3152 connects to a URL that is according to a serial number mastered on the media. The number mastered on the media may be a time stamp, indicating the date of the master, a serial number associated with a server or URL, neither or both. In one embodiment, for example, the serial number or time stamp advantageously allows distributors of pre-mastered media to return media disks to their source.

Block 3152 provides for connecting to a URL, such as for a CKDRM compliant unlock server address or associated server address that may be mastered onto the media and pass the data to the server, such as by a query string in the URL. In other embodiments, block 3152 connects to a URL that is according to a serial number mastered on the media. The number mastered on the media may be a time stamp, indicating the date of the master, a serial number associated with a server or URL, neither or both. In one embodiment, for example, the serial number or time stamp advantageously allows distributors of pre-mastered media to return media disks to their source.

More particularly, in one embodiment a method is directed to identifying one or more vendors associated with a media disk. The method includes providing instructions for the media disk, such as including a URL in the instructions, or providing a code that may be associated with a URL. Further, during an install of the media disk into a host according to the instructions, the method provides for installing an identifier on the media disk. The identifier may be a code identifying the vendor from which the media disk originated. For example, one method of identifying a location associated with a vendor of a media disk holding hidden content can include finding a location associated with the vendor, the location being associated with the vendor of the media disk and independent of any vendors that are not associated with the media disk. The instructions for the media disk may include identifying a vendor from whom the media disk was purchased. For example, the media disk may provide instructions that include a code, a universal resource locator (URL), a cryptographic key associated with the vendor, and a part of a cryptographic key associated with the vendor, each of which may be a explicit or implicit location. A system in accordance with such a method may include instructions for the media disk, and a software installation component associated with the media disk, the software installation component insatiable during an install of the media disk into a host according to the instructions. Specifically, the software installation component may be operable to install an identifier on the media disk, the identifier including a code associated with the vendor. In one embodiment, the identifier is associated with a location of the vendor such that a connection between the host and a server is operable to open the location. For example, the location could be an Internet location including web pages for unlocking content stored on the media disk, the Internet location further providing optional offers for purchase over the Internet by the vendor.

In another embodiment, a method of identifying a location via a media disk relates to the media disk having at least a writeable portion and a non-rewriteable portion. In the embodiment, the method includes writing the location on the writeable portion, distributing one or more of the media disks to one or more entities, the location associating the media disks to the one or more entities, and if a return of the media disks occurs, altering the location according to predetermined conditions. The location may be universal resource locator (URL) and the predetermined conditions may include determining a market share of the one or more entities. The altering the location may be by a content provider, the content provider receiving the media disk, including one or more media disks, and distributing the returned media disks to same or different entities of the one or more entities after the altering. For example, the distributing may be pursuant to a lease agreement for media disks, the lease agreement allowing return of unsold media disks.

In general, content providers provide media holding content to distributors via a lease arrangement under which distributors pay only for those media disks that are sold. Unsold media disks are returned to the content providers. In the embodiment, the pre-mastered media disks may or may not permanently identify a distributor or content provider URL for unlocking content. For example, a distributor that desires having a pre-mastered media disk being associated with the distributor's URL for presenting offers, coupons, etc., and also desires the flexibility of returning unsold media disks, may receive media disks with serial numbers and/or time stamps that allow a main server to direct a user to the distributor's URL. Other distributors may be satisfied with a sticker identifying a URL for unlocking content. In one embodiment, the main server URL is permanently mastered on the media disk along with a serial number and/or time stamp. The main server receives direction from a plurality of content providers and/or authorized distributors that identify URLs for distributors that are associated with serial numbers. In the event that a distributor returns one or more media disks to a content provider for re-distribution, the time-stamp associated with the serial number may be used to more specifically identify a group of media disks with a same serial number, or the serial number alone may identify the media disks. The identified media disks are then redirected from the distributor's URL to a second distributor's URL or to a generic URL.

In another embodiment, each media disk is directed to a main server and redirected according to a market share percentage such that the number of accesses that are redirected to a distributor URL is proportional to the market share held by the distributor.

In block 3160, if the media has no locked content or the user elected not to see offers for this media, the interface determines whether there is an authored autorun INF file on the media.

If the user selects PLAY, the PLAY method as described above is executed in block 3180. The auto-run handler may cause a URL connection. A web server may then generate a client side script to embed an object and call an entry point with variables according to a client object API. The commands for the object may include:

ConnectCKUServer(VARCHAR ServerIP, UINT Port, UINT SessionID, UINT ContentID, UINT USBDriverID). In an embodiment, ServerIP is a string variable that describes the URL to which the object is to connect. Port is the listening port number for the CKU Server. SessionID is a unique identifier assigned by the server. The SessionID may associate a Socket connection with the particular web session that was initiated so that the server can synchronize its state. The SessionID may also be stored as the key in the temporary portion of a transaction database, such as database 2890, shown in FIG. 28, for information passing A between a web server 2850 and the CKU Server 2860. ContentID is an identifier for the side and disk that contains the content to be offered to a consumer. USBDriverID is an identifier that allows a CKU Client 2896 to locate a specific instance of a drive that generated an auto-Insert notification that started an unlock session. In one embodiment, the autorun connects to a CKU Server 2860 by passing the SCID and locked-state flags in a query string to a URL mastered onto the disk, a URL identified by a user, or a default URL. In an embodiment, the URL is connected to by a "Shell Executing" the URL launches a browser on a user's system and connect to server 2860. The URL may optionally point to a CKU Portal, which may be an intelligent redirector. The redirector may decide, based on, for example, Media identification information, the web server to which the client will be connected. Referring back to 31B, block 3182 provides for presenting offers according to the URL, auto run, or other mechanism for presenting offers.

Figure 31C:
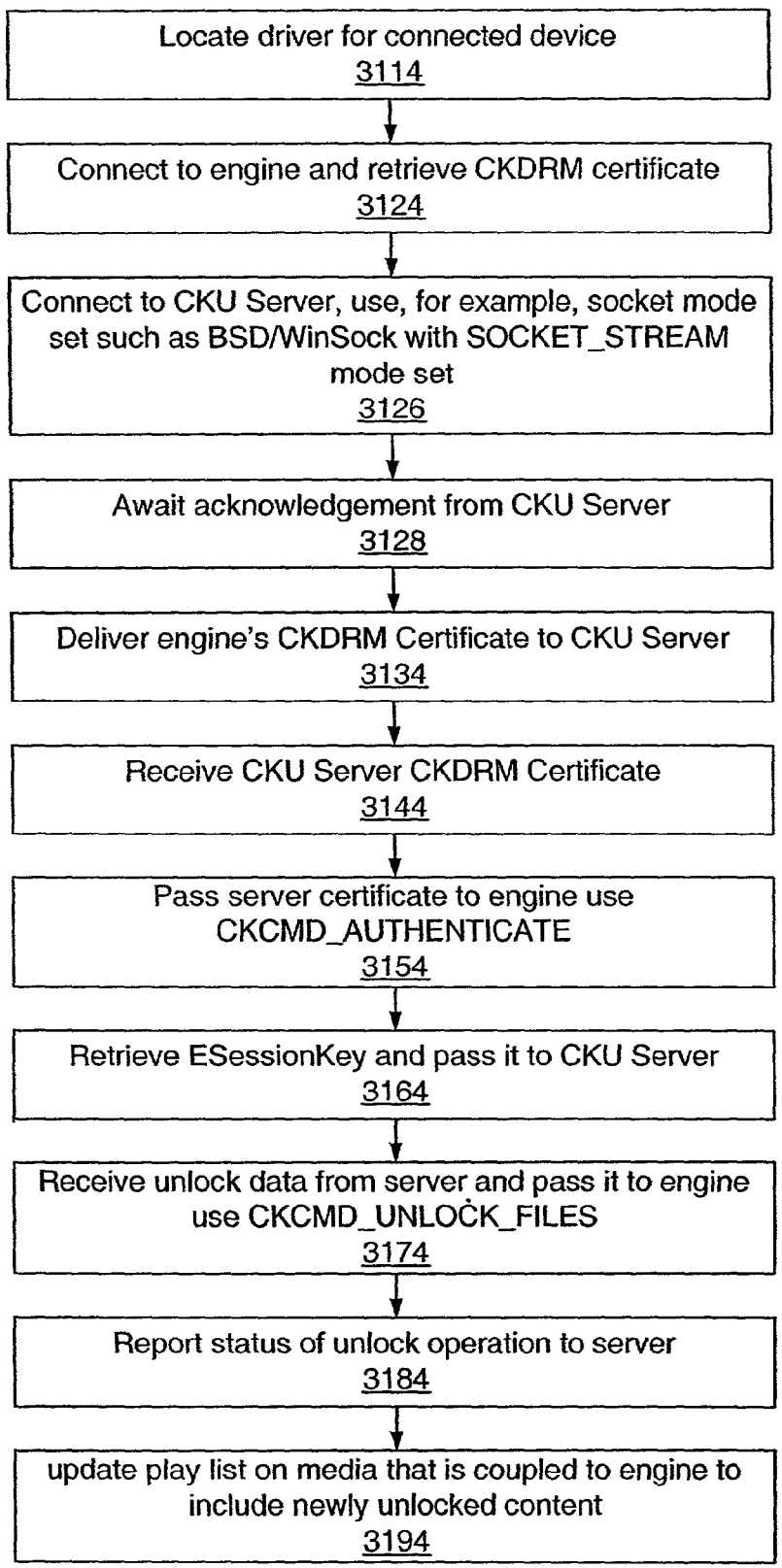
FIG. 31C illustrates a method for connection to a CKU Server according to an embodiment of the present invention.

Referring to FIG. 31C, a method for connection to CKU Server 2860 is shown. In one embodiment, the method may be called by a script performed by a client object. Block 3114 provides for locating a driver for a connected device. Block 3124 provides for connection to an engine and retrieving a CKDRM certificate, such as those described above. Block 3126 provides for connecting to a CKU Server 2860, using, for example, a socket mode set such as BSD/WinSock with SOCKET_STREAM mode set. Block 3128 provides for awaiting acknowledgment from the CKU Server 2860. Block 3134 provides for delivering the engine's CKDRM Certificate to the CKU Server 2860. Block 3144 provides for receiving the CKU Server 2660 CKDRM Certificate. Block 3154 provides for passing the server certificate to the engine 2698 using CKCMD_AUTHENTICATE. Block 3164 provides for retrieving a ESessionKey and passing it to the CKU Server 2860. Block 3174 provides for receiving the unlock data block from the server 2860 and passing it to the engine 2898 using CKCMD_UNLOCK_FILES. Block 3184 provides for reporting status of the unlock operation to the server 2860. Block 3194 provides for updating a play list on media that is coupled to the engine 2898 to include newly unlocked content.

Figure 32:
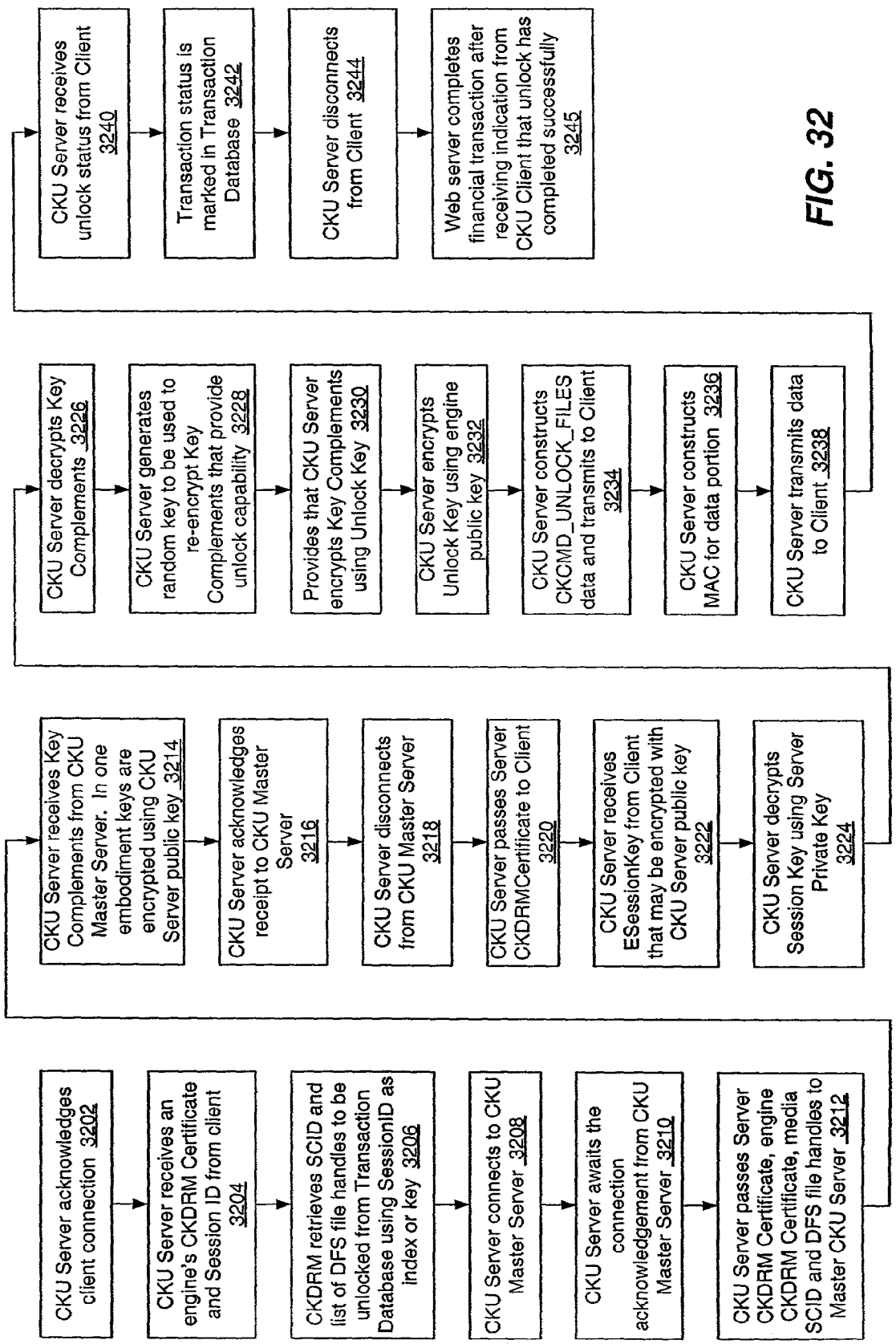
FIG. 32 illustrates a method for a server after a connection is requested from a client according to an embodiment of the present invention.

Referring now to FIG. 32 in combination with FIG. 28, the CKU Server 2860 manages many concurrent connections and unlock-transactions as described, for example in FIG. 31. Once a connection is requested from a client the server must accept the connection and proceed with the method shown in FIG. 32. As shown, in block 3202, the CKU Server 2860 acknowledges a client connection. In block 3204, the CKU Server 2860 receives an engine's CKDRM Certificate and Session ID from the client 2896. In block 3206, the CKDRM retrieves SCID and a list of DFS file handles to be unlocked from the Transaction Database 2890 using the SessionID as the index or key. In block 3208 the CKU Server 2860 connects to the CKU Master Server 2840. In block 3210, the CKU Server 2860 awaits the connection acknowledgement from CKU Master Server 2840. In block 3212, the CKU Server 2860 passes a Server CKDRM Certificate, the engine 2898 CKDRM Certificate, media SCID and DFS file handles to the Master CKU Server 2840. In block 3214, the CKU Server 2860 receives the Key Complements from the CKU Master Server 2840. In one embodiment the keys are encrypted using the CKU Server 2840 public key. In block 3216, the CKU Server 2860 acknowledges the receipt to the CKU Master Server 2840. In block 3218, CKU Server 2860 disconnects from CKU Master Server 2840. In block 3220 CKU Server 2860 passes the Server CKDRM Certificate to the Client 2896. In block 3222 CKU Server 2860 receives the ESessionKey from the Client 2896 that may be encrypted with the CKU Server 2860 public key. In block 3224, CKU Server 2860 decrypts the Session Key using a Server Private Key. In block 3226, CKU Server 2860 decrypts Key Complements, for example, using PKI with a Server Private Key and add Session Key information. In block 3228, CKU Server 2860 generates a random key using, for example, AES and/or triple-DES to be used to re-encrypt the Key Complements that provide unlock capability. Block 3230 provides that the CKU Server 2860 encrypts the Key Complements using the Unlock Key, using, for example, AES and/or triple-DES. In block 3232, CKU Server 2860 encrypts the Unlock Key using the engine public key using, for example, PKI. In block 3234, CKU Server 2860 constructs a CKCMD_UNLOCK_FILES data block and transmit to the Client 2896. In block 3236, CKU Server 2860 constructs a MAC for the data portion of the block. In block 3238, CKU Server 2860 transmits the data block to the Client 2896. In block 3240, CKU Server 2660 receives unlock status from Client 2896. In block 3242, the transaction status is marked in the Transaction Database 2890. In block 3244, the CKU Server 2860 disconnects from Client.

En In one embodiment, in block 3245, a web server 2850 completes the financial transaction after receiving indication from the CKU Client 2896 that the unlock has completed successfully.

Figure 33:
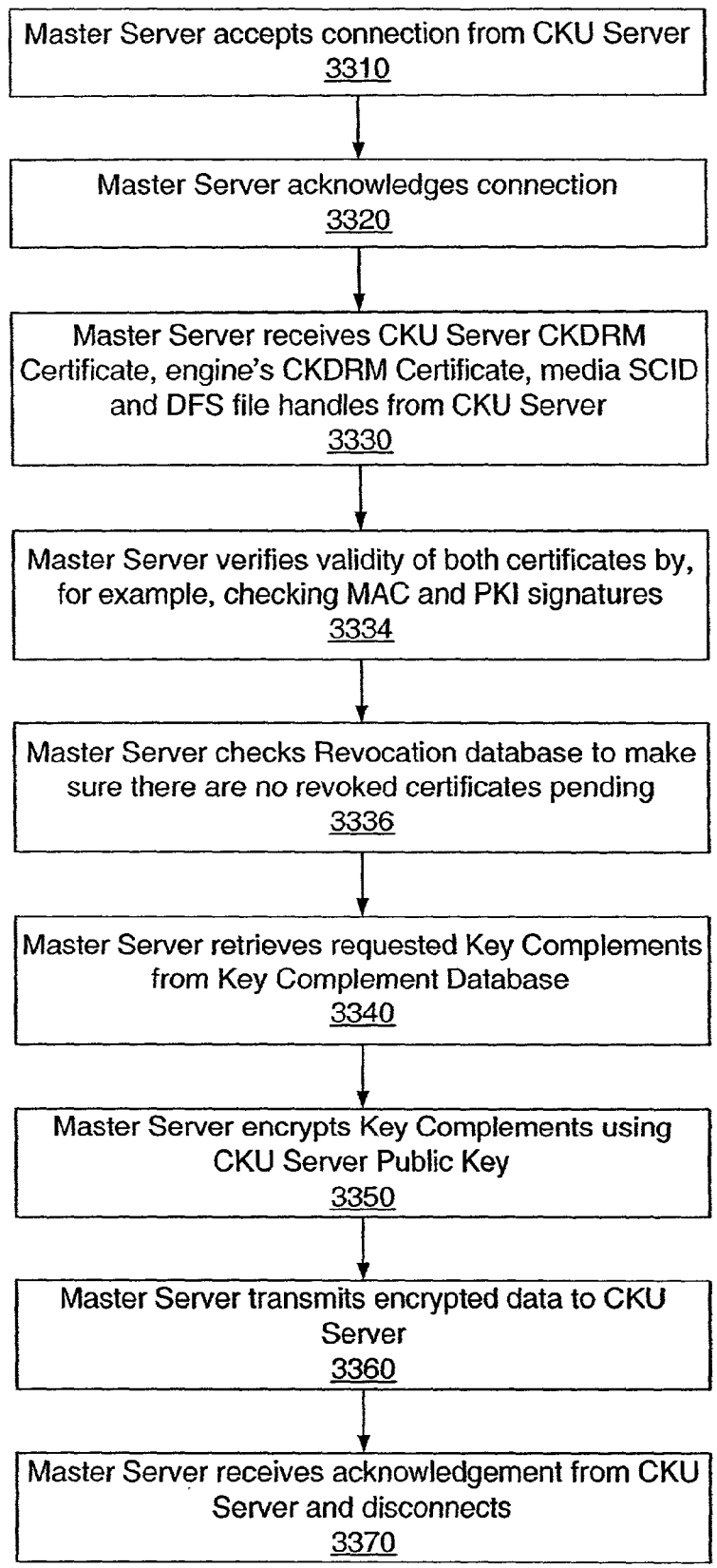
FIG. 33 illustrates a method performed by the Master Server according to an embodiment of the present invention.

Referring to FIG. 33, a method performed by the Master Server 2840 of FIG. 28 is provided. Block 3310 provides that Master Server 2840 accept connection from CKU Server 2860. In block 3320, the Master Server 2840 acknowledges the connection. In block 3330, Master Server 2840 receives the CKU Server 2860 CKDRM Certificate, the engine's CKDRM Certificate, media SCID and DFS file handles from the CKU Server 2860. In block 3334, Master Server 2840 verifies the validity of both certificates by, for example, checking MAC and PKI signatures. In block 3336, the Master Server 2840 checks the Revocation database 2530 to make sure there are no revoked certificates participating. In block 3340, Master Server 2840 retrieves requested Key Complements from Key Complement Database 2810. In block 3350, Master Server 2840 encrypts the Key Complements using the CKU Server 2860 Public Key. In block 3360, Master Server 2840 transmits the encrypted data to the CKU Server 2860. In block 3370, Master Server 2840 receives an acknowledgment from CKU Server 2860 and disconnects.

Figure 34:
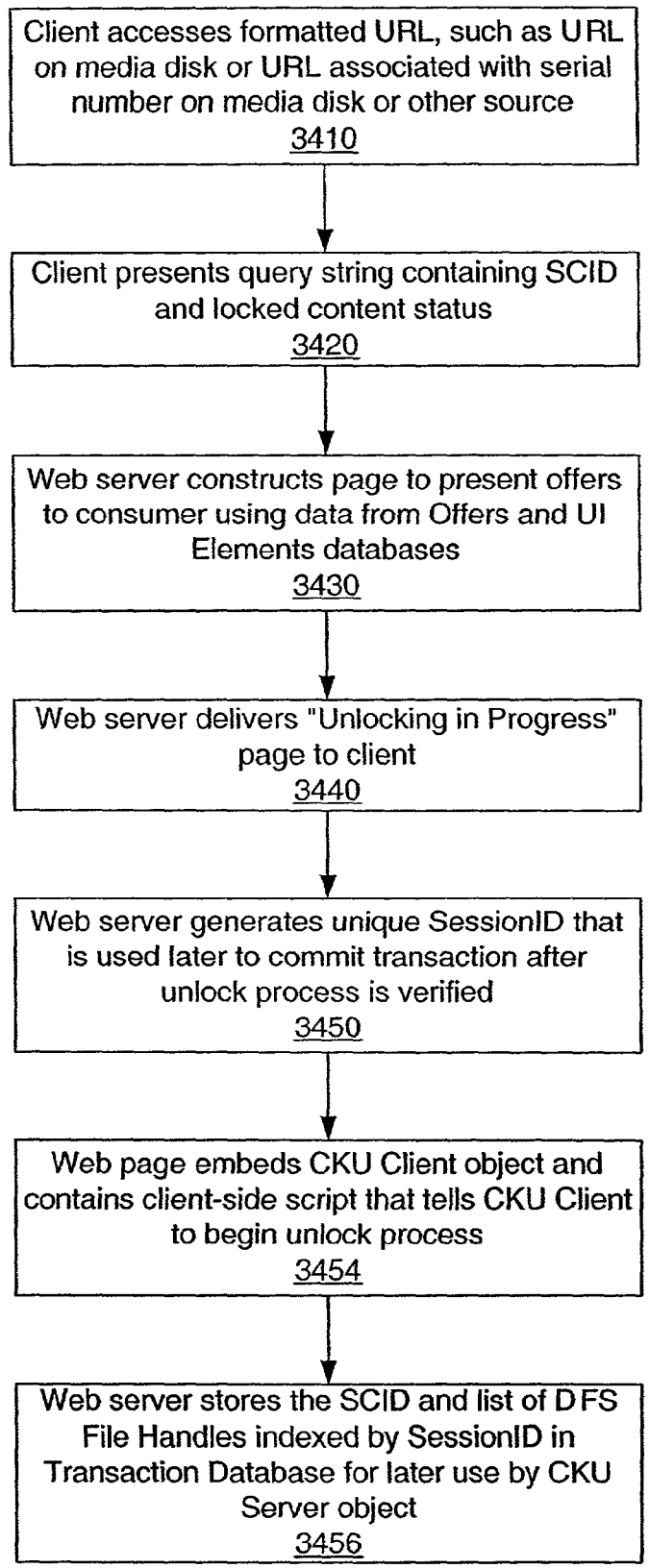
FIG. 34 illustrates a method for a web page and a CKU client server according to an embodiment of the present invention.

The methods described above for the servers shown in FIG. 28 begin with a client, such as CKU Client 2896 beginning a method. Referring to FIG. 34, the method for web page 2892 and CKU client server 2896 is described. A client 2896 begins the method in 3410 by accessing a formatted URL, such as a URL on a media disk as described above, or a URL associated with a serial number on a media disk or other source. In block 3420, the client 2896 presents a query string containing the SCID and locked content status. In block 3430, web server 2850 constructs a page to present the offers to a consumer using data from the Offers database 2880 and the UI Elements 2870 databases. After user selections have been made in block 3440, and the conditions of the transaction have been satisfied web server 2850 delivers an "Unlocking in Progress" page to the client. In block 3450 the web server 2850 generates a unique SessionID that is used later to commit the transaction after the unlock process is verified. In block 3454, the web page 2892 embeds a CKU Client 2896 object and contains client-side script that tells the CKU Client 2696 to begin the unlock process. The web server 2850 may also store in block 3454 the SCID and a list of DFS File Handles indexed by the SessionID in the Transaction Database for later use by the CKU Server object. CKU Client 2896 may be an embedded object within the web page delivered to an end user's computer. The object may be developed as both an ActiveX control and Netscape Plug-in to support the majority of browser client environments. The objects methods and properties may be accessed via Java Script. The object sends an OLE event to the page at the completion or error of the transaction.

When the web server receives a connection from a client browser with media information, it constructs the first page of the offers presentation. In some cases the SCID do and locked-state flags will be enough data to determine the branding of the page (if the media was mastered with a unique ID specific to a single retailer or promotion). In other cases the user may have to be prompted to enter a code from a sticker on the packaging or select the retailer where they purchased the disk. Offers and pricing are retrieved from the Offers Database and presented to the consumer in a branded page.

The user makes selections from the offers and must satisfy the conditions of the transaction. These conditions may require the entry of payment information or demographic data in exchange for unlocking the content.

Once the conditions of the transaction have been met the web server constructs an "Unlock in Progress" page. This page embeds a CKU Client object and script to instantiate the object with the correct parameters. The web server also makes a temporary entry in the Transactions Database that contains a unique SessionID, SCID, authorization code for the credit card transaction and a list of DFS file handles to be unlocked.

Figure 35:
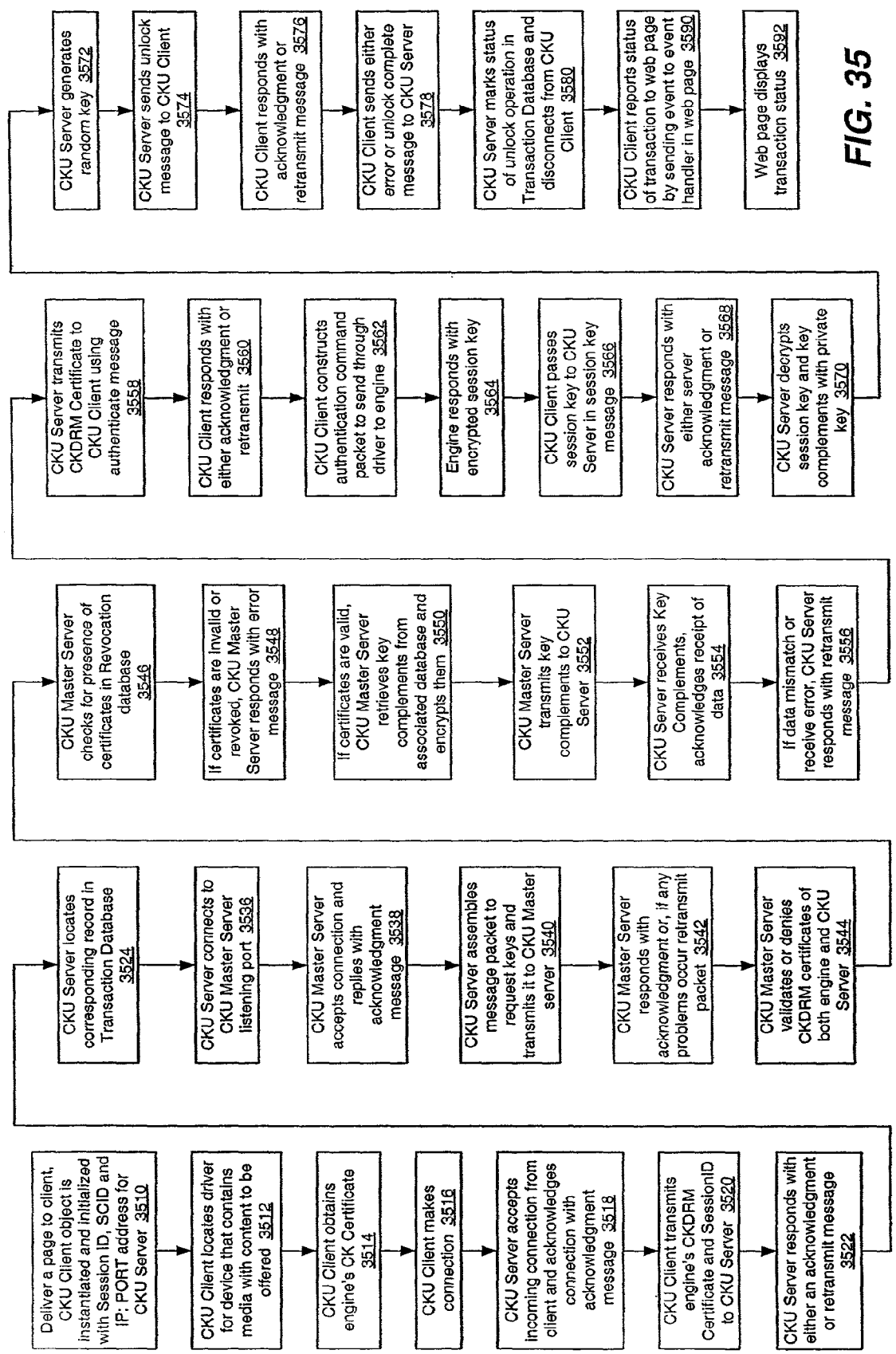
FIG. 35 illustrates a method for unlocking content from a system viewpoint according to an embodiment of the present invention.

Referring to FIG. 35, a method according to one embodiment for unlocking content is provided with a system viewpoint. Block 3510 provides for delivering a page to the client, the CKU Client object is instantiated and initialized with the Session ID, SCID and the IP: PORT address for the CKU Server. In block 3512, the CKU Client locates a driver for the device that contains the media with content to be offered. In block 3514, CKU Client obtains the engine's CKDRM Certificate. In block 3516, CKU Client makes a connection, for example, a socket connection, to a listening port on the CKU Server. In block 3518, CKU Server accepts the incoming connection from the client and acknowledges the connection with an acknowledgment message. In block 3520, the CKU Client transmits the engine's CKDRM Certificate and the SessionID to the CKU Server using a connect message. In block 3522, the CKU Server responds with either an acknowledgment or a retransmit message. In block 3534, CKU Server then locates the corresponding record in the Transaction Database by indexing the unique SessionID for this session. In block 3536, CKU Server connects to the CKU Master Server listening port using a socket connection. In block 3538, CKU Master Server accepts the connection and replies with an acknowledgment message. In block 3540 CKU Server assembles a message packet to request keys and transmits it to the CKU Master server. The packet may contain an engine CKDRM Certificate, the CKU Server CK Certificate, SCID for the media and the list of DFS File Handles for which Key Complements are requested.

In one embodiment, the message sent by CKU Server to CKU Master Server to request the keys to unlock content takes the form as shown in Table 51. In the embodiment, message shown in Table 51 contains both the engine and server CKDRM certificates, the identifier (SCID) for the media containing the files and the list of DFS Handles for each file to be unlocked.

TABLE 51

| Byte Offset | Type | Field Name | Description |
| --- | --- | --- | --- |
| 0:1 | U16 | MessageID = 5 | 0x0005 CKU_REQ_KEYS |
| 2:3 | U16 | MessageLength | Total byte length including header |
| 4:7 | U32 | Reserved | Reserved for later use |
| 8:247 | CK_CERTIFICATE | ServerCert | CKU Server CK Certificate |
| 248:487 | CK_CERTIFICATE | EngineCert | Engine CK Certificate |
| 488:491: | U32 | NumHandles | Number of DFS Handles |
| 492:n | DFS_HANDLE | HandleList | List of DFS Handles |

Referring back to FIG. 35, in block 3542, CKU Master Server responds with an acknowledgment or, if any problems occur a retransmit packet.

In block 3544, CKU Master Server validates or denies the CKDRM certificates of both the engine and CKU Server. Validation could include verifying digital signatures using, for example, Certicom™. In block 3546, CKU Master Server checks for the presence of the certificates in the Revocation database. If the certificates are invalid or revoked, the CKU Master Server responds in 3548 with an error message. If the certificates are valid, CKU Master Server retrieves in block 3550 the Key Complements from an associated database, encrypts them, using for example, PKI, using for example, a Server Public Key from a Server Certificate. In block 3552, the CKU Master Server transmits the key complements to CKU Server.

Referring to Table 52, the message sent by CKU Master Server may be an encrypted list of Key Complements for requested files as shown. The Key Complements may be encrypted using the CKU Server's public key or another appropriate public key.

TABLE 52

| Byte Offset | Type | Field Name | Description |
| --- | --- | --- | --- |
| 0:1 | U16 | MessageID = 6 | 0x0006 CKU_KEYS |
| 2:3 | U16 | MessageLength = 8 | Total byte length including header |
| 4:7 | U32 | Reserved | Reserved for later use |
| 8:11 | U32 | NumKeys | Number of key complements in list |
| 12:n | U160 | EKeyComplimentList | Encrypted list of Key Complements |

In block 3554, CKU Server receives the Key Complements, acknowledges the receipt of the data by sending an acknowledgment message, and disconnects from the CKU Master Server. In the event of a data mismatch or receive error, in block 3556 CKU Server responds with a retransmit message. In block 3558, CKU Server transmits its CK Certificate to the CKU Client using an authenticate message. In block 3560, CKU Client responds with either an acknowledgment or a retransmit. In block 3562, CKU Client constructs an authentication command packet to send through the driver to the engine. In response, in block 3564, engine responds with an encrypted session key that the CKU Client then passes in block 3566 to the CKU Server in a session key message.

In block 3568, CKU Server responds with either a server acknowledgment or a retransmit message. In block 3570, CKU Server decrypts the session key and the key complements with a private key. The CKU Server generates in 3572 a random key, for example, a 128-bit AES key to re-encrypt the key complements. A session key may be used to encrypt an unlock key and to construct an unlock message. The message may contain a complete packet for an unlock command to the engine. In one embodiment, the command may require calculation of the MAC for the data.

In block 3574, CKU Server sends an unlock message to CKU Client. In block 3576, CKU Client responds with an acknowledgment or a retransmit message. In block 3576, CKU Client uses the data to send a command to unlock files to the engine. After receiving status Pro from the engine, in block 3578 CKU Client sends either an error or an unlock complete message to CKU Server. In block 3580, CKU Server marks the status of the unlock operation in the Transaction Database and disconnects from the CKU Client. In block 3590, CKU Client reports the status of the transaction to the web page by sending an event to an event handler in the web page. In block 3592, the web page displays the transaction status.

In the method shown in FIG. 35, a number of opportunities occur for errors. As shown in Table 53, those errors that may be sent in a message include those listed.

TABLE 53

| Error Code | Name | Description |
| --- | --- | --- |
| 0 | CKU_ERR_UNKNOWN | An unknown or undefined error has occurred |
| 1 | CKU_ERR_INVALID_DATA | Some data in the last packet sent was invalid |
| 2 | CKU_ERR_INVALID_MESSAGE | Invalid message ID |
| 3 | CKU_ERR_ECERT_INVALID | Invalid Engine Certificate |
| 4 | CKU_ERR_SCERT_INVALID | Invalid Server Certificate |
| 5 | CKU_ERR_ECERT_REVOKED | Engine certificate is revoked |
| 6 | CKU_ERR_SCERT_REVOKED | Server certificate is revoked |
| 7 | CKU_ERR_INVALID_MEDIA | The media ID is invalid |
| 8 | CKU_ERR_INVALID_HANDLE | There is an invalid handle in the DFS file handle list. The index of the bad handle is reported in the ContextData field. |
| 9 | CKU_ERR_SAUTH_FAILED | Server authentication failed. (Either with the Engine or CKU Master) |
| 10 | CKU_ERR_UNLOCK_FAILED | For some reason the engine reported a failure unlocking. Status code from Engine is reported in ContextData field. |

The security of the SEC system, in one embodiment or more, is enhanced by a plurality of identifiers located on the media. The identifiers may be public, private or both. As described above, the identifiers may be created during a mastering process or later during other transactions, depending on system requirements as shown in Table 54.

TABLE 54

| Access | Location and Creation | Description |
| --- | --- | --- |
| Public | Created by the mastering process | GUID for each stamper master created. |
| Public | Identifier structure. Created in the field. | Statistically unique identifier created in the field. |
| Private | Identifier structure. Created by the mastering process | Statistically unique identifier for each master with ContentKey content. This is the identifier to which pre-recorded content is bound. |
| Private | Identifier structure. Created in the field. | Statistically unique for each individual media with written ContentKey content. This is the identifier to which written or field-recorded (non-mastered, not pre-recorded) content is bound. |
| Private | Non-volatile memory. Created by the engine manufacturing process. | GUID for each engine created. |

Figure 36:
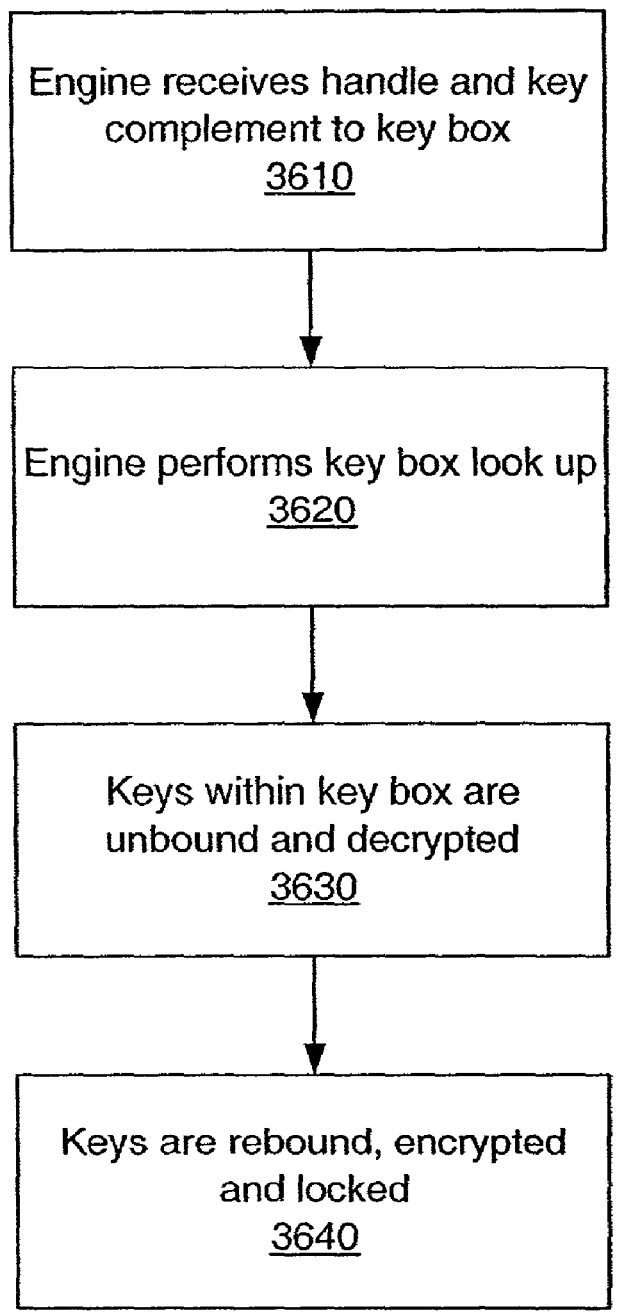
FIG. 36 illustrates a method for unlocking content from an engine perspective according to an embodiment of the present invention.

The method for unlocking content stored on media shown in FIG. 35, illustrates a protocol for authenticating and performing an unlock protocol. From an engine perspective, the unlock protocol includes the method shown in FIG. 36. In block 3610 the engine receives a handle, and a key complement to a key box. The key box may be bound to a written identifier. In block 3620, the engine performs a key box look up. In block 3630, the keys within the key box are unbound and decrypted. In block 3640, the transaction is completed and keys are rebound, encrypted and locked. As a result of the methods shown in FIGS. 35 and 36, the APIs are protected when data passes from a server. As a result of the authentication on both sides of an unlock transaction, communication is established with a data session key. In one embodiment, the data session key is received as a PKI encryption block along with a public key. Thus, the communication channel is encrypted when sent to a host. The host holds a private key and decrypts the data to receive a secret session key. The secret session key is received by an encrypted block, such as an AES block, along with data, which may be a key box.

Figure 37:
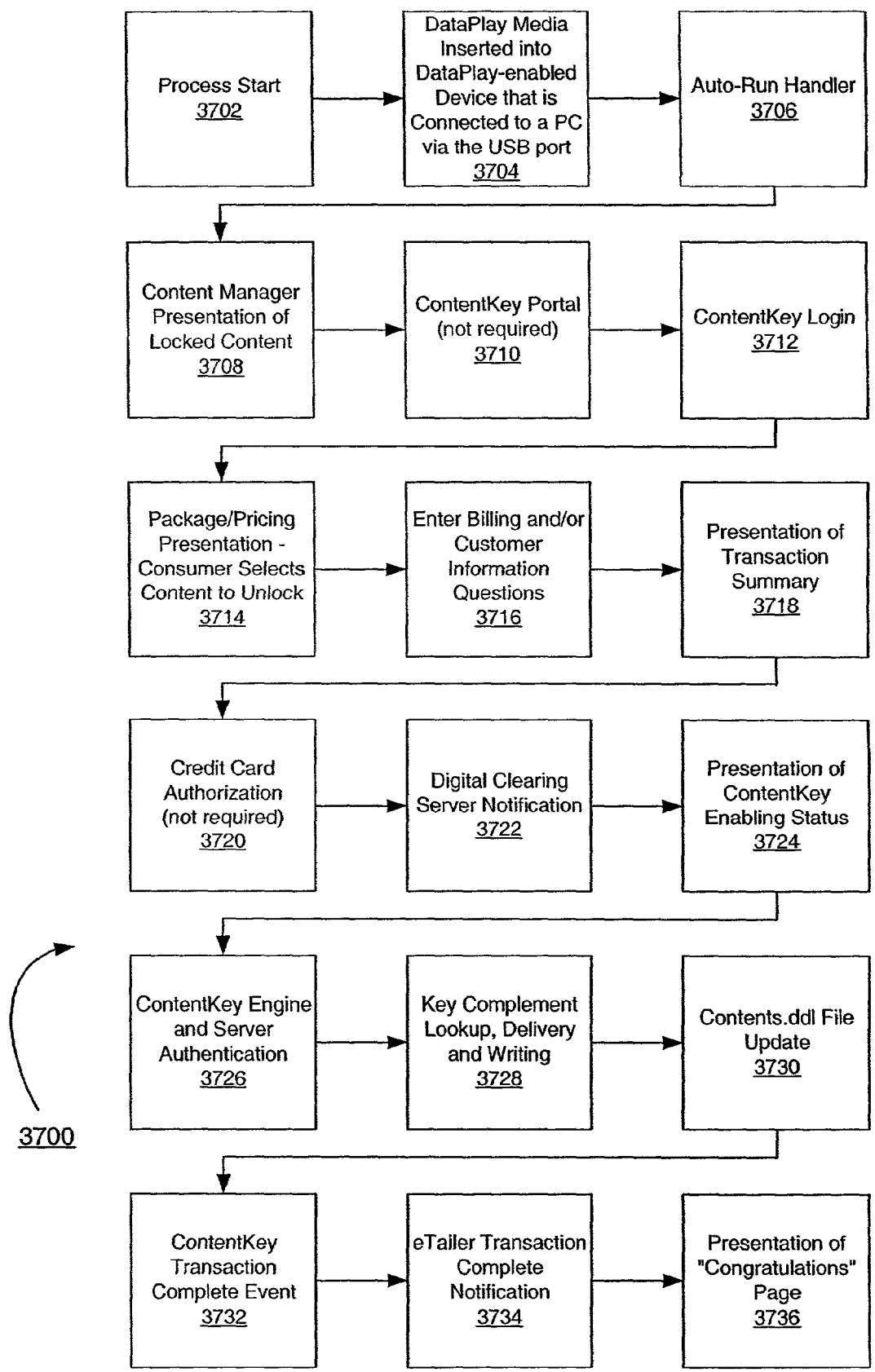
FIG. 37 illustrates a process flow diagram for a complete unlock transaction according to an embodiment of the present invention.

FIG. 37 provides a process flow diagram for an unlock transaction according to another embodiment. More particularly, process flow diagram 3700 begins with a process start indication 3702, which may include powering up a device. Block 3704 provides that media, such as a portable disk is inserted into a device connected to a personal computer via, for example, a universal serial bus port. Block 3706 of the process flow provides that an auto-run handler as described above is initiated. In one embodiment, the auto-run handler is a server installed in a driver stack that waits for an insert event, such as the insertion of media into a device. One the auto-run handler is initiated, the auto-run handler goes through the file system to retrieve an autorun.inf file with instructions as to launching a "Content Manager."Block 3708 is directed to the content manager, which presents locked content. In one embodiment, the content manager is a presentation layer that a user interacts with to play the contents of a media disk. The content manager may dynamically build a table of contents that distinguishes between locked and unlocked content with a contents.ddl file. For locked content the content manager may provide the customer with a link that directions a consumer or user to a location that allows unlocking of content. Further, auto-run hander 3706 may detect a lack of a content manager and perform a read of the contents.ddl file to locate URL data. In one embodiment, media may contain multiple offers as in a Kiosk or download model, and may or may not have multiple URLs associated with the offers. If multiple URLs exist, the customer or user may select one before proceeding.

The content manager is Block 3710 provides an optional CKDRM portal for those CKDRM content files. In one embodiment, the need for a CKDRM portal is necessary only if one of the following situations are present. First, a package collection ID appended to a URL points to a package or set thereof that can be unlocked by more than one eTailer, such as a secondary music transaction for unlocking by another eTailer. Second, a package collection ID that was appended to the URL that points to two or more packages that can be unlocked by a different eTailer. In either case, the presence of optional eTailers requires a user or consumer to choose an eTailer before continuing the transaction.

Block 3712 provides for a login into the CKDRM domain. More particularly, a login process may be according to the particular eTailer. Thus if a customer or user does not have an account with a desired eTailer, they can establish an account at block 3712 or, depending on the eTailer, choose a guest login access and provide valid billing data for processing transaction with credit card authorization required. After a login-procedure is completed, block 3714 provides for a package/pricing presentation to a consumer or other user. The consumer of user selects content to unlock or ends the-procedure if no selection is made. A package listing in block 3714 provides a customer with a procedure to select one or more packages to unlock. In block 3716, a customer information questionnaire is presented to the customer/user in which billing or other data is required or requested to be entered. Block 3718 provides for a presentation of the transaction summary, for example according to data entered in the questionnaire. Block 3720 provides for credit card authorization, which may or may not be desired depending on system requirements. For example, a code may allow for free unlocking of content in return for other or no compensation at the questionnaire 3716. Block 3722 provides for digital clearing server notification of the transaction. More particularly, an eTailer may be responsible for using a protocol required by a digital clearing server to communicate that an unlock transaction has taken place. In one embodiment, an eTailer must provide the digital clearing server with the package collection ID and list of packages that a customer/user desired/purchased. Also, the digital clearing server may also require a certain level of customer information to be provided.

Block 3724 provides for a presentation to the user or consumer of CKDRM enabling status. Block 3726 provides for an engine and a server conversing according to an authentication procedure. Block 3728 provides for a key complement lookup and delivery and writing of the key complement to the device/disk or other location requiring a key complement to complete cryptographic requirements. Block 3730 provides for an update of a contents.ddl file. Block 3732 provides for a procedure to complete the CKDRM transaction for unlocking content. Block 3734 provides for a transaction by an eTailer, e.g., a party that retails over the Internet, to complete the notification of the completed transaction. Block 3736 provides for an optional congratulations presentation to the user or consumer.

Figure 38:
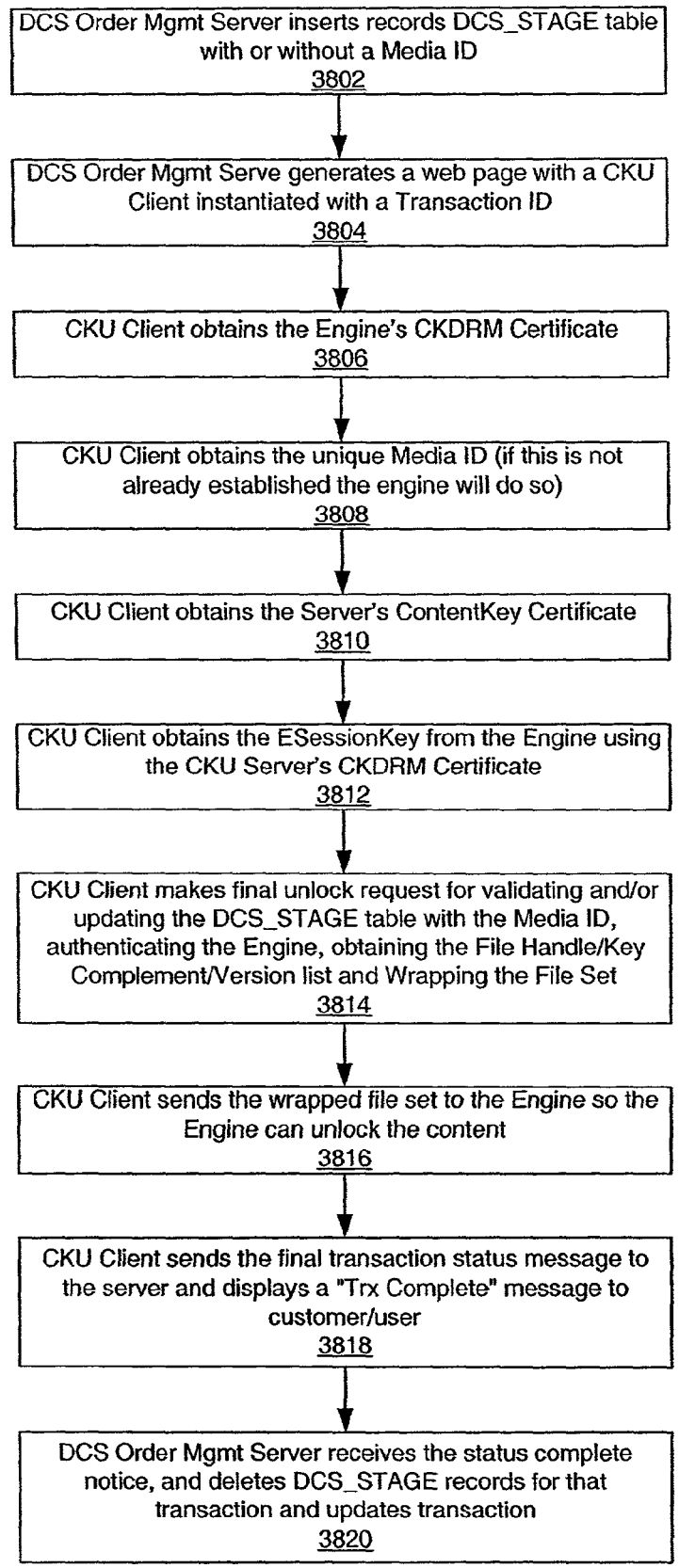
FIG. 38 illustrates a flow diagram of a method according to one embodiment for a process to unlock content.
Figure 39:
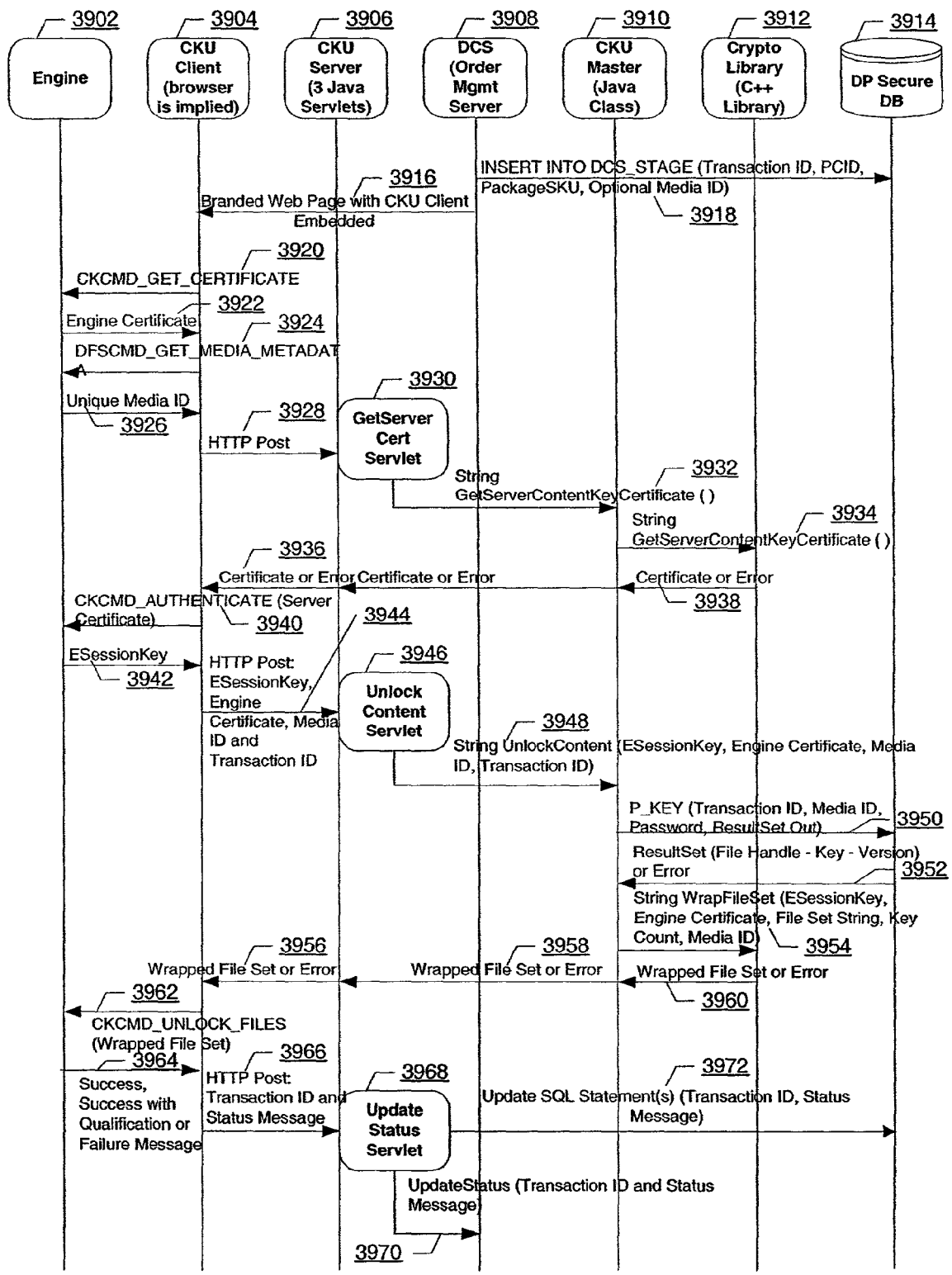
FIG. 39 illustrates a flow diagram illustrating an object interaction among components.

Referring to FIGS. 38 and 39 in combination, FIG. 38 provides a flow diagram of a method according to one embodiment for a process to unlock content. The object interaction among components of the SEC system is shown in FIG. 39. More particularly, referring to FIG. 38, block 3802 provides for the Digital Clearing Server (DCS) Order Management Server 3908 to insert records DCS_STAGE table with or without a media identifier to the DataPlay (DP) Secure Database 3914 in FIG. 39 shown by INSERT INTO DCS_STAGE 3918.

Specifically, referring to the DP Secure Database 3914, an embodiment of a schema of the database is provided below in table 55A through D.

TABLE 55 A

CKDRM_MASTER_KEY

| | | |
|---|---|---|
| MASTER_ITEM_ID | NUMERIC(0,0) | NOT NULL |
| PC_ID | VARCHAR(40) | NOT NULL |
| ITEM_NAME | VARCHAR(400) | NOT NULL |
| ITEM_HANDLE | VARCHAR(8) | NOT NULL |
| KEY_COMPLEMENT | VARCHAR(50) | NULL |
| KEY_VERSION | NUMERIC(3,0) | NULL |
| BUSINESS_ENTITY_ID | NUMERIC(3,0) | NULL |
| CHANGE_ID | VARCHAR(8) | NOT NULL |
| CHANGE_DT | DATE | NOT NULL |

TABLE 55 B

CKDRM_MASTER_PKG

| | | |
|---|---|---|
| MASTER_PKG_ID | NUMBERIC(0,0) | NOT NULL |
| PC_ID | VARCHAR(40) | NOT NULL |
| PKG_ID | VARCHAR(40) | NOT NULL |
| CHANGE_ID | VARCHAR(8) | NOT NULL |
| CHANGE_DT | DATE | NOT NULL |

TABLE 55 C

CK_MASTER_PKG_KEY

| | | |
|---|---|---|
| MASTER_PKG_ID (FK) | NUMERIC(0,0) | NOT NULL |
| MASTER_ITEM_ID (FK) | NUMERIC(0,0) | NOT NULL |
| CHANGE_ID | VARCHAR(8) | NOT NULL |
| CHANGE_DT | DATE | NOT NULL |

TABLE 55 D

DCS_STAGE

| | | |
|---|---|---|
| TRANSACTION_ID | VARCHAR(200) | NOT NULL |
| PCID | VARCHAR(40) | NOT NULL |
| PKGID | VARCHAR(40) | NOT NULL |
| MEDIA_ID | VARCHAR(36) | NULL |
| STATUS | NUMERIC(1,0) | NOT NULL |
| CREATE_DT | DATE | NOT NULL |
| KEY_REQUEST_DT | DATE | NOT NULL |
| COMPLETE_DT | DATE | NOT NULL |
| CHANGE_ID | VARCHAR(8) | NOT NULL |
| CHANGE_DT | DATE | NOT NULL |

Referring back to FIG. 38, block 3804 provides that the DCS Order Management Server 3908 generates a web page with a CKU client 3904 instantiated with a transaction identifier. The connection 3916 of the branded Web Page with CKU client Embedded is shown. Block 3806 provides for the CKU client 3904 obtaining the engine's 3902 CKDRM certificate as shown by CKCMD_GET_CERTIFICATE command connection 3920. Block 3806 provides that engine 3902 responds by passing CKU client 3904 a CKDRM certificate, as shown connection 3922. CKU client 3904 sends the DFSCMD_GET_MEDIA_METADATA command to engine 3902 to retrieve the unique media identifier. Block 3808 provides that the CKU client 3904 obtains the unique media identifier shown as connection 3926. In one embodiment, if the obtaining the unique media identifier is not established, engine 3902 obtains the identifier.

Following the obtainment of the unique media identifier, CKU client 3904 sends an HTTP post 3928, or a post according to another protocol appropriate for client server communication, to CKU server 3906. As a result of the post, CKU server 3906 instantiates a GetServerCert servlet 3930, which runs function GetServerContentKeyCertificate( ) 3932 including the CKU master 3910, which in one embodiment is a Java class master, and retrieves the required string. CKU master 3910 obtains the certificate requested from Crypto Library 3912 with the GetServerContentKeyCertificate( ) function to the Crypto Library 3912 via connection 3934.

Block 3810 provides for the CKU client 3904 obtaining the server 3906 content key certificate. As shown in FIG. 39, either a certificate or an error is sent back from the Crypto Library 3912 to the CKU master 3910 via connection 3938 and 3936. CKU client 3904 requests an ESessionKey with the received certificate by the command in connection 3940 CKCMD_AUTHENTICATE (server certificate) from the client 3904 to the engine 3902.

Block 3812 provides for the CKU client 3904 obtaining the ESessionKey from the engine 3902 via 3942 using the CKU server 3906 CKDRM certificate, via connection 3940.

Block 3814 provides for the client 3904 making a final unlock request for validating and/or updating a table with the media identifier. In one embodiment, the table is a DCS_STAGE table. Further, block 3814 provides for the client 3904 requests authenticating the engine 3902, obtaining the File Handle/Key Complement/Version list and wrapping the File Set. The CKU client 3904, by connection 3944, sends an HTTP Post to CKU server 3906 of, for example: EsessionKey, Engine Certificate, Media ID and Transaction ID. The UnlockContent Servlet 3946 within CKU server 3906 connects via 3948 using function UnlockContent (EsessionKey, Engine Certificate, Media ID, Transaction ID) to make the unlock request from CKU master 3910. CKU master 3910 accesses the DP Secure Database 3914 and, by connection 3950, sends the command P_KEY (Transaction ID, Media ID, Password, ResultSet Out). The DP Secure Database 3914 responds via connection 3952 with a ResultSet (File Handle—Key—Version) or an error. CKU master also requests the Wrap File Set via function WrapFileSet (ESessionKey, Engine Certificate, File Set String, Key Count, Media ID) by connection 3954 to the Crypto Library 3912.

Block 3816 provides for CKU client 3904 sending the wrapped file to engine 3902 so the engine 3902 can unlock the content. More particularly, Crypto Library 3912 sends either the Wrapped File Set or an error via connection 3960 to the CKU master 3910. CKU Master 3910 sends the transmission to the CKU server 3906 by connection 3958, and then from the CKU server 3906 to the CKU client 3904 by connection 3956. CKU client 3904 sends a command CKCMD_UNLOCK_FILES to the engine 3902, via connection 3962, with the wrapped file set. Engine 3902 sends back to the CKU client 3904 either a message of success, success with qualification, or failure by connection 3964.

Block 3818 provides that CKU client 3904 sends a final transaction status message to CKU server 3906 and displays a transaction complete ("Trx Complete") message to a customer/user. Specifically, CKU client 3904 sends an HTTP Post: Transaction ID and Status Message 3966 to CKU server 3906.

Block 3820 provides for the DCS Order Management Server 3908 to receive the status complete notice, and delete the DCS_STAGE records for that transaction and update Ms transaction. The UpdateStatus Servlet 3968 responds to the post 3966 by sending function UpdateStatus (Transaction ID and Status Message) by connection 3970 to DCS Order Management Server 3908. The UpdateStatus servlet 3968 connects with the DP Secure Database 3914 with the function Update SQL Statement(s) (Transaction ID, Status Message) 3972.

Figure 40:
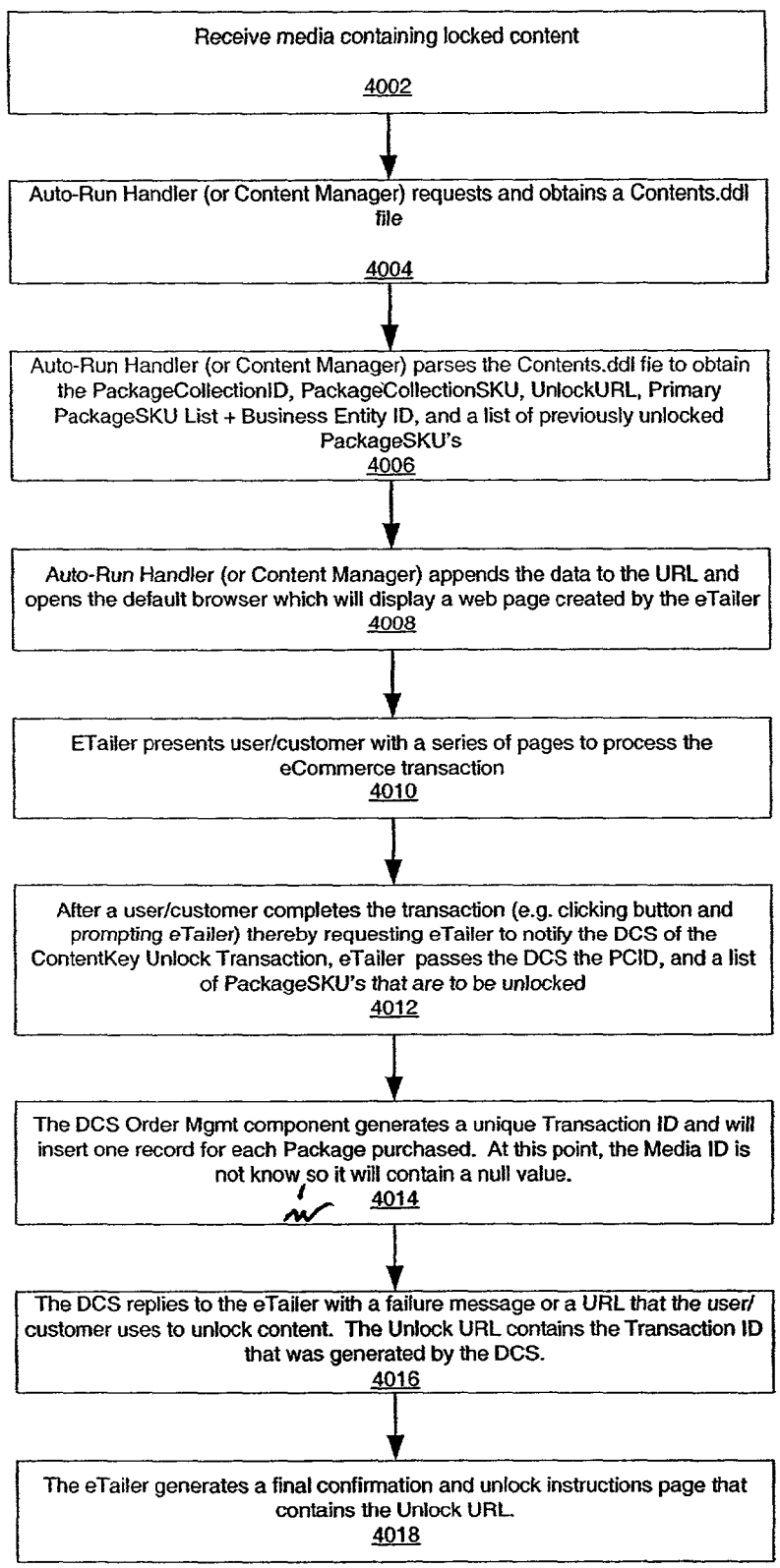
FIG. 40 illustrates a flow diagram of an unlock transaction according to an embodiment.
Figure 41:
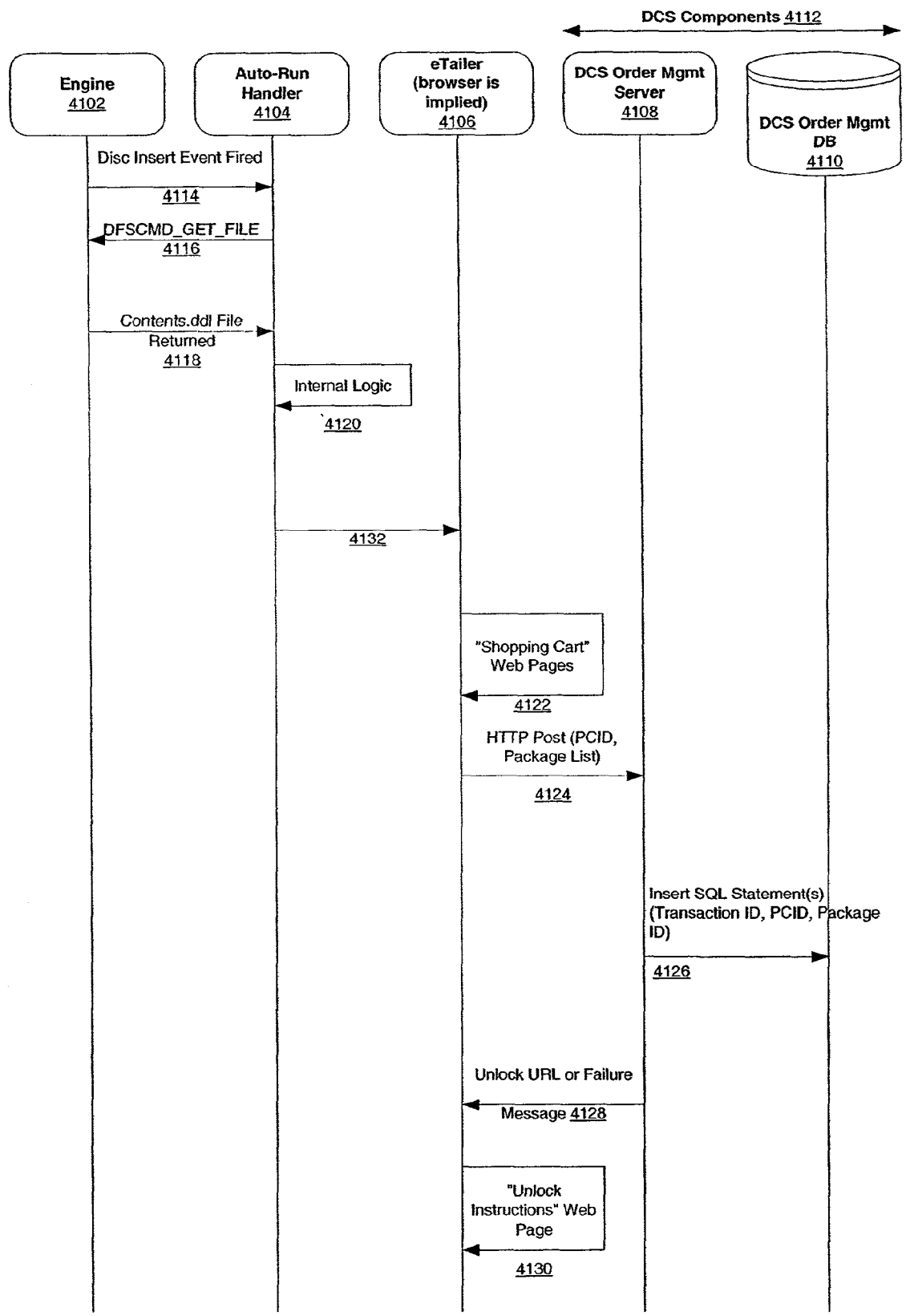
FIG. 41 illustrates a block diagram of object interactions among components.

Referring now to FIGS. 40 and 41 in combination, FIG. 40 provides a flow diagram of an unlock transaction according to an embodiment, with FIG. 41 providing a block diagram of object interactions among components of the SEC system. Block 4002 provides for reception of media containing locked content, for example, a disk being placed in a player or device coupled to a computer system, each of which is coupled to an engine 4102. Block 4004 provides that auto-run handler 4104, or a Content Manager, requests a contents.ddl file. Referring to FIG. 41, the request is shown by engine 4102 transmitting a signal to the Auto-Run Handler of the Disc Insert Event being fired shown as connection 4114. The auto-run handler 4104 sends a command 4116 of DFSCMD_GET_FILE to engine 4102. Engine 4102 responds by sending a contents.ddl file as shown by 4118.

Block 4006 provides for auto-run handler 4104 (or Content Manager) to parse the contents.ddl file to obtain one or more of a PackageCollectionID, PackageCollectionSKU, Unlock-URL, Primary PackageSKU list and Business Entity ID, and a list of previously unlocked PackageSKUs. Auto-run handler 4104 includes internal logic 4120 that operates after the contents.ddl file is returned.

Block 4008 provides that auto-run handler 4104 or a Content Manager appends the data to a URL and open a default browser that will display a web page created by an eTailer 4106. The choice of eTailer may be according to an embodiment described above.

Block 4010 provides that the Etailer 4106 presents user/customer with a series of pages to process an eCommerce transaction. A User/customer interacts with the eTailer's 4106 "shopping cart" web pages 4122.

Block 4012 provides that after a user/customer completes the transaction, for example, by clicking a button and prompting eTailer 4106, thereby requesting eTailor to notify the DCS of the ContentKey Unlock Transaction. ETailor passes the DCS to the PCID, and a list of PackageSKU's that are to be unlocked as shown in the HTTP Post (PCID, Package List) 4124 from the eTailor 4106 to the DCS Order Management Server 4108.

Block 4014 provides that the DCS Order Management Component generates a unique transaction ID and insert one record for each package purchased. The command Insert SQL Statement(s) (Transaction ID, PCID, Package ID) 4126 is transmitted from the DCS Order Management Server 4108 to the DCS Order Management Database 4110. At this point, the media identifier is not known, so it will contain a null value.

Block 4016 provides that the DCS Order Management Server 4108 replies to the eTailer 4106 with a failure message or a URL 4128. A user/customer uses the URL to unlock content. The unlock URL contains the Transaction Identifier that was generated by the DCS Order Management Server 4108.

Block 4018 provides that the eTailer 4106 generates a final confirmation and unlock instructions page that contains the Unlock URL 4130.

Other Embodiments

Those skilled in the art will appreciate that embodiments disclosed herein may be implemented as software program instructions capable of being distributed as one or more program products, in a variety of forms including computer program products, and that the present invention applies equally regardless of the particular type of program storage media or signal bearing media used to actually carry out the distribution. Examples of program storage media and signal bearing media include recordable type media such as floppy disks, CD-ROM, and magnetic tape transmission type media such as digital and analog communications links, as well as other media storage and distribution systems.

Additionally, the foregoing detailed description has set forth various embodiments of the present invention via the use of block diagrams, flowcharts, and/or examples. It will be understood by those skilled within the art that each block diagram component, flowchart step, and operations and/or components illustrated by the use of examples can be implemented, individually and/or collectively, by a wide range of hardware, software, firmware, or any combination thereof. The present invention may be implemented as those skilled in the art will recognize, in whole or in part, in standard Integrated Circuits, Application Specific Integrated Circuits (ASICs), as a computer program running on a general-purpose machine having appropriate hardware, such as one or more computers, as firmware, or as virtually any combination thereof and that designing the circuitry and/or writing the code for the software or firmware would be well within the skill of one of ordinary skill in the art, in view of this disclosure.

Although particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method of detecting unauthorized actions with respect to content on an optical disk, the optical disk including a read-only portion for pre-recorded content and a writeable portion for written content, the method comprising:
   reading an identifier on the optical disk;
   determining whether the identifier was located in the read-only or the writeable portion of the optical disk;
   determining whether the identifier identifies itself as a pre-recorded identifier or as a written identifier;
   and if the identifier identifies itself as a pre-recorded identifier and is located in the writeable portion of the optical disk, detecting an unauthorized action solely from the pre-recorded identifier being located in the writeable portion.

2. The method of claim 1 wherein the reading of the identifier on the optical disk is during a optical disk access operation including one or more of record, play, get play key, copy, open, close and create.

3. The method of claim 2 wherein functionality for the optical disk access operation is revoked after detecting the unauthorized action.

4. The method of claim 1 wherein the identifier is a seed for a key generator, the key generator retrieving one or more keys from a key box, the keys for one or more of unlocking and decrypting files on the optical disk.

5. An apparatus for detecting unauthorized actions with respect to encrypted data on a media disk, the media disk including a read-only portion for pre-recorded content and a writeable portion for written content, the apparatus comprising:
   means for reading an identifier on the media disk;
   means for determining whether the identifier was located in the read-only portion or in the writeable portion of the disk;
   means for determining whether the identifier identifies itself as a pre-recorded identifier or as a written identifier;
   and means for detecting an unauthorized action if the identifier identifies itself as a pre-recorded identifier and is located in the writeable portion of the media disk, the unauthorized action being detected solely from the pre-recorded identifier being located in the writeable portion of the media disk.

6. The apparatus of claim 5 wherein the means for reading of the identifier includes a media disk access component.

7. The apparatus of claim 5 wherein the means for reading the identifier operates during an access operation.

8. The apparatus of claim 5 wherein the identifier is a seed for a cryptographic key box, the key box using the identifier to retrieve one or more keys for unlocking files on the media disk.

9. An engine configured to detect unauthorized actions with respect to encrypted data on a media disk, the media disk including a read-only portion for pre-recorded content and a writeable portion for written content, the engine comprising:
   a firmware component located on an application specific integrated circuit (ASIC), the firmware component including:
   a block configured to read an identifier on the media disk;
   a block configured to determine whether the identifier was located in the read-only portion or the writeable portion of the media disk;
   a block configured to determine whether the identifier identified itself as a pre-recorded identifier or as a written identifier; and
   a block configured to detect an unauthorized action if the identifier was located in the writeable portion and identified itself as a pre-recorded identifier, the unauthorized action being detected solely from the pre-recorded identifier being located in the writeable portion of the media disk.

* * * * *